United States Patent
Sone et al.

(10) Patent No.: US 8,965,219 B2
(45) Date of Patent: Feb. 24, 2015

(54) REPEATER, RELAY METHOD AND OPTICAL TRANSMISSION SYSTEM

(75) Inventors: Kyosuke Sone, Kawasaki (JP); George Ishikawa, Ota (JP); Susumu Kinoshita, Fuchu (JP)

(73) Assignee: Fujitsu Limited, Kawasaki (JP)

( * ) Notice: Subject to any disclaimer, the term of this patent is extended or adjusted under 35 U.S.C. 154(b) by 267 days.

(21) Appl. No.: 13/538,191

(22) Filed: Jun. 29, 2012

(65) Prior Publication Data

US 2013/0028599 A1    Jan. 31, 2013

(30) Foreign Application Priority Data

Jul. 28, 2011    (JP) ................. 2011-165697

(51) Int. Cl.
H04B 10/00 (2013.01)
H04J 14/02 (2006.01)
H04B 10/293 (2013.01)

(52) U.S. Cl.
CPC .......... *H04J 14/0282* (2013.01); *H04B 10/293* (2013.01); *H04J 14/0246* (2013.01); *H04J 14/0247* (2013.01); *H04J 14/025* (2013.01); *H04J 14/0252* (2013.01); *H04J 14/028* (2013.01); *H04J 14/0267* (2013.01)
USPC .......................................... 398/176; 398/175

(58) Field of Classification Search
USPC ................................. 398/173–181
See application file for complete search history.

(56) References Cited

U.S. PATENT DOCUMENTS

| | | | |
|---|---|---|---|
| 5,483,372 A * | 1/1996 | Green, Jr. ............... | 398/175 |
| 6,810,215 B1 * | 10/2004 | Oikawa ................. | 398/175 |
| 7,295,783 B2 * | 11/2007 | Singh et al. ............ | 398/175 |
| 7,424,227 B2 * | 9/2008 | Oikawa ................. | 398/175 |
| 7,522,843 B2 * | 4/2009 | Oikawa ................. | 398/176 |
| 8,463,135 B2 * | 6/2013 | Sone et al. ............. | 398/173 |
| 8,571,058 B2 * | 10/2013 | Sone et al. ............. | 370/437 |
| 8,724,997 B2 * | 5/2014 | Zhang et al. ........... | 398/72 |
| 2003/0215233 A1 * | 11/2003 | Tomofuji et al. ....... | 398/41 |
| 2005/0041975 A1 * | 2/2005 | Nakamura et al. ..... | 398/85 |
| 2009/0028577 A1 * | 1/2009 | Oikawa ................. | 398/176 |
| 2009/0202242 A1 * | 8/2009 | Niibe et al. ............ | 398/63 |
| 2010/0098412 A1 * | 4/2010 | Boyd et al. ............ | 398/25 |
| 2010/0111532 A1 * | 5/2010 | Chen et al. ............ | 398/67 |
| 2010/0266293 A1 * | 10/2010 | Sone et al. ............. | 398/175 |
| 2011/0116803 A1 * | 5/2011 | Sone et al. ............. | 398/98 |
| 2011/0135306 A1 * | 6/2011 | Kim et al. .............. | 398/68 |
| 2011/0158650 A1 * | 6/2011 | Cavaliere et al. ....... | 398/79 |
| 2012/0148245 A1 * | 6/2012 | Bowler et al. .......... | 398/58 |
| 2012/0315047 A1 * | 12/2012 | Iannone et al. ......... | 398/72 |
| 2013/0028599 A1 * | 1/2013 | Sone et al. ............. | 398/37 |
| 2013/0108272 A1 * | 5/2013 | Miura .................... | 398/72 |

FOREIGN PATENT DOCUMENTS

JP    2010-252044    11/2010

* cited by examiner

*Primary Examiner* — Agustin Bello

(74) *Attorney, Agent, or Firm* — Staas & Halsey LLP

(57) ABSTRACT

There is provided a repeater to relay an optical signal transmitted/received between an optical line terminal (OLT) and at least one optical network unit (ONU), the repeater including: a first port configured to receive an optical signal input from the at least one ONU; a converter circuit configured to convert an optical signal of a first transmission rate into an optical signal of a second transmission rate higher than the first transmission rate, the optical signal of the first transmission rate to be converted being included in optical signals received at the first port; and a second port configured to output the optical signal converted by the converter circuit to the OLT.

8 Claims, 42 Drawing Sheets

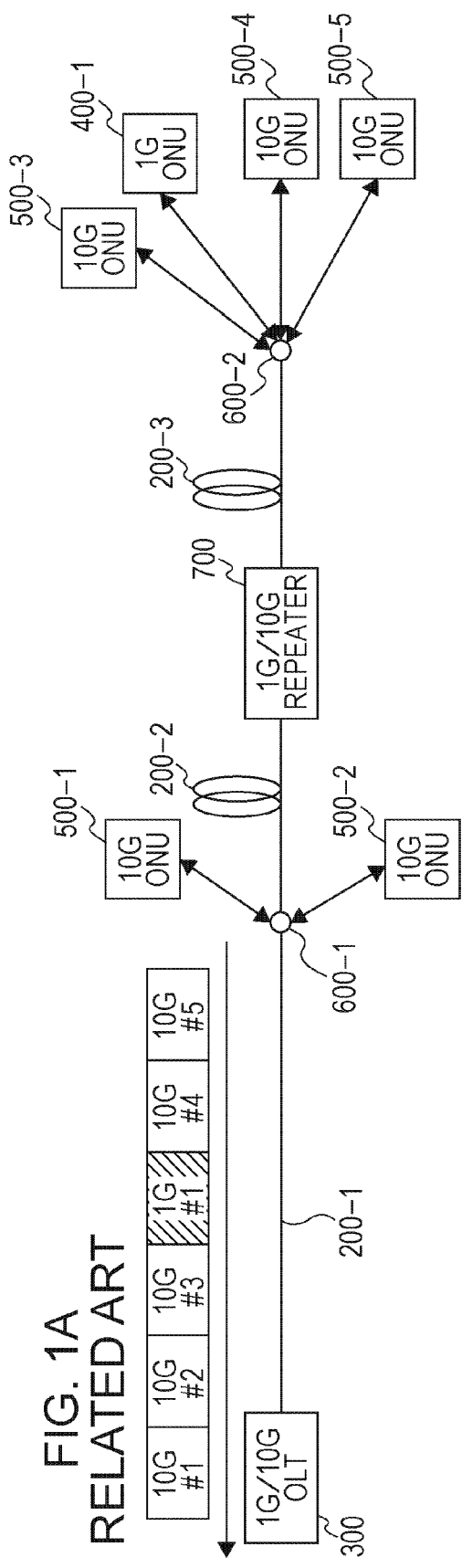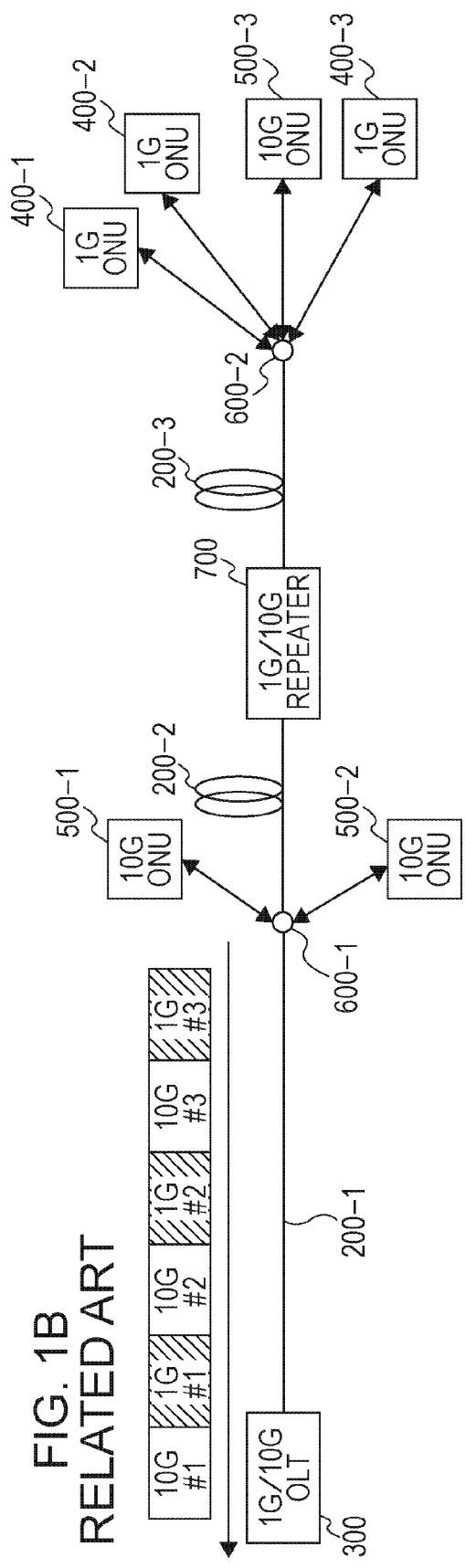

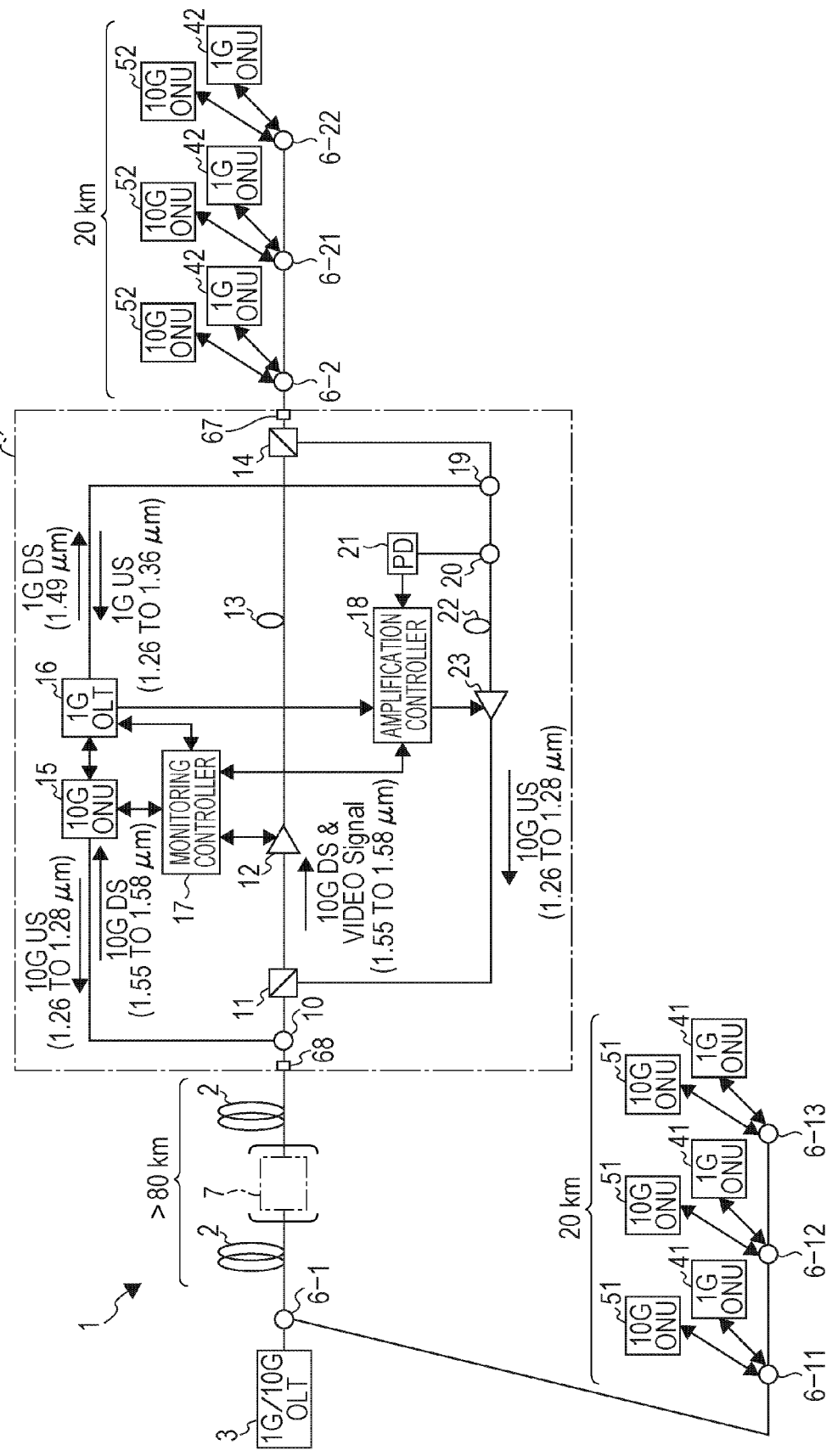

FIG. 18

| RTT BETWEEN 1G/10G OLT AND REPEATER | OBTAINING INFORMATION | | | | CALCULATION INFORMATION | |
|---|---|---|---|---|---|---|
| | TRANSMISSION SOURCE ONU | RECEPTION POINT-IN-TIME AT 1G/10G OLT | SIGNAL LENGTH | RTT BETWEEN 1G/10G OLT AND 10G ONU | ON POINT-IN-TIME | OFF POINT-IN-TIME |
| RTT#REP$_m$ | 10G ONU#1 | T1 | L1 | RTT#1 | T1−RTT#REP$_m$ | T1−RTT#REP$_m$+L1 |
| | 10G ONU#2 | T2 | L2 | RTT#2 | T2−RTT#REP$_m$ | T2−RTT#REP$_m$+L2 |
| | . | . | . | . | . | . |
| | . | . | . | . | . | . |

FIG. 23

|      | DOMAIN #1                     | DOMAIN #2                     | DOMAIN #3                     |
|------|-------------------------------|-------------------------------|-------------------------------|
| RW#1 | REGISTRATION REQUEST EXISTS   | NO REGISTRATION REQUESTS      | NO REGISTRATION REQUESTS      |
| RW#2 | REGISTRATION REQUEST EXISTS   | REGISTRATION REQUEST EXISTS   | NO REGISTRATION REQUESTS      |
| RW#3 | REGISTRATION REQUEST EXISTS   | REGISTRATION REQUEST EXISTS   | REGISTRATION REQUEST EXISTS   |

REPEATER, RELAY METHOD AND OPTICAL TRANSMISSION SYSTEM

CROSS-REFERENCE TO RELATED APPLICATION

This application is based upon and claims the benefit of priority of the prior Japanese Patent Application No. 2011-165697, filed on Jul. 28, 2011, the entire contents of which are incorporated herein by reference.

FIELD

The embodiment discussed herein is related to a repeater relay method, and optical transmission system. The repeater may be applied to a PON (Passive Optical Network) system, for example.

BACKGROUND

Recently, the introduction of optical transmission systems such as GE-PON (Gigabit Ethernet-PON) or G-PON (Gigabit capable-PON), accommodating multiple subscribers and a transmission capacity in the 1 Gbps (hereafter, "Gbps" is denoted "G") class, has been advanced. Also, as a next-generation PON system having a higher transmission rate, for example, a communication system having a 10G transmission capacity (10GE-PON) is being studied.

Further, in order to expand the range of services that is provided by the optical transmission system, extending the distance of the transmission distance and the increase in number of branches to subscribers using repeaters are being studied. In transitioning to a higher-rate PON system, for example a network system allowing the mixing of multiple systems having different transmission rates, such as 1G and 10G (hereafter also called a 1G/10G mixed system), is envisaged.

In such a so-called transitional period network system also, repeaters may be used to extend the distance of the transmission distance. For example, Japanese Laid-open Patent Publication No. 2010-252044 described below discloses a repeater that is applicable to a 1G/10G mixed system.

SUMMARY

According to an aspect of the embodiment, there is provided a repeater to relay an optical signal transmitted/received between an optical line terminal (OLT) and at least one optical network unit (ONU), the repeater including: a first port configured to receive an optical signal input from the at least one ONU; a converter circuit configured to convert an optical signal of a first transmission rate into an optical signal of a second transmission rate higher than the first transmission rate, the optical signal of the first transmission rate to be converted being included in optical signals received at the first port; and a second port configured to output the optical signal converted by the converter circuit to the OLT.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 1A and 1B are diagrams illustrating a configuration example of an optical transmission system;

FIG. 2 is a diagram illustrating an example of configurations of an optical transmission system and 1G/10G repeater according to an embodiment;

FIG. 18 is a diagram illustrating an example of a control timetable;

FIG. 23 is a diagram describing domain distinguishing processing;

DESCRIPTION OF EMBODIMENT

Figure 3:
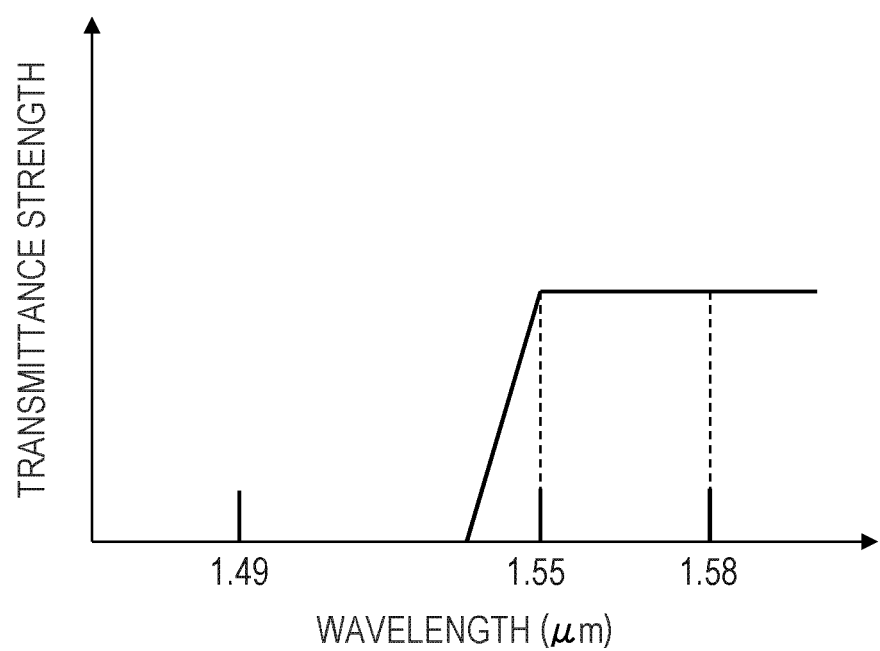
FIG. 3 is a diagram illustrating an example of a transmission/reflection property of a filter.

FIGS. 1A and 1B illustrate an example of the configuration of a 1G/10G mixed system where 1G entities such as ONUs (Optical Network Units) capable of processing 1G signals and 10G entities such as 10G ONUs capable of processing 10G signals coexist in a mixed state.

With the system shown in FIG. 1A, an OLT (Optical Line Terminal) 300 is connected to 10G ONUs 500-1 and 500-2 via an optical transmission path 200-1, and optical coupler (optical splitter) 600-1. The optical coupler described as follows has the function of the splitter. Also, a 1G/10G OLT 300 is connected with 10G ONUs 500-3 through 500-5 and a 1G ONU 400-1 via the optical transmission path 200-1, optical coupler 600-1, transmission path 200-2, 1G/10G repeater 700, transmission path 200-3, and optical coupler 600-2. Note that the 1G/10G repeater 700 has a function of intermediate relay of each of 1G optical signals and 10G optical signals.

In the above 1G/10G mixed system, upstream optical signals 10G#1 and 10G#2 transmitted from the 10G ONUs 500-1 and 500-2 are multiplexed at the optical coupler 600-1 and reach the 1G/10G OLT 300 via the optical transmission path 200-1. Also, upstream optical signals 10G#3 through 10G#5 and 1G#1 transmitted from the 10G ONUs 500-3 through 500-5 and 1G ONU 400-1 are multiplexed at the optical coupler 600-2, and each subsequently subjected to relay processing at the 1G/10G repeater 700 via the transmission path 200-3.

Thereafter, the upstream optical signals 10G#3 through 10G#5 and 1G#1 reach the 1G/10G OLT 300 via the optical transmission path 200-2, optical coupler 600-1, and optical transmission path 200-1. Now, the upstream optical signals 10G#3 through 10G#5 and 1G#1 are subjected to time-division multiplexing such as shown in FIG. 1A, according to upstream scheduling control by the 1G/10G OLT 300, for example.

Now, in a transient period of transitioning to a faster PON system, there are cases wherein the percentage of 1G ONUs 400 is relatively great as to the overall number of entities, as with the system exemplified in FIG. 1B. In such a case, the percentage of upstream band dominated by 1G signals (e.g., 1G#1 through 1G#3) increases, so the transmission efficiency of the system deteriorates in a relative manner.

Hereinafter, an embodiment of the present disclosure will be described with reference to the appended diagrams. Note however, that the embodiment described below is but an example, and various modifications and technique applications not disclosed with the various embodiments and various modifications described below are not excluded by their absence therein. That is to say, it goes without saying that various embodiments and various modifications are carried out by making modifications in various ways within the scope and spirit of the present disclosure.

[1] An Embodiment (1.1) Configuration Example of Optical Transmission System According to an Embodiment FIG. 2 is a diagram illustrating a configuration example of an optical transmission system 1 relating to an embodiment.

In the optical transmission system 1 exemplified in FIG. 2, a 1G/10G OLT 3 that processes a 1G signal and a 10G signal, at least one 10G ONU 51 that processes a 10G signal, and at least one 10G ONU 41 that processes a 1G signal are connected via optical couplers 6-1, 6-11, 6-12, 6-13 and the like. Note that a 1G signal (a 1G optical signal) is an example of an optical signal of a first transmission rate, and a 10G signal (10G optical signal) is an example of an optical signal of a second transmission rate.

Specifically, the optical coupler 6-1 is connected to a 1G/10G OLT 3 via an optical transmission path that does not travel via a 1G/10G repeater 7 which is enabled for relay processing of a 1G signal and 10G signal, and the optical transmission path is branched. One of the optical transmission paths branched by the optical coupler 6-1 is connected to the optical transmission path side whereupon at least one 1G/10G repeater 7 is installed, and the other optical transmission path is connected to the 1G ONU 41 and 10G ONU 51 via cascade connection of optical couplers 6-11 through 6-13.

Also, the 1G/10G OLT 3 is connected to at least one 10G ONU 52 and 1G ONU 42, via the optical coupler 6-1, at least one optical transmission path 2, at least one 1G/10G repeater 7, and the optical couplers 6-2, 6-21, and 6-22. Now, the 1G ONU 41 and 1G ONU 42 are common in that both transmit and receive a 1G signal, but the transmission distances thereof from the 1G/10G OLT 3, whether or not the 1G/10G repeater 7 for relaying exists, and so forth, differ. Also, 10G ONU 51 and 10G ONU 52 are common in that both transmit and receive a 10G signal, but the transmission distances thereof from the 1G/10G OLT 3, whether or not the 1G/10G repeater 7 for relaying exists, and so forth, differ.

Note that the 1G/10G repeater 7, in order to secure the quality of the optical signal transmitted and received between the 1G 10G/OLD 3 and each of the ONUs 42 and 52, is installed as appropriate in a location having a transmission segment of 80 km or more or the like, for example.

With the optical transmission system 1 exemplified in FIG. 2, for example a 1G/10G repeater 7 is installed every 20 km, but in segments where optical signals of mutually differing transmission rates are not mixed or the like, a repeater that processes optical signals having a single transmission rate to transmit the segment may be installed.

Now, for a transmission method between the 1G/10G OLT 3 and 1G ONUs 41 and 42, for example a 1G E-PON (GE-PON) may be applied. In this case, the wavelength of a 1G downstream optical signal (1G DS; DownStream, optical signal in the direction from the 1G/10G OLT 3 toward the 1G ONUs 41 and 42) is 1.49 µm, for example. Also, the wavelength of a 1G upstream optical signal (1G US; UpStream, optical signal in the direction from the 1G ONUs 41 and 42 toward the 1G/10G OLT 3) is 1.26 µm to 1.36 µm, for example.

On the other hand, for a transmission method between the 1G/10G OLT 3 and the 10G ONUs 51 and 52, for example a 10G E-PON (10G-EPON) may be applied. In this case, the wavelength of a 10G downstream optical signal (10G DS, optical signal in the direction from the 1G/10G OLT 3 toward the 10G ONUs 51 and 52) is 1.55 µm to 1.58 µm, for example. Also, the wavelength of a 10G upstream optical signal (10G US, optical signal in the direction from the 10G ONUs 51 and 52 toward the 1G/10G OLT 3) is 1.26 µm to 1.28 µm, for example.

Thus, the wavelength bandwidth of the 10G US and the wavelength bandwidth of the 1G US overlap, thereby the 1G/10G repeater 7 has a configuration that individually processes the optical signals. Note that for a transmission method between the 1G/10G OLT 3 and the ONUs 41, 42, 51 and 52, for example another transmission method such as G-PON or the like may be applied.

(1.2) Configuration Example of 1G/10G Repeater 7

Now, a configuration example of the 1G/10G repeater 7 according to the present example will be described. The 1G/10G repeater 7 according to the present example temporarily contains the upstream optical signal from the 1G ONU 42 which is downstream from itself with a 1G OLT 16 provided within itself, and transmits the upstream optical signal to the 1G/10G OLT 3 side via the 10G ONU 15 provided within itself. That is to say, the 1G/10G repeater 7 according to the present example converts the optical signal at a first transmission rate (e.g. 1G) received by the local repeater 7 from the downstream side to an optical signal at a second transmission rate (e.g. 10G) that is a higher rate than the first transmission rate, and transmits this upstream from itself. Thus, the bandwidth on the upstream side from the 1G/10G repeater 7 is conserved, and transmission efficiency of the optical transmission system 1 is improved.

The 1G/10G repeater 7 exemplified in FIG. 2 has an optical coupler 10, filter 11, optical amplifier 12, optical delay line 13, filter 14, 10G ONU 15, 1G OLT 16, monitoring controller 17, and amplification controller 18, for example. Also, the 1G/10G repeater 7 has optical couplers 19 and 20, optical detector 21, optical delay line 22, optical amplifier 23, first port 67, and second port 68, for example.

First, focusing on the upstream direction optical signal, the 1G upstream optical signal (1G US) transmitted from the 1G ONU 42 via the optical couplers 6-2, 6-21, and 6-22 and the 10G upstream optical signal (10G US) transmitted from the 10G ONU 52 via the optical couplers 6-2, 6-21, and 6-22, upon having been received at a first port 67, are reflected to the path toward the optical coupler 19 by the filter 14. Note that in the optical transmission system 1 exemplified in FIG. 2, optical couplers 6-2, 6-21, and 6-22 are installed between the ONUs 42 and 52 and the 1G/10G repeater 7, but the 1G/10G repeater 7 according to the present example may also be used for optical transmission systems other than this sort of optical transmission system 1. Also, this holds true for the later-described various modifications.

Now, FIG. 3 illustrates an example of transmission/reflection properties of the filter 14. As exemplified in FIG. 3, the filter 14 allows an optical signal of 1.55 µm to 1.58 µm which is the 10G DS wavelength to pass through, while reflecting optical signals of any other wavelength. Note that in the example described in FIG. 3, the filter 14 is configured as a high-pass filter, but the filter 14 may be configured as a band pass filter that allows the 10G DS to pass through and reflects any other optical signals.

The 1G US and 10G US reflected to the path toward the optical coupler 19 by the filter 14 are branched to the path toward the 1G OLT 16 and the optical amplifier 23, by the optical coupler 19. That is to say, the optical coupler 19 branches the optical signal from at least one ONU, and functions as an example of a first interface that introduces the optical signals to a first path which is the first transmission rate optical signal processing path and a second path which is the processing path for an optical signal having a second transmission rate that is higher rate than the first transmission rate. Note that the branching ratio of the optical coupler 19 may be changed as suitable.

Upon having been branched by the optical coupler 19, the 1G US is contained in the 1G OLT 16 provided within the 1G/10G repeater 7. Note that the 10G US is also included in the optical signal branched toward the path of the 1G OLT 16 by the optical coupler 19, but with the 1G OLT 16, the 10G optical signal is not processed, and the 10G US branched toward the path of the 1G OLT 16 is blocked at the input stage of the 1G OLT 16.

The 1G OLT 16 subjects the 1G US to predetermined receiving processing such as demodulating and decoding, regenerates the data signal, converts the regenerated data signal to an electrical signal, and sends this to the 10G ONU 15 provided within the same 1G/10G repeater 7. That is to say, the 1G OLT 16 functions as an example of an optical line terminal within a relay station which contains the first transmission rate optical signal that travels through the first path, and converts this to an electrical signal.

The 10G ONU 15 subjects the electrical signal input from the 1G OLT 16 to predetermined processing such as encoding and modulation, and also converts the electrical signal to a 10G US having a wavelength of 1.26 µm to 1.28 µm, and sends this toward the path of the optical coupler 10. That is to say, the 10G ONU 15 functions as an example of an optical line terminal in repeater which converts the electrical signal converted at the 1G OLT 16 into a second transmission rate optical signal, and outputs to a later-described second interface.

Also, as described above, regarding the optical signal received by the first port 67, the 1G OLT 16 and 10G ONU 15 function as examples of a converter that converts the first transmission rate optical signal to the second transmission rate optical signal that is a higher rate than the first transmission rate. On the other hand, upon being branched by the optical coupler 19, the 10G US is amplified by an optical amplifier 23 made up of a SOA (Semiconductor Optical Amplifier), EDFA (Erbium Doped Fiber Amplifier), or the like.

In the example illustrated in FIG. 2, the optical amplifier 23 is controlled by the amplification controller 18 (amplifier control unit). The amplification controller 18 performs control to turn the optical amplifier 23 on at only the timing when the 10G US is input into the optical amplifier 23, for example, while, performing control to turn the optical amplifier 23 off at the timing when 1G US is input into the optical amplifier 23 or at the timing when there is no input. Since the wavelength band of the 1G optical signal is relatively wide, amplification of the 1G optical signal using the optical amplifier 23 is difficult, while the wavelength band of the 10G optical signal is relatively narrow and amplification of the 10G optical signal using the optical amplifier 23 is easy.

Specifically for example, upon being branched by the optical coupler 20, in the case that the power of the optical signal detected with an optical detector 21 such as a PD (Photo Diode) is at a predetermined threshold or above, and in the case that there is no notification indicating that input of the 1G US has been detected in the 1G OLT 16, the amplification controller 18 performs control to turn the optical amplifier 23 on so that the optical amplifier 23 becomes to be amplifiable, and in other cases performs control to turn the optical amplifier 23 off so that the optical amplifier 23 becomes to be un-amplifiable. That is to say, in the case that input to the optical amplifier 23 has been detected, and in the case that input of the 1G US to the 1G OLT 16 has not been detected, the amplification controller 18 performs control to turn the optical amplifier 23 on. On the other hand, in the case that input to the optical amplifier 23 has not been detected, and in the case that input of the 1G US to the 1G OLT 16 has been detected, the amplification controller 18 performs control to turn the optical amplifier 23 off.

Thus, the optical amplifier 23 optically amplifies and outputs only the 10G US, and blocks ASE (Amplified Spontaneous Emission) light that occur in the case there is no 1G US and optical input. Consequently, output of stray light is suppressed, while enabling optical amplification of the 10G US. Note that the optical delay line 22 provided between the optical coupler 20 and optical amplifier 23 provides a predetermined delay time to the optical signal input in the optical amplifier 23.

For example, in the event that the leading edge of the optical signal for which optical input is detected with the optical detector 21 is input, the optical delay line 22 provides a delay time to the input signal, such delay time having had completed the control by the amplification controller 18 to turn on the optical amplifier 23. Note that the delay time herein is set based on the response times or the like of the optical detector 21, amplification controller 18, and optical amplifier 23, for example. Also, the amplification controller 18 may perform ALC (Automatic Level Control) of the amplification rate of the optical amplifier 23, according to the monitor results from the optical detector 21.

Further, in order to stabilize control, a threshold used for determining that a state having input to the optical amplifier 23 has been transitioned to an off state (state having no optical input) in the amplification controller 18 may be a value smaller than the above-mentioned predetermined threshold wherein there is optical input. Also, the amplification controller 18 may control the optical amplifier 23 so as to be kept on, and control to turn off the optical amplifier 23 only in the case of a notification indicating that 1G US input has been detected. In this case, ASE light is not blocked if there is no optical input to the optical amplifier 23, but as long as the ASE light blocking is not an indispensable condition, the optical coupler 20 and optical detector 21 are unnecessary, whereby a simpler configuration is made. In this event, the optical delay line 22 may be provided if suitable because of the relation with the 1G US, or may be omitted if unnecessary, whereby the number of parts is reduced.

The 10G US after having been amplified with the optical amplifier 23 as described above is reflected toward the path of the optical coupler 10 with the filter 11. Note that the filter 11 is a high-pass filter or a band pass filter having similar transmission/reflection properties as the filter 14 (e.g., reference FIG. 3). The 10G US from the 10G ONU 52 and the 10G US that is transmitted from the 1G ONU 42 and further converted with the 1G OLT 16 and 10G ONU 15 are multiplexed with the optical coupler 10, and sent toward the path of the 1G/10G OLT 3 via the second port 68.

That is to say, the optical coupler 10 functions as an example of a second interface that outputs the optical signal converted with the 1G OLT 16 and 10G ONU 15 and the optical signal at the second transmission rate that is transmitted in the second path, toward the 1G/10G OLT 3 side. Note that other 1G/10G repeaters 7 installed in the optical transmission system 1 may also have a similar configuration and function to that described above.

As described above, according to the present example, transmission efficiency of the optical transmission system 1 is improved by converting the 1G US into 10G US to transmit, thereby reducing bandwidth on the upstream side from the 1G/10G repeater 7.

Next, focusing on the optical signal in the downstream direction, upon being received by the second port 68, the 10G downstream optical signal (10G DS) transmitted from the 1G/10G OLT 3 is branched by the optical coupler 10 into a path toward the filter 11 and a path toward the 10G ONU 15. Note that the branching ratio of the optical coupler 10 may be changed as appropriate. Also, an optical signal directed to the 10G ONU 15 and an optical signal directed to the 10G ONU 52, as well as video signals (VIDEO Signal) and the like are included in the 10G DS.

Upon passing through the filter 11, and being amplified with the optical amplifier 12 such as a SOA or EDFA or the like, the 10G DS branched toward the filter 11 is provided a predetermined delay by the optical delay line 13, and is sent towards the path of the filter 14. The optical delay line 13 provides a predetermined delay time to the optical signal after amplification with the optical amplifier 12, so that the optical signal branched in the path toward the filter 11 and the optical signal branched in the path toward the 10G ONU 15 are on the same downstream frame.

On the other hand, the 10G DS branched in the path toward the 10G ONU 15 is subjected to predetermined receiving processing by the 10G ONU 15. For example, of the optical signals included in the 10G DS, an optical signal directed to the 10G ONU 15 is extracted by the 10G ONU 15. The 10G ONU 15 subjects the extracted optical signal to predetermined receiving processing such as demodulating and decoding, regenerates the data signal, converts the regenerated data signal to an electrical signal, and sends this to the 1G OLT 16 provided within the same 1G/10G repeater 7.

The 1G OLT 16 subjects the electrical signal input from the 10G ONU 15 to predetermined processing such as encoding and modulating, and converts the electrical signal into at least one 1G DS having a wavelength of 1.49 μm, and sends this toward the path of the optical coupler 19 and filter 14. That is to say, the 10G ONU 15 and 1G OLT 16 according to the present example may function as an example of a converter that converts a optical signal at a second transmission rate to a optical signal at a first transmission rate, for a optical signal received by the second port 68.

The 1G DS converted with the 1G OLT 16 is input into the filter 14 via the optical coupler 19. The filter 14 allows the 10G DS that has been amplified with the optical amplifier 12 to pass through, while reflecting the 1G DS input from the path of the optical coupler 19. Thus, the optical signals branched by the optical coupler 10 are placed on the same downstream frame and sent towards the path of the optical coupler 6-2 from the first port 67.

The 10G ONU 52 selectively receives a 10G DS directed to itself from the downstream frame subjected to relay transmission with the 1G/10G repeater 7. Also, the 1G ONU 42 selectively receives a 1G DS directed to itself from the downstream frame subjected to relay transmission with the 1G/10G repeater 7.

As described above, according to the present example, transmission efficiency of the optical transmission system 1 is improved on the upstream side of the 1G/10G repeater 7, even in the downstream direction, by transmitting the 1G DS directed to the 1G ONU 42 as a 10G DS.

Now, the monitoring controller 17 subjects at least one of the operations of the optical amplifiers 12 and 23, 1G OLT 16, and 10G ONU 15 to monitoring control, and notifies the monitoring control results to the 1G/10G OLT 3 via the 10G ONU 15.

Figure 4:
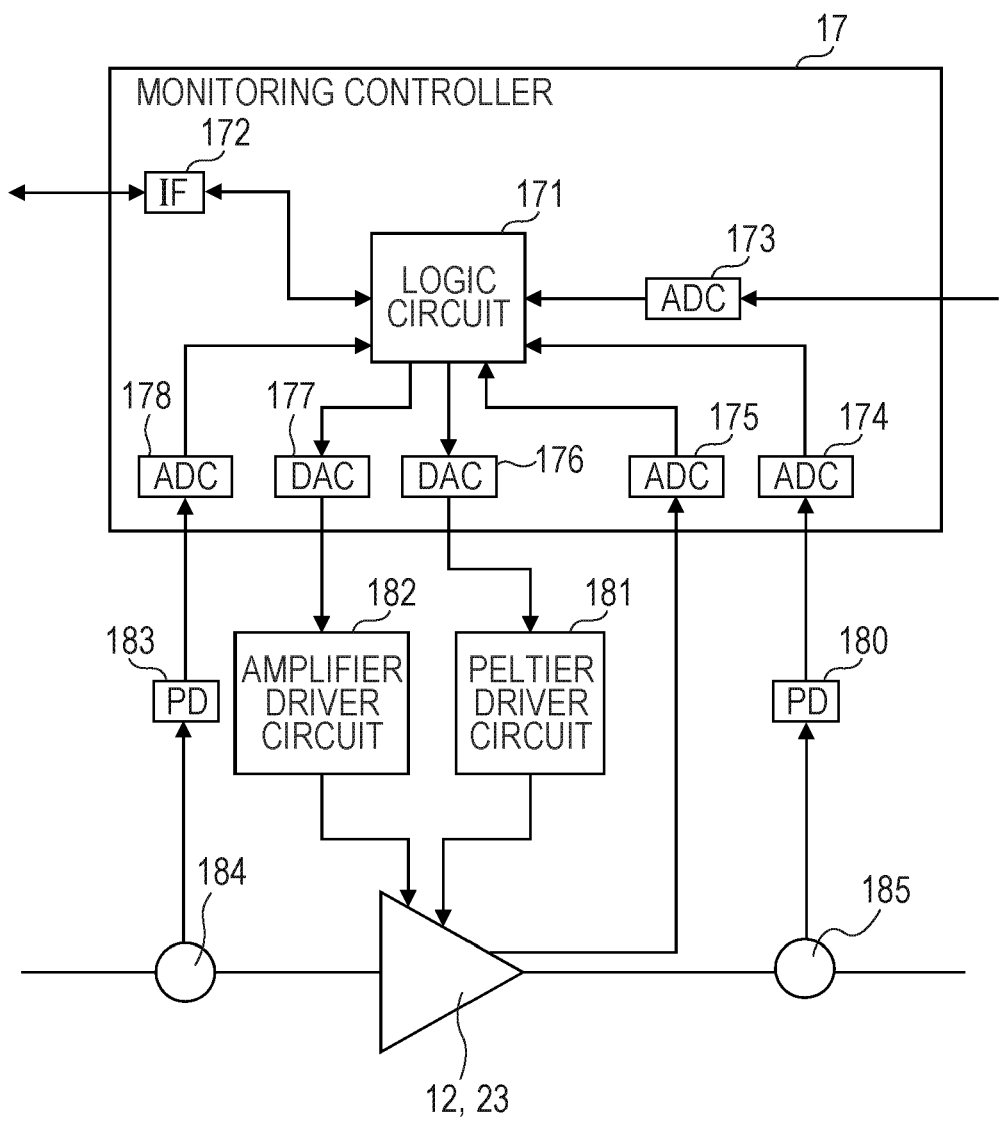
FIG. 4 is a diagram illustrating an example of a hardware configuration of a monitoring controller.

FIG. 4 is a diagram illustrating an example of a hardware configuration of the monitoring controller 17. As depicted in FIG. 4, the monitoring controller 17 provides a logic circuit 171, interface (IF) 172, analog-digital converters (ADC: Analog to Digital Converter) 173 through 175 and 178, and digital-analog converters (DAC: Digital to Analog Converter) 176 and 177, as an example.

For example, upon analog signals such as operating temperature of the 1G OLT 16, operating temperature of the 10G ONU 15, and temperature of the 1G/10G repeater 7 having been converted to digital signals by the ADC 173, these are input into the logic circuit 173. Note that the analog signal for the various temperatures is obtained by a temperature sensor such as a thermistor provided for each of the temperature sides.

Also, upon the optical power level of the signal branched with the optical coupler 184 having been detected with a PD 183 and converted from an analog signal to a digital signal with the ADC 178, the input levels of the optical amplifiers 12 and 23 are input into the logic circuit 173. Further, upon the optical power level of the signal branched with the optical coupler 185 having been detected with a PD 180 and converted from an analog signal to a digital signal with the ADC 174, the output levels of the optical amplifiers 12 and 23 are input into the logic circuit 173.

Also, upon being converted to a digital signal by the ADC 175, the analog signal for the operating temperature of the optical amplifiers 12 and 23 are input into the logic circuit 173. Note that the analog signal for the various temperatures is obtained by temperature sensor such as a thermistor provided for each of the temperature sides, for example.

The logic circuit 171 performs various types of control, based on the respective input described above. Note that the logic circuit 171 may be configured by an LSI (Large Scale Integration) or FPGA (Field Programmable Gate Array), for example. The logic circuit 171 generates a control signal to control the Peltier driver circuit 181, based on information relating to the operating temperature of the optical amplifiers 12 and 23 input from the ADC 175. Note that information relating to the operating temperature of the optical amplifiers 12 and 23 is obtained by a temperature sensor such as the thermistor provided within the optical amplifiers 12 and 23.

The Peltier driver circuit 181 controls the temperature of the optical amplifiers 12 and 23, based on the control signal input from the logic circuit 171 via the DAC 176. Specifically, for example, the optical amplifiers 12 and 23 are cooled so that the optical amplifiers 12 and 23 operate within a predetermined operating temperature range.

Also, the logic circuit 171 generates a control signal to control the amplification gain of the optical amplifiers 12 and 23, based on information relating to the input/output levels of the optical amplifiers 12 and 23 input from the ADC 178 and 174.

The amplifier driver circuit 182 controls the amplification gain of the optical amplifiers 12 and 23, based on the control signal input from the logic circuit 171 via the DAC 177. Specifically, for example, the optical amplifiers 12 and 23 are controlled so as to operate within a predetermined amplification gain range.

Also, the logic circuit 171 performs monitoring control as to whether or not of the operations of at least one of the optical amplifiers 12 and 13, 1G OLT 16, and 10G ONU 15 is normal, based on the inputs described above, and sends the monitoring control results to the 10G ONU 15 via the IF 172. The monitoring control results sent to the 10G ONU 15 are notified to the 1G/10G OLT 3 via the 10G ONU 15.

Note that PD 180 and 183, amplifier driver circuit 182, Peltier driver circuit 181, and optical couplers 184 and 185 in FIG. 4 are omitted in FIG. 2 to simplify the description.

Figure 5:
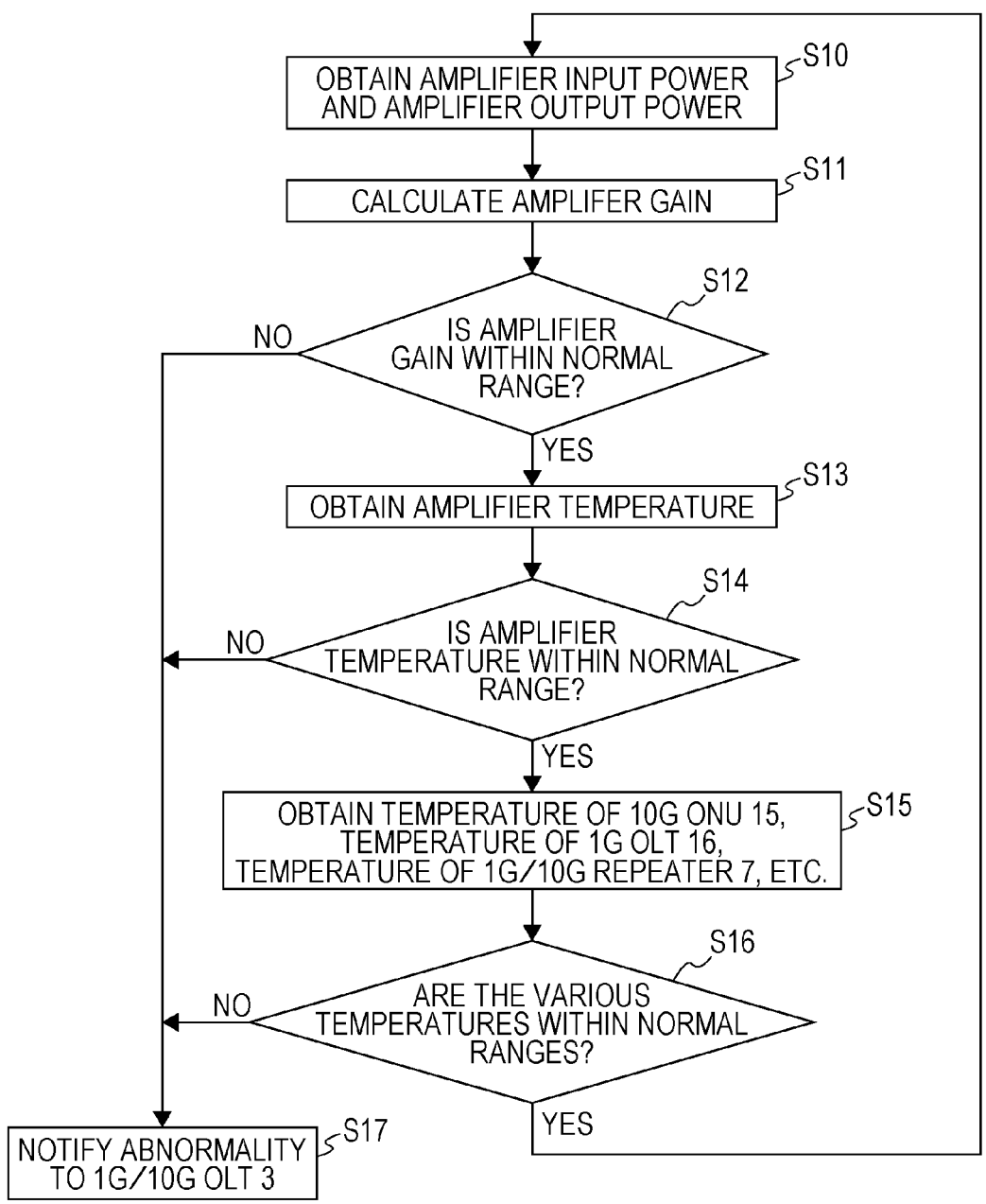
FIG. 5 is a flowchart describing an example of operations of the monitoring controller.

Now, an example of an operation of the monitoring controller 17 is depicted in FIG. 5. As exemplified in FIG. 5, first, the monitoring controller 17 obtains the input level (amplifier input power) and the output level (amplifier output power) of the optical amplifiers 12 and 23 (operation S10).

Based on the obtained amplifier input power and amplifier output power, the monitoring controller 17 calculates the amplification gain (amplifier gain) of the optical amplifiers 12 and 23 (operation S11), and determines whether or not the amplifier gain is within a predetermined normal range (operation S12). Now, in the case that the calculated amplification gain is determined to be not within a normal range (No in operation S12), the monitoring controller 17 notifies the abnormality of the optical amplifiers 12 and 23 to the 1G/10G OLT 3 via the 10G ONU 15 (operation S17).

On the other hand, in the case that the calculated amplifier gain is determined to be within a normal range (Yes in operation S12), the monitoring controller 17 obtains an operating temperature (amplifier temperature) from the thermistor within the optical amplifiers 12 and 23 (operation S13).

The monitoring controller 17 then determines whether or not the obtained amplifier temperature is within a predetermined normal range (operation S14). Now, in the case that the obtained amplifier temperature is determined to be not within a normal range (No in operation S14), the monitoring controller 17 notifies the abnormality of the optical amplifiers 12 and 23 to the 1G/10G OLT 3 (operation S17), via the 10G ONU 15. On the other hand, in the case that the obtained amplifier temperature is determined to be within a normal range (Yes in operation S14), the monitoring controller 17 obtains the operating temperature of the 10G ONU 15, operating temperature of the 1G OLT 16, or the operating temperature of the 1G/10G repeater 7 (operation S15).

The monitoring controller 17 determines whether or not each of the obtained temperatures are within a respective predetermined normal range (operation S16). Now, in the case that the obtained temperatures are determined to be not within a normal range (No in operation S16), the monitoring controller 17 notifies the abnormality of the 10G ONU 15, 1G OLT 16, or 1G/10G repeater 7 to the 1G/10G OLT 3 (operation S17), via the 10G ONU 15. On the other hand, in the case that the obtained temperatures are determined to be within a normal range (Yes in operation S16), the monitoring controller 17 returns the processing to the operation S10, and repeatedly performs each processing.

Note that the above-described operations of the monitoring controller 17 are only examples, and for example, the execution order of the processing of the operations S10 through S12, S13 through S14, and S15 through S16 are not limited to the examples depicted in FIG. 5. Also, a portion of the monitoring control may be omitted, and in this case, the corresponding processing, functions, and configuration may be omitted.

(1.3) Upstream Scheduling Control

Figure 6:
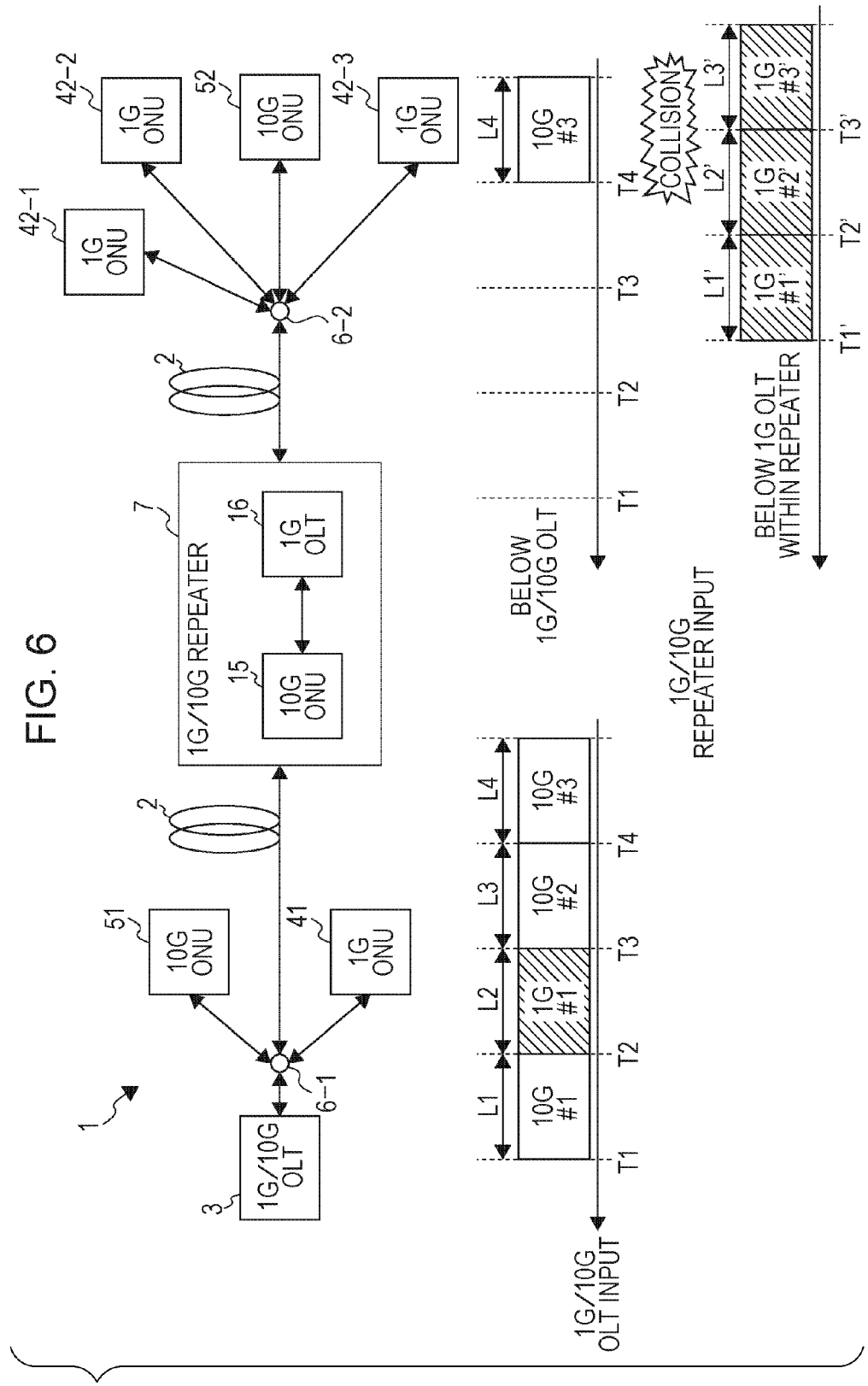
FIG. 6 is a diagram describing an example of upstream scheduling control.

Now, upstream scheduling control according to the present example will be described using the optical transmission system 1 illustrated in FIG. 6 as an example. With the optical transmission system 1 illustrated in FIG. 6, in the case of transmitting an upstream optical signal from the 10G ONUs 51, 15, and 52 and the 1G ONU 41 which are under the 1G/10G OLT 3, upstream scheduling control is performed by the 1G/10G OLT 3 is performed to avoid collisions of the upstream optical signals.

For example, the 1G/10G OLT 3 transmits beforehand, to each of the 10G ONU 51, 15, and 52, and the 1G ONU 41, Gate signals (Gate (T1, L1), Gate (T2, L2), Gate (T3, L3), Gate (T4, L4)) which include transmission allowable points-in-time T1, T2, T3, T4 of the upstream optical signal (e.g. T1<T2<T3<T4) and transmittable periods of time L1, L2, L3, L4 from the transmission allowable points-in-time.

The 10G ONUs 51, 15, and 52, and the 1G ONU 41 selectively receive the Gate signals directed to each respective self, and use the transmission allowable points-in-time and transmittable periods of time specified by each Gate signal to transmit the upstream optical signal to the 1G/10G OLT 3. For example, the 10G ONU 15 having received the Gate (T1, L1) transmits the 10G US (10G #1) to the 1G/10G OLT 3 during the time period from point-in-time T1 to point-in time (T1+L1).

Also, the 1G ONU 41 having received the Gate (T2, L2) transmits the 1G US (1G #2) to the 1G/10G OLT 3 during the time period from point-in-time T2 to point-in time (T2+L2). Similarly, the 10G ONU 15 having received the Gate (T3, L3) transmits the 10G US (10G #2) to the 1G/10G OLT 3 during the time period from point-in-time T3 to point-in time (T3+L3), and the 10G ONU 52 having received the Gate (T4, L4) transmits the 10G US (10G #3) to the 1G/10G OLT 3 during the time period from point-in-time T4 to point-in time (T4+L4).

Note that the 10G ONUs 51, 15, and 52, and the 1G ONU 41 notify the 1G/10G OLT 3 of the frame amount to be transmitted the next time, when transmitting the upstream optical signal. Thus, the 1G/10G OLT 3 performs upstream scheduling control in a manner that the upstream optical signals from the 10G ONUs 51, 15, and 52, and the 1G ONU 41 do not collide in the frame to be transmitted the next time.

Thus, the 1G/10G OLT 3 sets the T1 through T4 and L1 through L4 to perform scheduling control so that the transmission time periods in the 10G ONU 51, 15, and 52, and the 1G ONU 41 are not duplicated. Therefore, as exemplified in FIG. 6, at the input state of the 1G/10G OLT 3, the upstream optical signals transmitted from the 10G ONU 51, 15, and 52, and the 1G ONU 41 under the 1G/10G OLT 3 do not collide.

On the other hand, with the optical transmission system 1, in the case of transmitting upstream optical signals from the 1G ONUs 42-1 though 42-3 under the 1G OLT 16 to the 1G OLT 16, similarly upstream scheduling control is performed by the 1G OLT 16 so that the upstream optical signals do not collide. For example, the 1G OLT 16 transmits beforehand, to the 1G ONUs 42-1 through 42-3 under itself, Gate signals (Gate (T1', L1'), Gate (T2', L2'), Gate (T3', L3')) which include transmission allowable points-in-time T1', T2', T3' of the upstream optical signal (1G US) (e.g. T1'<T2'<T3') and transmittable periods of time L1', L2', L3' from the transmission allowable points-in-time.

The 1G ONUs 42-1 through 42-3 each selectively receive a Gate signal directed to itself, respectively, and use the transmission allowable points-in-time and transmittable periods of time specified by each Gate signal to transmit the upstream optical signal to the 1G OLT 16. For example, the 1G ONU 42-1 having received the Gate (T1', L1') transmits the 1G US (1G #1') to the 1G OLT 16 during the time period from point-in-time T1' to point-in time (T1'+L1').

Similarly, the 1G ONU 42-2 having received the Gate (T2', L2') transmits the 1G US (1G #2') to the 1G OLT 16 during the time period from point-in-time T2' to point-in time (T2'+L2'), and the 1G ONU 42-3 having received the Gate (T3', L3') transmits the 1G US (1G #3') to the 1G OLT 16 during the time period from point-in-time T3' to point-in time (T3'+L3'). Note that, similar to the 10G ONUs 51, 15, 52, and 1G ONU 41, the 1G ONUs 42-1 through 42-3 also notify the 1G OLT 16 of the frame amount to be transmitted the next time, when transmitting upstream optical signals. Thus, the 1G OLT 16 performs scheduling control in a manner that the upstream optical signals from the 1G ONUs 42-1 through 42-3 do not collide in the frame to be transmitted the next time.

As described above, the 1G OLT 16 sets the T1' through T3' and L1' through L3' to perform upstream scheduling control so that the transmission time periods in the 1G ONUs 42-1 through 42-3 are not duplicated. Therefore, as exemplified in FIG. 6, at the input state of the 1G OLT 16, the upstream optical signals transmitted from the 1G ONUs 42-1 through 42-3 do not collide.

However, the 10G ONU 52 which is on the downstream side of the 1G/10G repeater 7 is an ONU under the 1G/10G OLT 3, and the 1G ONUs 42-1 through 42-3 which are on the downstream side of the 1G/10G repeater 7 are ONUs under the 1G OLT 16 within the 1G/10G repeater 7, whereby the upstream optical signals are managed as upstream optical signals that belong to a separate PON system, and upstream scheduling control is independently performed.

Consequently, in the optical transmission path on the downstream side from the 1G/10G repeater 7, there is a possibility of the 10G US transmitted from the 10G ONU 52 and the 1G US transmitted from the 1G ONUs 42-1 through 42-3 may collide (overlap on the time axis). For example, in the example illustrated in FIG. 6, the transmission time period of the 10G US from the 10G ONU 52 under the 1G/10G OLT 3 (10G #3) and the transmission time periods of the 1G US from the 1G ONU 42-2 under the 1G OLT 16 (1G #2') and the 1G US from the 1G ONU 42-3 under the 1G OLT 16 (1G #3') overlap, and a collision of the upstream optical signals occurs at the input stage of the 1G OLT 16.

Thus, according to the present example, in order to avoid collisions of the upstream optical signals, for example the 1G OLT 16 receives information from the 1G/10G OLT 3 that relates to the transmission timing of the upstream optical signal directed to the 1G/10G OLT 3 via the 1G ONU 15. The 1G OLT 16 performs upstream scheduling control of the 1G US transmitted from the 1G ONUs 42-1 through 42-3 under the 1G OLT 16 so that the optical signal directed to the 1G/10G OLT 3 and the optical signal directed to the 1G OLT 16 do not collide, based on the received information.

Figure 7:
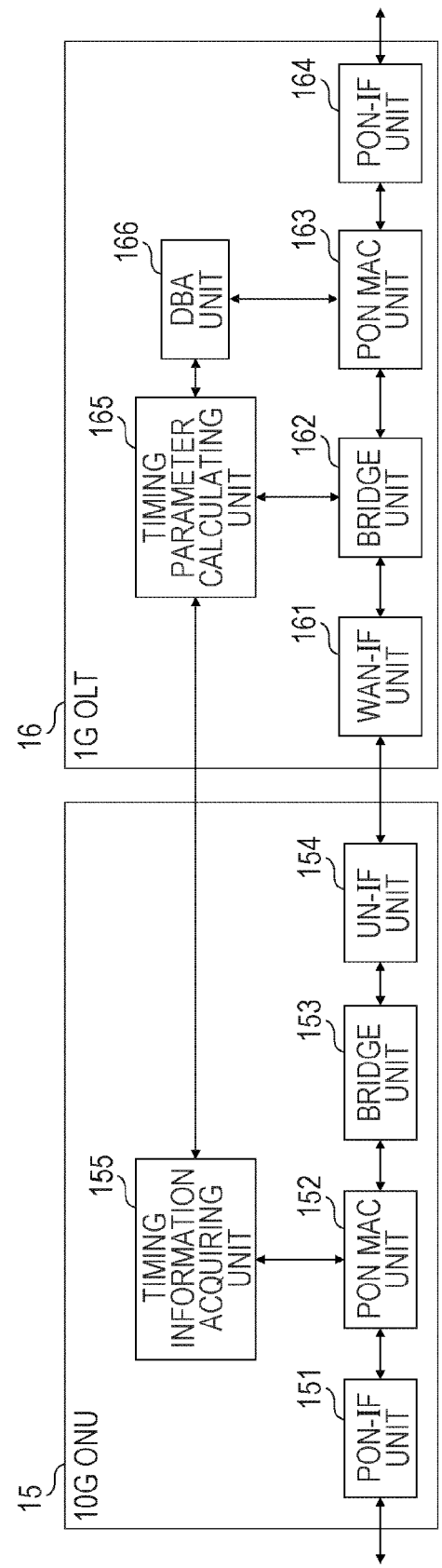
FIG. 7 is a diagram illustrating an example of configurations of a 10G ONU within a 1G/10G repeater and a 1G OLT within a 1G/10G repeater.

FIG. 7 illustrates configuration examples of the 10G ONU 15 and 1G OLT 16. As illustrated in FIG. 7, the 10G ONU 15 is provided a PON-IF unit 151, PON MAC (Media Access Control) unit 152, bridge unit 153, UN (User Network)-IF unit 154, and timing information acquiring unit 155.

The PON-IF unit 151 functions as a transmission/reception unit of the optical signal communicated by the optical transmission system 1 serving as a PON system. The PON-IF unit 15 converts the 10G DS transmitted from the 1G/10G OLT 3 to an electrical signal and transmit this to the PON MAC unit 152, and convert the electrical signal input from the 1G OLT 16 to a 10G US and transmit this to the 1G/10G OLT 3.

The PON MAC unit 152 extracts the control frame used by the optical transmission system 1 from the receiving signal, and provides the control frame to the transmission signal.

The bridge unit 153 converts the data signal input from the 1G OLT 16 to a predetermined data format used with the optical transmission system 1.

The UN-IF unit 154 is a network interface to connect with the user-side network.

The timing information acquiring unit 155 acquires, from the 1G/10G OLT 3, scheduling information which includes a later-described transmission time table, each ONU RTT (Round Trip Time) information, and so forth, and notifies the 1G OLT 16 of the scheduling information. Also, the timing information acquiring unit 155 notifies the 1G OLT 16 of point-in-time information to synchronize the points-in-time of the 10G ONU 15 and 1G OLT 16.

On the other hand, the 1G OLT 16 shown in FIG. 7 exemplifies a WAN (Wide Area Network)-IF unit 161, bridge unit 162, PON MAC unit 163, PON-IF unit 164, timing parameter calculating unit 165, and DBA (Dynamic Bandwidth Assignment) unit 166.

The WAN-IF 161 is a network interface to connect with a network of a communication service provider.

The bridge unit 162 converts the data signal input from the 10G ONU 15 to a predetermined data format used by the WAN side network.

The PON MAC unit 163 extracts the control frame used by the optical transmission system 1 from the receiving signal, and provides the control frame to the transmission signal.

The PON-IF unit 164 functions as a transmission/reception unit of the optical signal communicated with the optical transmission system 1 serving as a PON system. The PON-IF unit 164 converts the 1G US transmitted from the ONUs 42-1 through 42-3 under the 1G OLT 16 to an electrical signal and send this to the PON MAC unit 163, and converts the electrical signal input from the 10G ONU 15 into a 1G DS and send this to the ONUs 42-1 through 42-3.

Based on the scheduling information notified from the timing information acquiring unit 155, the timing parameter calculating unit 165 calculates the transmission time period in the ONU 52 under the 1G/10G OLT 3 which is situated on the downstream side from the 1G/10G repeater 7, and notifies this to the DBA unit 166. Also, the timing parameter calculating unit 165 synchronizes the points-in-time of the 10G ONU 15 and 1G OLT 16, based on the point-in-time information notified from the timing information acquiring unit 155.

The DBA unit 166 flexibly performs assignment of bandwidths (active bandwidth assignment) according to upstream traffic volume of the ONUs 42-1 through 42-3 under the 1G OLT 16, based on the transmission time periods in the ONU 52 under the 1G/10G OLT 3 situated on the downstream side from the 1G/10G repeater 7, which the timing parameter calculating unit 165 notifies. For example, the DBA unit 166 controls the transmission time periods of the ONUs 42-1 through 42-3 so that the transmission time period of the ONU 52 under the 1G/10G OLT 3 situated on the downstream side from the 1G/10G repeater 7 and the transmission time periods of the ONUs 42-1 through 42-3 under the 1G OLT 16 do not overlap.

Figure 8:
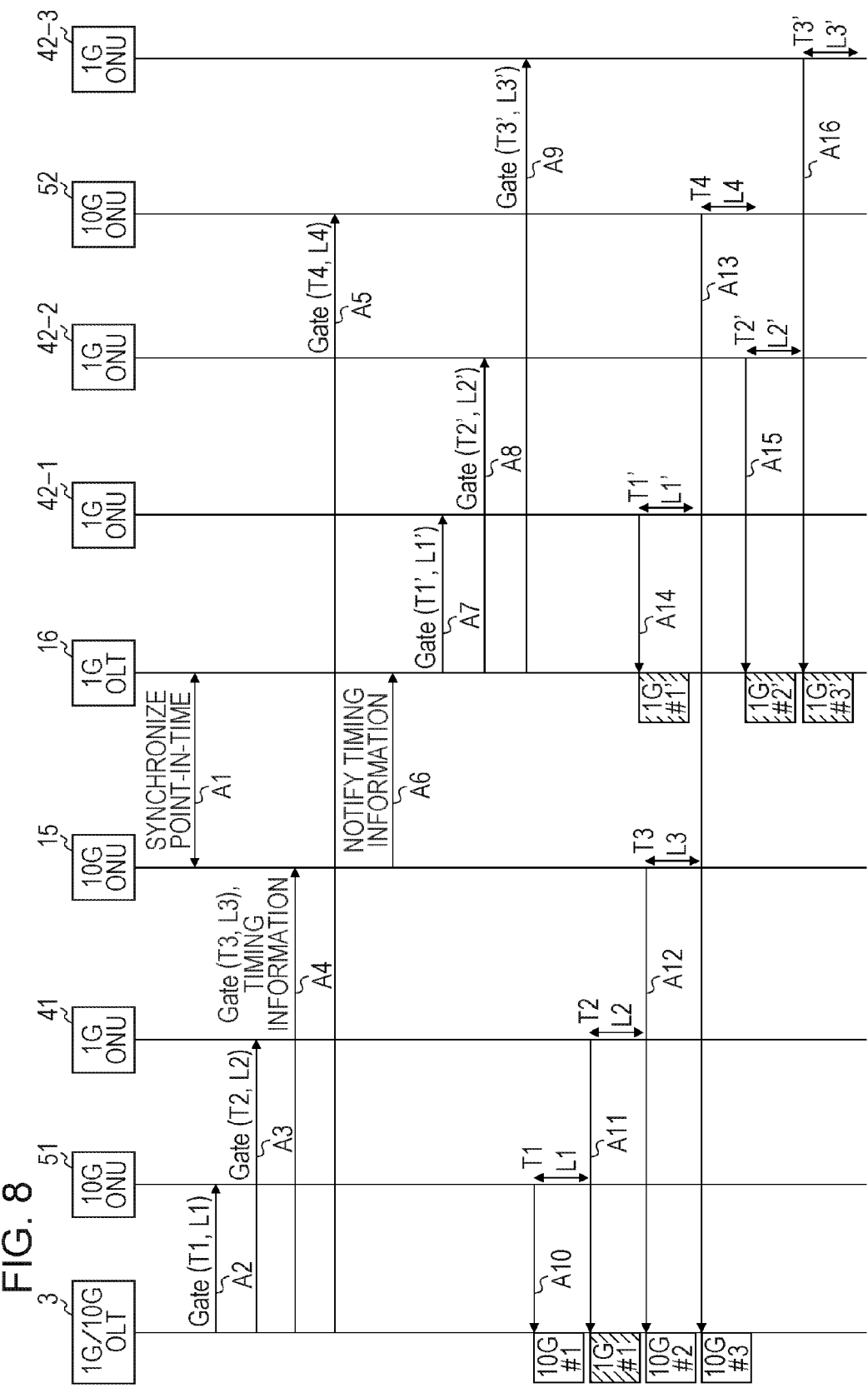
FIG. 8 is a diagram describing an example of upstream scheduling control.

An example of upstream scheduling control operations by the 1G OLT 16 is described using FIG. 8. Note that in the example depicted in FIG. 8, an example that does not take RTT into consideration is used to simplify the description, but this may not be interpreted restrictively. As exemplified in FIG. 8, first, point-in-time synchronization is performed between the 10G ONU 15 and 1G OLT 16 (operation A1).

Next, the 1G/10G OLT 3 transmits, to the 10G ONU 51, the Gate (T1, L1) that allows the upstream signal transmission during the period from point-in-time T1 to point-in-time (T1+L1) (operation A2). Similarly, the 1G/10G OLT 3 transmits, to the 1G ONU 41, the Gate (T2, L2) that allows the upstream signal transmission during the period from point-in-time T2 to point-in-time (T2+L2) (operation A3), transmits, to the 10G ONU 51, the Gate (T3, L3) that allows the upstream signal transmission during the period from point-in-time T3 to point-in-time (T3+L3) (operation A4), and transmits, to the 10G ONU 52, the Gate (T4, L4) that allows the upstream signal transmission during the period from point-in-time T4 to point-in-time (T4+L4) (operation A5).

The 10G ONU 15 extracts the Gate signals transmitted from the 1G/10G OLT 3, and notifies the 1G OLT 16 of the information obtained from the extraction results (operation A6).

Thus, the 1G OLT 16 comprehends the transmission periods of the ONUs 51, 41, 15, and 52 under the 1G/10G OLT, and controls the transmission period of the ONUs 42-1 through 42-3 so that the transmission period of the ONU 52 under the 1G/10G OLT 3 situated on the downstream side from the 1G/10G repeater 7 and the transmission periods of the ONUs 42-1 through 42-3 under the 1G OLT 16 do not overlap, for example.

For example, the 1G OLT 16 transmits, to the 1G ONU 42-1, the Gate (T1', L1') that allows the upstream signal transmission during the period from point-in-time T1' to point-in-time (T1'+L1') (operation A7), transmits, to the 1G ONU 42-2, the Gate (T2', L2') that allows the upstream signal transmission during the period from point-in-time T2' to point-in-time (T2'+L2') (operation A8), and transmits, to the 1G ONU 42-3, the Gate (T3', L3') that allows the upstream signal transmission during the period from point-in-time T3' to point-in-time (T3'+L3') (operation A9). Now, the transmission periods specified as Gate (T1', L1'), Gate (T2', L2'), and Gate (T3', L3') are set by the 1G OLT 16 in a transmission period that does not overlap with the transmission period specified at least as Gate (T4, L4).

The 10G ONU 51 having received the Gate (T1, L1) from the 1G/10G OLT 3 transmits an upstream optical signal (10G #1) during the period from point-in-time T1 to point-in-time (T1+L1) (operation A10), and the 1G ONU 41 having received the Gate (T2, L2) from the 1G/10G OLT 3 transmits an upstream optical signal (1G #1) during the period from point-in-time T2 to point-in-time (T2+L2) (operation A11).

Also, the 10G ONU 15 having received the Gate (T3, L3) from the 1G/10G OLT 3 transmits an upstream optical signal (10G #2) during the period from the point-in-time T3 to point-in-time (T3+L3) (operation A12), and the 10G ONU 52 having received the Gate (T4, L4) from the 1G/10G OLT 3 transmits an upstream optical signal (10G #3) during the period from point-in-time T4 to point-in-time (T4+L4) (operation A13).

On the other hand, the 1G ONU 42-1 having received the Gate (T1', L1') from the 1G OLT 16 transmits an upstream optical signal (1G#1') during the period from the point-intime T1' to the point-in-time (T1'+L1') (operation A14), and the 1G ONU 42-2 having received the Gate (T2', L2') from the 1G OLT 16 transmits an upstream optical signal (1G#2') during the period from the point-in-time T2' to the point-in-time (T2'+L2') (operation A15). Further, the 1G ONU 42-3 having received the Gate (T3', L3') from the 1G OLT 16 transmits an upstream optical signal (1G#3') during the period from the point-in-time T3' to the point-in-time (T3'+L3') (operation A16).

As described, according to the present example, the 1G OLT 16 performs upstream scheduling control of the ONUs 42-1 through 42-3 under itself, based on the upstream scheduling information in the 1G/10G OLT 3, whereby upstream optical signal collisions are reliably avoided.

Note that other than the above-described example, the 1G/10G OLT 3 may perform upstream scheduling control of the ONUs 51, 41, 15, and 52 under itself, based on scheduling information of the 1G OLT 16. In this case, the information relating to the upstream scheduling in the 1G OLT 16 may be transmitted to the 1G/10G OLT 3 via the 10G ONU 15.

(1.4) First Modification

Figure 9:
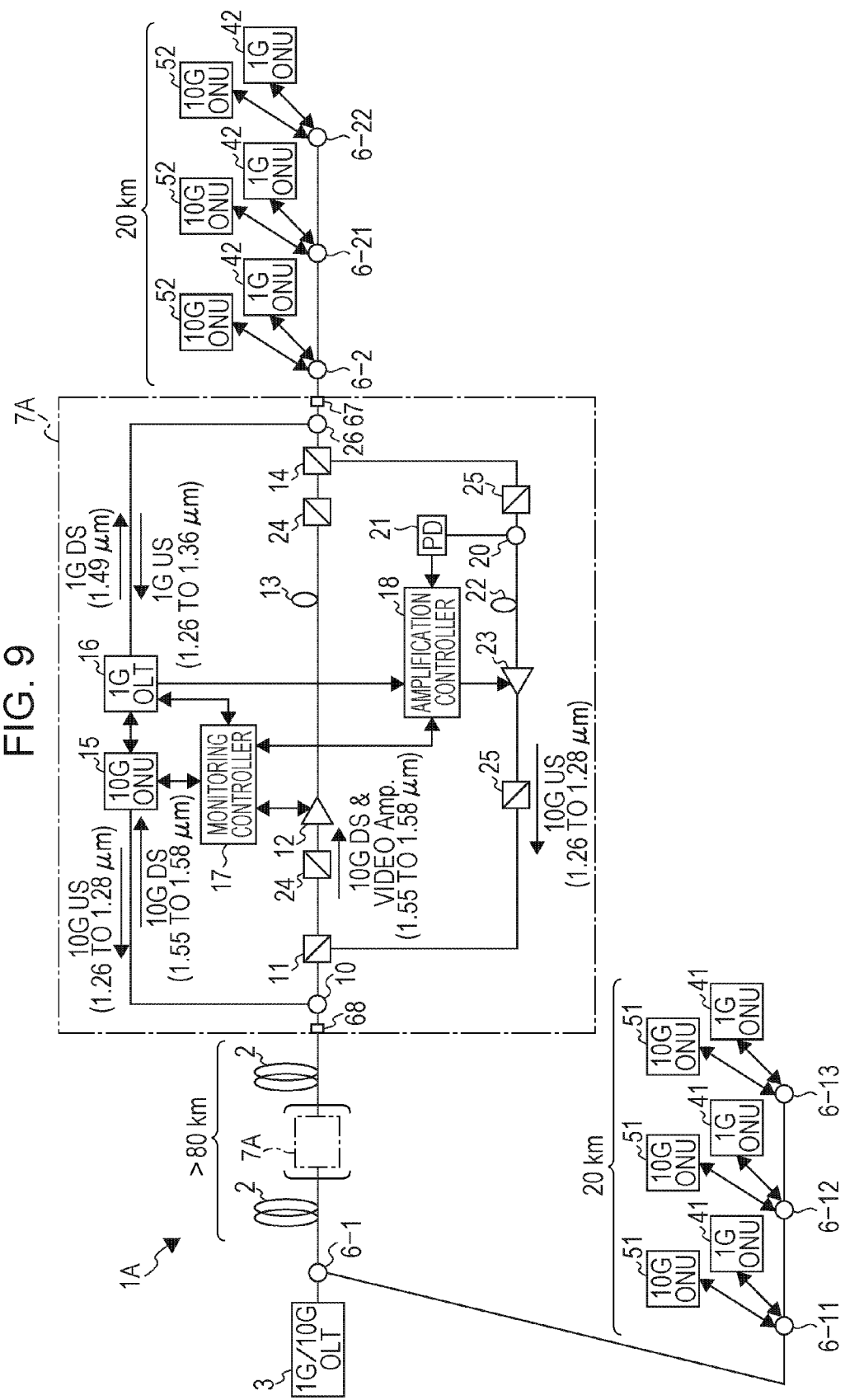
FIG. 9 is a diagram illustrating an example of configurations of an optical transmission system and 1G/10G repeater according to a first modification.

FIG. 9 illustrates an example of configurations of an optical transmission system 1A and 1G/10G repeater 7A relating to a first modification. Note that in FIG. 9, portions having the same reference numeral as portions denoted in FIG. 2 have similar configuration and functions as the portions denoted in FIG. 2, so the descriptions thereof will be omitted.

The 1G/10G repeater 7A exemplified in FIG. 9 has an optical coupler 26 provided thereto in the downstream path of the filter 14 so as to correspond to allowable loss (29 dB) between the OLT and ONU, which is stipulated in a PR 30 which is an EPON standard. The optical coupler 26 branches the upstream optical signal transmitted from the ONUs 52 and 42 the path toward the 1G OLT 16 and the path toward the filter 14. Note that the branching ratio of the optical coupler 26 is desirable to be set as approximately 3:7, for example, to branch more light toward the path toward the 1G OLT 16. Thus, loss of the 1G US within the 1G/10G repeater 7A is reduced.

Also, with the 1G/10G repeater 7A, a filter 24 is installed between the filter 11 and optical amplifier 12, and between the optical amplifier 12 and filter 14, respectively, so as to remove ASE components of the optical amplifier 12.

Figure 10:
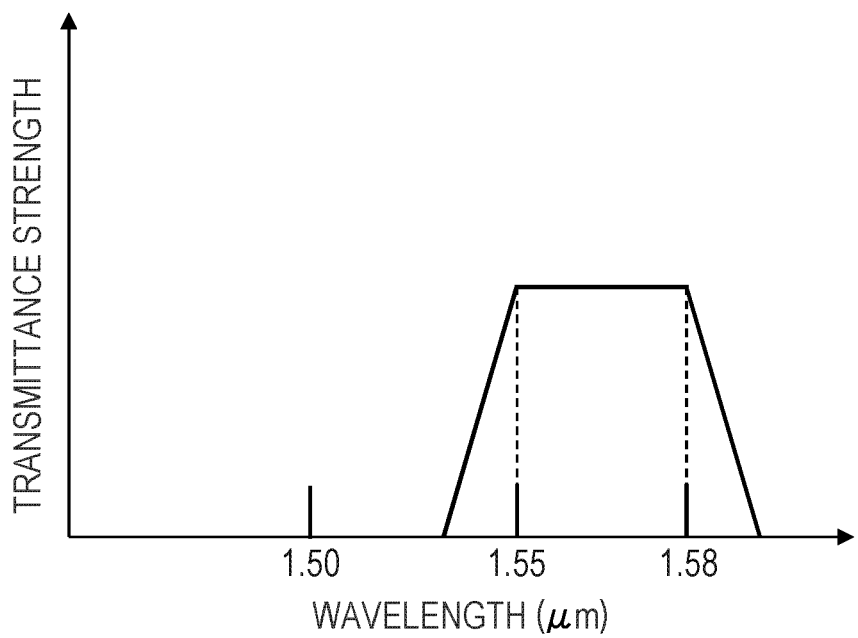
FIG. 10 is a diagram illustrating an example of transmission/reflection properties of a filter.

FIG. 10 illustrates an example of transmission/reflection properties of the filter 24. As exemplified in FIG. 10, the filter 24 allows an optical signal of 1.55 µm to 1.58 µm which is the 10G DS wavelength to pass through, while reflecting optical signals of any other wavelength. Note that in the example described in FIG. 10, the filter 24 is configured as a band pass filter, but the filter 24 may be configured as a high-pass filter that allows the 10G DS to pass through and reflects any other optical signals. Further, with the 1G/10G repeater 7A, a filter 25 is installed between the filter 14 and optical amplifier 23, and between the optical amplifier 23 and filter 11, respectively, so as to remove ASE components of the optical amplifier 23.

Figure 11:
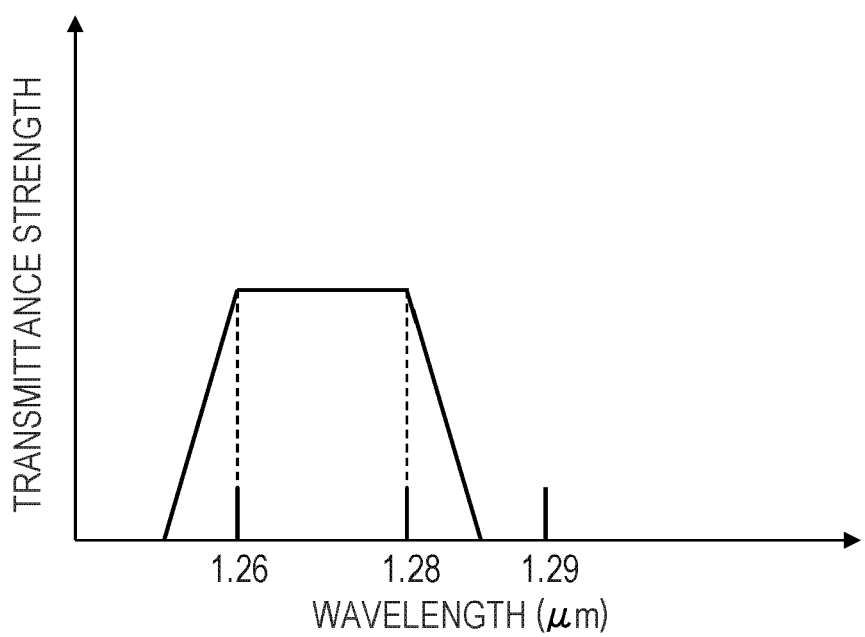
FIG. 11 is a diagram illustrating an example of transmission/reflection properties of a filter.

FIG. 11 illustrates an example of transmission/reflection properties of the filter 25. As exemplified in FIG. 11, the filter 25 allows an optical signal of 1.26 µm to 1.28 µm which is the 10G US wavelength to pass through, while reflecting optical signals of any other wavelength. Note that in the example described in FIG. 11, the filter 25 is configured as a band pass filter, but the filter 25 may be configured as a low-pass filter that allows the 10G US to pass through and reflects any other optical signals. Note that in the case that the ASE components of the optical amplifiers 12 and 23 are sufficiently small, the filters 24 and 25 may be omitted.

According to the present example, similar advantages are obtained as the embodiment described above, and also the ASE components of the optical amplifiers 12 and 23 are reliably removed and the reliability of the optical transmission system 1A is improved.

(1.5) Second Modification

Figure 12:
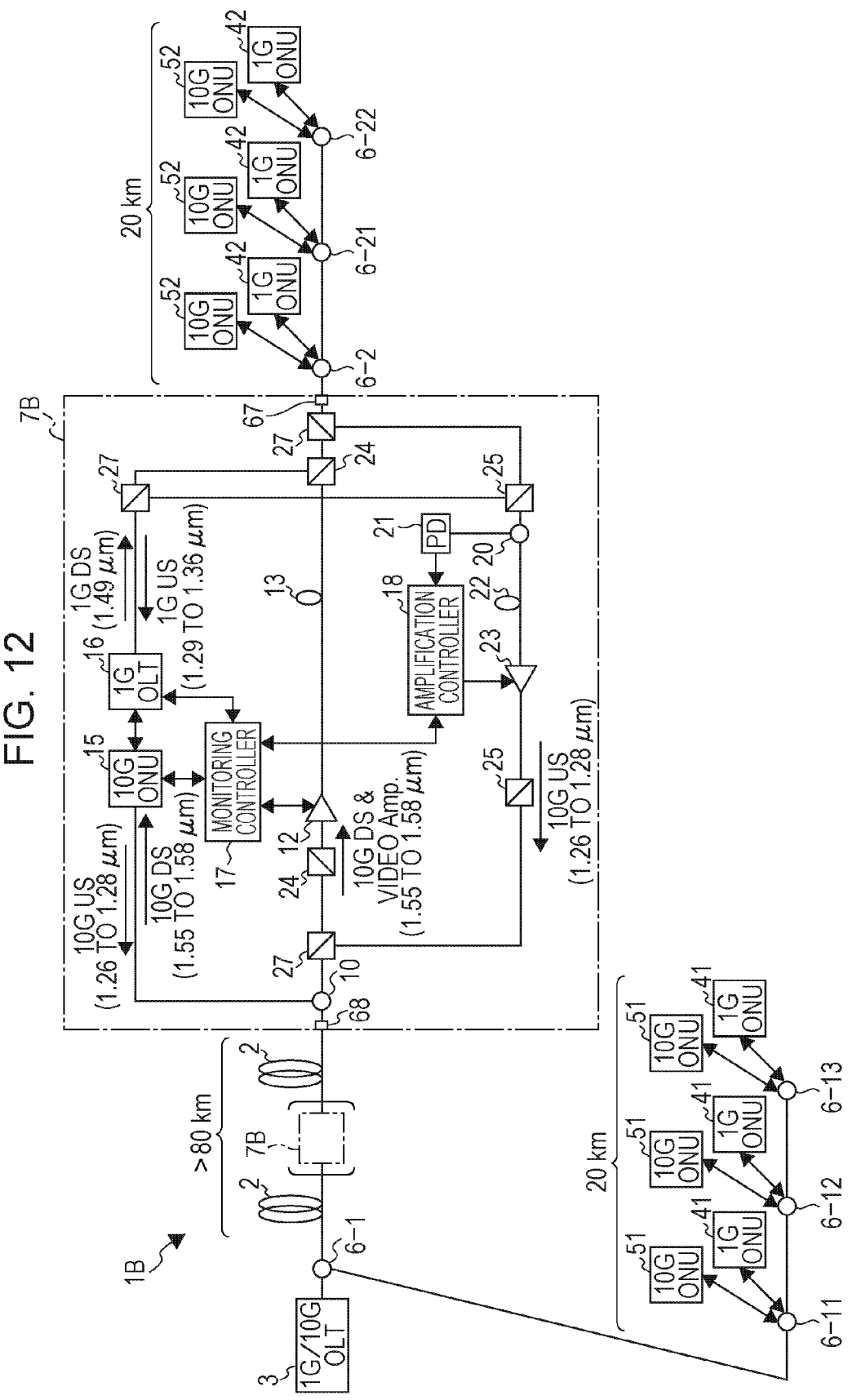
FIG. 12 is a diagram illustrating an example of configurations of an optical transmission system and 1G/10G repeater according to a second modification.

FIG. 12 illustrates an example of configurations of the optical transmission system 1B and 1G/10G repeater 7B according to a second modification. Note that in FIG. 12, portions having the same reference numeral as portions denoted in FIGS. 2 and 9 have similar configuration and functions as the portions denoted in FIGS. 2 and 9, so the descriptions thereof will be omitted.

In a PON system, in the case that the 1G US wavelength band is set appropriately in a range of 1.26 µm to 1.36 µm, there may be cases of setting the 1G US wavelength band to a wavelength band that does not overlap with a 10G US wavelength band. With the optical transmission system 1B exemplified in FIG. 12, a 1G US wavelength band is set to 1.29 µm to 1.36 µm, for example, and a 10G US wavelength band is set to 1.26 µm to 1.28 µm. That is to say, the 1G US wavelength band and the 10G US wavelength band are separated. Note that the 1G US wavelength band in the optical transmission system 1B is but an example which may not be used to interpret wavelength bands restrictively, and a wavelength band may be anything that at least does not overlap with the 10G US wavelength band.

Thus, in the case that the 1G US wavelength band and the 10G US wavelength band are separated, with the 1G/10G repeater 7B, the 1G US and 10G US are separated by the filter 25 which has the transmission/reflection properties exemplified in FIG. 11. Thus, as compared to the case of using the optical couplers 19 and 26, optical signal loss is reduced. Further, in the case of separating the 1G US and 10G US using the filter 25, the 1G US is not input into the optical amplifier 23, and only the 10G US is input. Therefore, if the amplifier control circuit 18 performs control to turn on the optical amplifier 23 only in the case that input to the optical amplifier 23 is detected by the optical detector 21, only the 10G US is optically amplified, whereby the on/off controls of the optical amplifier 23 is simplified.

Also, according to the present example, the 1G US wavelength band and the 10G US wavelength band are separated, whereby the 1G US from the 1G ONU 42 and the 10G US from the 10G ONU 52 do not collide. Accordingly, according to the present example, the configurations and functions for timing control described in FIGS. 6 through 8 are omitted, and the controls and configuration of the 1G/10G repeater 7B are simplified. Note that with the 1G/10G repeater 7B, a filter 27 is installed in the downstream path from the filter 24, between the 1G OLT 16 and filter 15, between the 1G OLT 16 and filter 24, and between the optical coupler 10 and optical amplifier 12.

Figure 13:
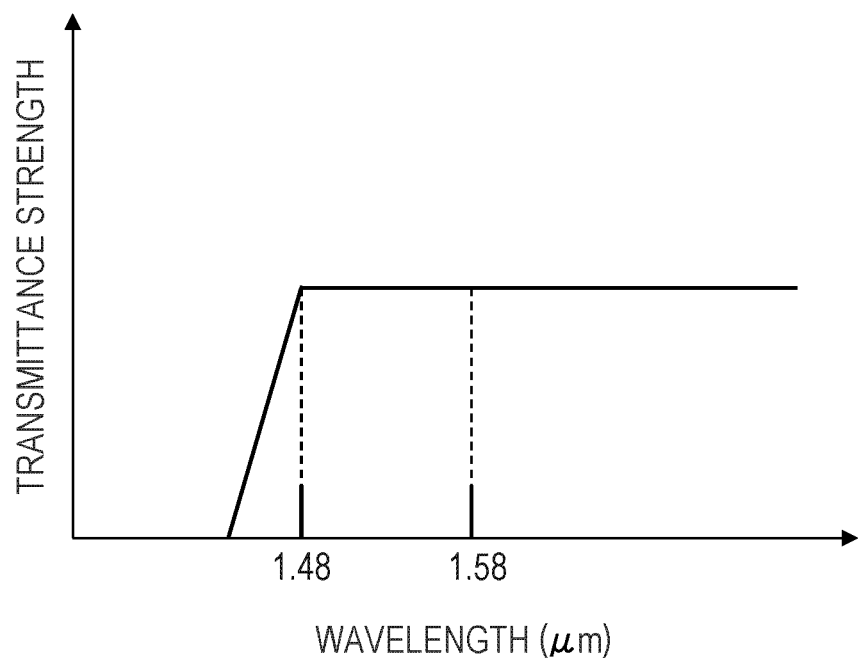
FIG. 13 is a diagram illustrating an example of transmission/reflection properties of a filter.

FIG. 13 illustrates an example of transmission/reflection properties of the filter 27. As exemplified in FIG. 13, the filter 27 allows the 1G DS and 10G DS to pass through, while reflecting the 1G US and 10G US. That is to say, the filter 27 functions as a filter to separate the upstream optical signal and downstream optical signal. Note that in the example illustrated in FIG. 13, the filter 27 is configured as a high-pass filter, but the filter 27 may also be configured as a band pass filter or low pass filter that separates the upstream optical signal and downstream optical signal. Also, in the case that the ASE components of the optical amplifiers 12 and 23 are sufficiently small, the filter 24 provided between the optical amplifier 12 and filter 27 and the filter 25 provided between the optical amplifier 23 and filter 27 may be omitted.

According to the present example, similar advantages are obtained as the above-described embodiment and modification, while suppressing optical signal loss of the 1G/10G repeater 7B.

(1.6) Third Modification

Figure 14:
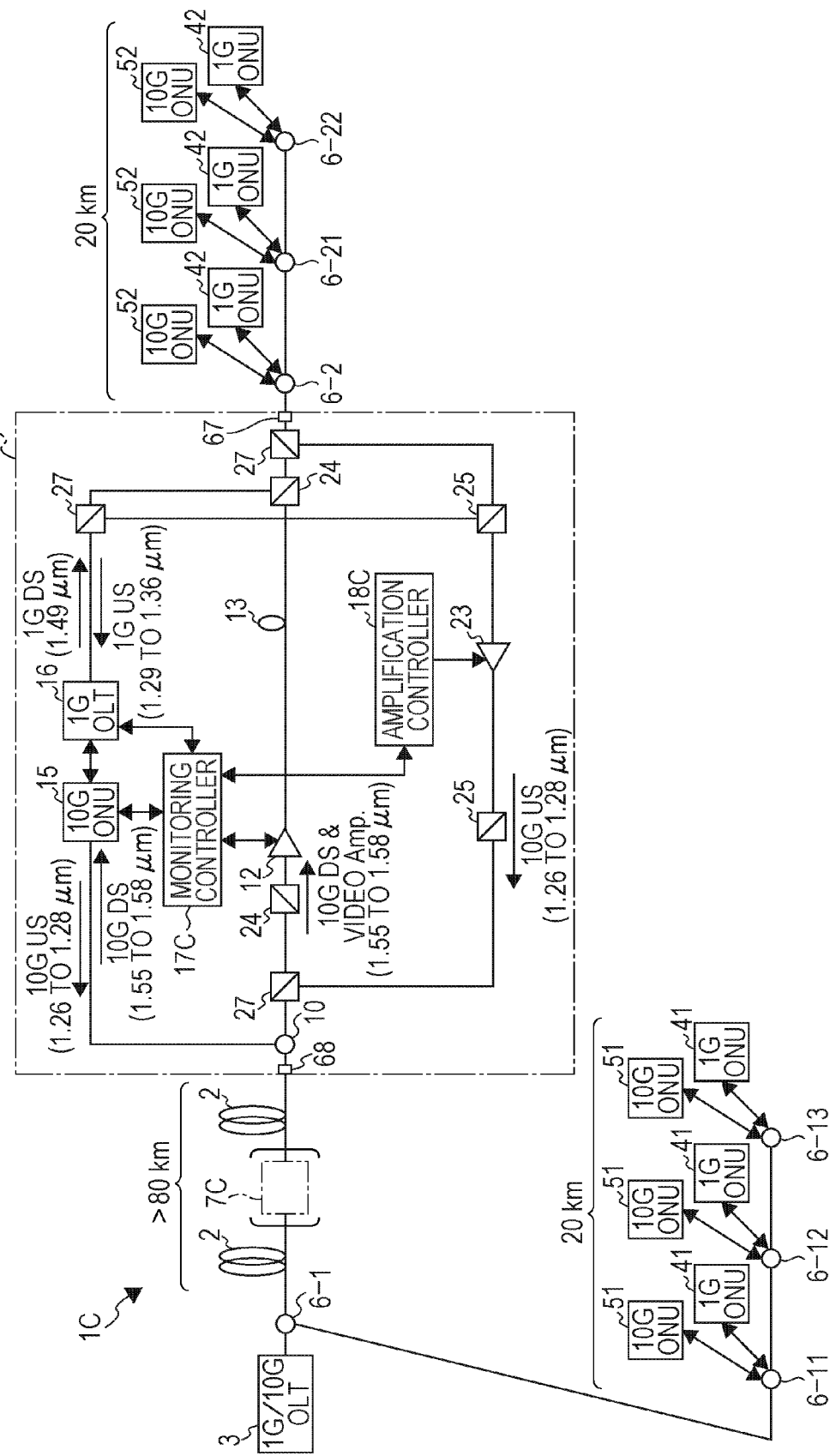
FIG. 14 is a diagram illustrating an example of configurations of an optical transmission system and 1G/10G repeater according to a third modification.

FIG. 14 illustrates an example of configurations of the optical transmission system 1C and 1G/10G repeater 7C relating to a third modification. Note that portions in FIG. 14 having the same reference numeral as portions denoted in FIGS. 2, 9, and 12 have similar configuration and functions as the portions denoted in FIGS. 2, 9, and 12 so the descriptions thereof will be omitted.

In the embodiment and modifications above, on/off control of the optical amplifier 23 is performed based on at least detection results from the optical detector 21, but according to the present example, on/off control of the optical amplifier 23 may be performed based on the scheduling information of the 10G US, for example. Note that the optical transmission system 1C and 1G/10G repeater 7C denoted in FIG. 14 are based on the configurations of the optical transmission system 1B and 1G/10G repeater 7B exemplified in FIG. 12, this may not be interpreted restrictively.

The monitoring controller 17C obtains information such as point-in-time that the 10G US transmitted from the 10G ONU 52 is input in the 1G/10G repeater 7 and signal length and so forth, based on the scheduling information received from the 1G/10G OLT 3 via the 10G ONU 15. Also, the monitoring controller 17C obtains information relating to the RTT of the ONUs 15 and 52 from the 1G/10G OLT 3 via the 10G ONU 15.

Also, the monitoring controller 17C calculates the timing for the 10G US from the ONU 52 to be input into the optical amplifier 23, based on the above-described obtained information. Based on the calculation results, the monitoring controller 17C creates or updates a control timetable which indicates the timing for the optical amplifier 23 to be controlled on and the timing to be controlled off. The control timetable created or updated by the monitoring controller 17C is notified to the amplifier control circuit 18C.

The amplifier control circuit 18C performs on/off control of the optical amplifier 23, based on the control timetable notified from the monitoring controller 17C. For example, the amplifier control circuit 18C controls the optical amplifier 23 so as to be turned on at a timing when the 10G US from the ONU 52 is input into the optical amplifier 23, while controlling the optical amplifier 23 so as to be turned off at all other times.

Figure 15:
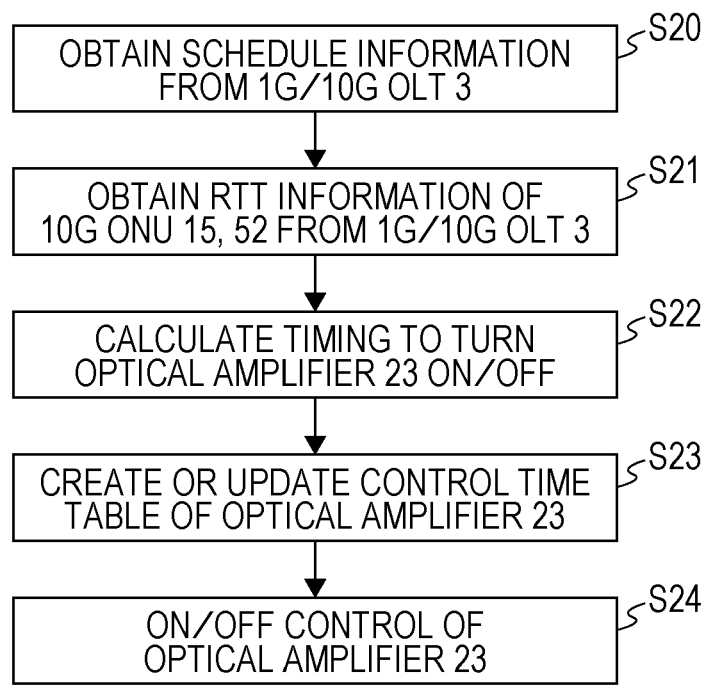
FIG. 15 is a flowchart illustrating an example of control operations of an optical amplifier according to a third modification.

An example of control operations of the present example is described in FIG. 15. As exemplified in FIG. 15, first, the monitoring controller 17C obtains scheduling information from the 1G/10G OLT 3 via the 10G ONU 15 provided to the 1G/10G repeater 7C (operation S20).

Additionally, the monitoring controller 17C obtains information relating to the RTT (RTT information) of the 10G ONUs 15 and 52 from the 1G/10G OLT 3, via the 10G ONU 15 provided to the 1G/10G repeater 7C (operation S21).

The monitoring controller 17C calculates the timing for the optical amplifier 23 to be controlled on and the timing to be controlled off, based on the scheduling information obtained in the operation S20 and the RTT information obtained in the operation S21 (operation S22).

Figure 16:
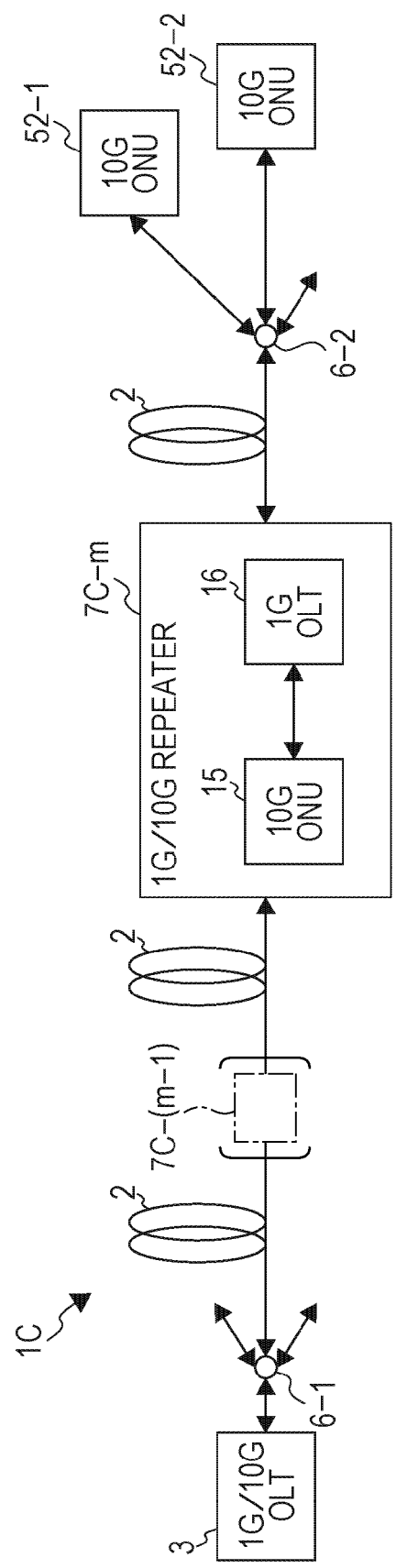
FIG. 16 is a diagram illustrating an example of configurations of an optical transmission system and 1G/10G repeater according to a third modification.
Figure 17:
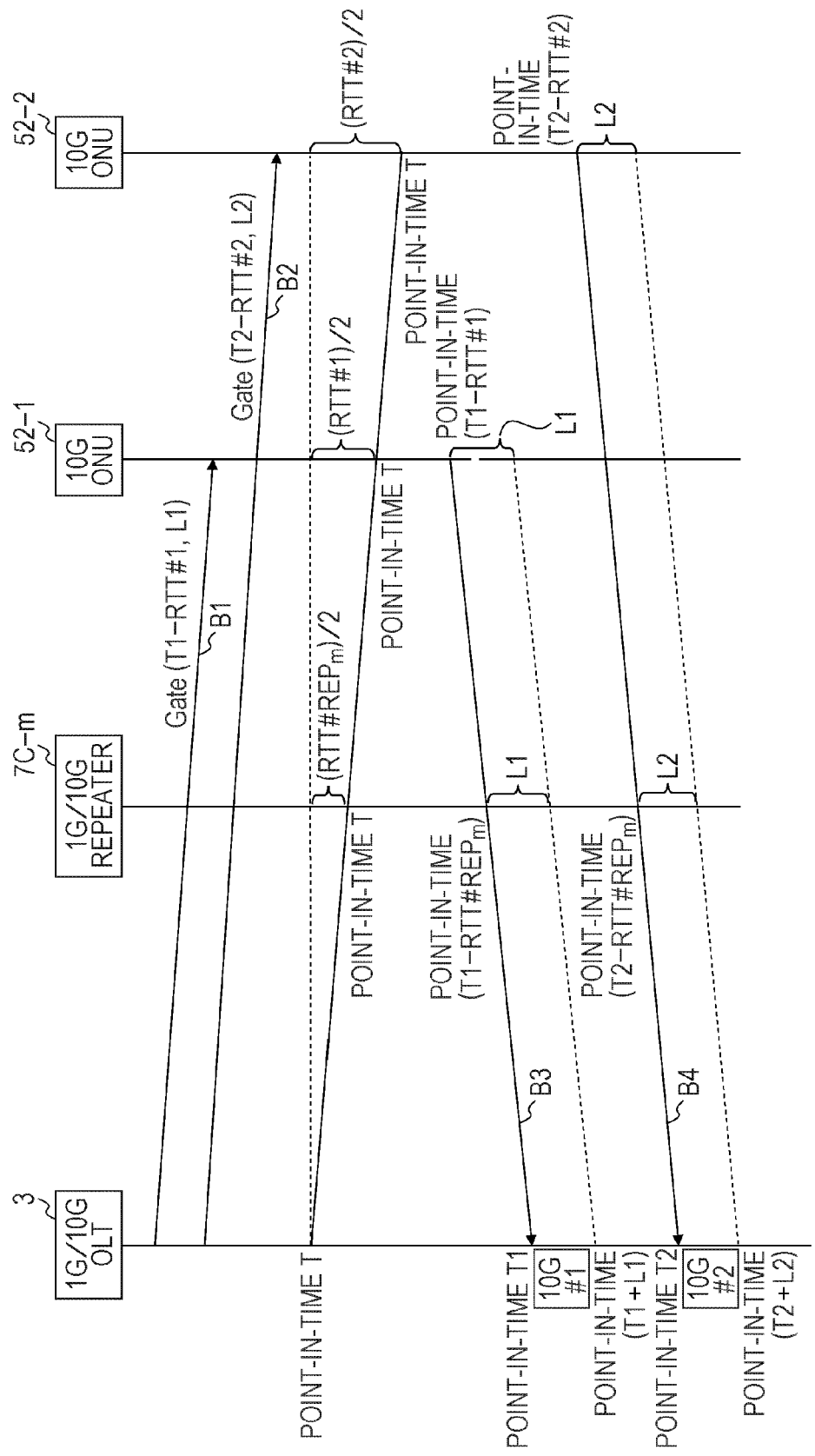
FIG. 17 is a diagram illustrating an example of upstream scheduling control.

An operation example of the timing calculating described above will be described using the optical transmission system 1C having 1G/10G repeaters 7C-1 through 7C-m (m is a natural number) as an example, as depicted in FIG. 16, for example. In the optical transmission system 1C exemplified in FIG. 16, first, a Gate (T1–RTT #1, L1) which allows upstream signal transmission during the period from point-in-time (T1–RTT #1) to point-in-time (T1–RTT #1+L1) is transmitted as to the 10G ONU 52-1 from the 1G/10G OLT 3, as illustrated in FIG. 17, for example (operation B1). Now, RTT #1 indicates the RTT between the 1G/10G OLT 3 and 10G ONU 52-1. Similarly, a Gate (T2–RTT #2, L2), which allows upstream signal transmission during the period from (T2–RTT #2) to point-in-time (T2–RTT #2+L2) is transmitted as to the 10G ONU 52-2 from the 1G/10G OLT 3, (operation B2). Now, RTT #2 indicates the RTT between the 1G/10G OLT 3 and 10G ONU 52-2. Also, a RTT exists between the 1G/10G OLT 3 and 1G/10G repeater 7C-m that is expressed as RTT#REP$_m$.

Thus, a predetermined RTT exists between the 1G/10G OLT 3, 1G/10G repeater 7C-m, and 10G ONUs 52-1 and 52-2. Therefore, even if the point-in-time synchronization is performed between the devices, the point-in-time that a clock within the 1G/10G OLT 3 indicates and the points-in-time that clocks within the devices 7C-m, 52-1, and 52-2 each result in shifts of (RTT#REP$_m$)/2, (RTT#1)/2, and (RTT#2)/2, respectively. Now, in order to enable absorbing the shifts herein beforehand, the 1G/10G OLT 3 transmits the Gate (T1–RTT #1, L1) and Gate (T2–RTT #2, L2), which take into consideration each RTT, as to the 10G ONUs 52-1 and 52-2. That is to say, the 10G ONU 52-1 having received the Gate (T1–RTT #1, L1) from the 1G/10G OLT 3 transmits the upstream optical signal (10G #1) during the period from the point-in-time (T1–RTT #1) to the point-in-time (T1-RTT #1+L1) (operation B3). Also, the 10G ONU 52-2 having received the Gate (T2–RTT #2, L2) from the 1G/10G OLT 3 transmits the upstream optical signal (10G #2) during the period from the point-in-time (T2–RTT #2) to the point-in-time (T2–RTT #2+L2) (operation B4).

Thus, the 1G/10G OLT 3 receives the upstream optical signal (10G #1) during the period of time from the point-in-time T1 to the point-in-time (T1+L1), and receives the upstream optical signal (10G #2) during the period of time from the point-in-time T2 to the point-in-time (T2+L2).

Now, the 10G #1 transmitted from the 10G ONU 52-1 is input into the 1G/10G repeater 7C-m during the period from point-in-time (T1–RTT#REP$_m$) to point-in-time (T1–RTT#REP$_m$+L1). Also, the 10G #2 transmitted from the 10G ONU 52-2 is input into the 1G/10G repeater 7C-m during the period from point-in-time (T2–RTT#REP$_m$) to point-in-time (T2–RTT#REP$_m$+L2).

Accordingly, with the 1G/10G repeater 7C-m, it is apparent that during the period from point-in-time (T1–RTT#REP$_m$) to point-in-time (T1–RTT#REP$_m$+L1) and during the period from point-in-time (T2–RTT#REP$_m$) to point-in-time (T2–RTT#REP$_m$+L2), the optical amplifier 23 is controlled so as to be turned on, and during other periods the optical amplifier 23 is controlled so as to be turned off. In other words, the 1G/10G repeater 7C-m controls the optical amplifier 23 so as to be on at a timing that is earlier than the upstream optical signal receiving point-in-time with the 1G/10G OLT 3 (e.g., T1, T2) by the amount of RTT#REP$_m$, while controlling the optical amplifier 23 so as to be off at a timing that is later than the start of the on control by the amount of the signal length. Thus, the 1G/10G repeater 7C-m controls the optical amplifier 23 so as to be turned on only while the 10G US is passing through.

According to the present example, the monitoring controller 17C creates or updates a control timetable that indicates the on/off control timing (time periods) such as exemplified in the "calculation information" in FIG. 18, calculated based on the "obtained information" (operation S23). The amplifier control circuit 18C controls the optical amplifier 23, based on the control timetable created or updated by the monitoring controller 17C (operation S24).

According to the present example, the configuration to detect the optical signal in the previous stage of the optical amplifier 23 and the optical delay line is omitted to further simplify the configuration of the 1G/10G repeater 7C, whereby the manufacturing cost of the 1G/10G repeater 7C is further reduced.

Figure 19:
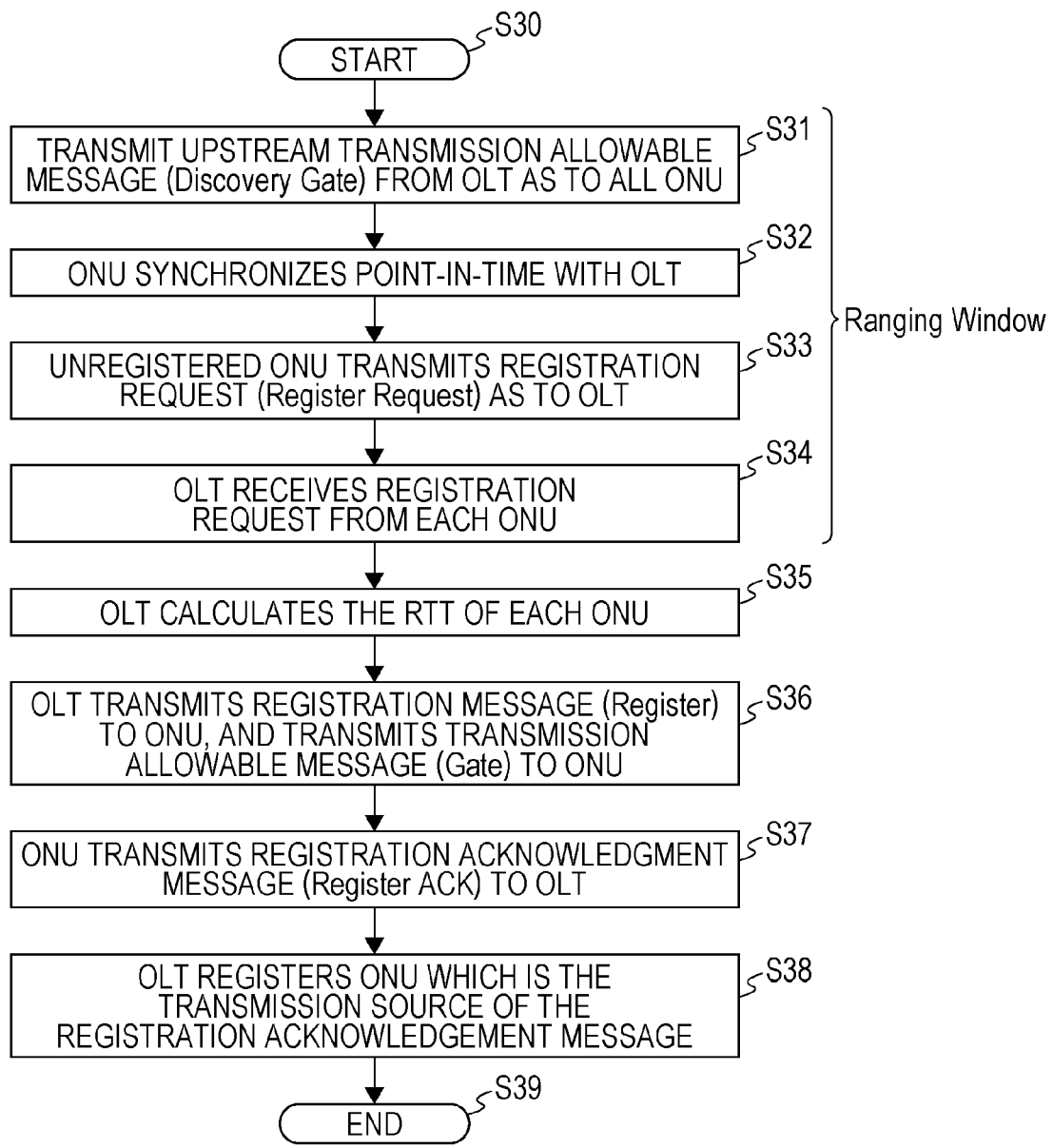
FIG. 19 is a flowchart describing an example of a Discovery process.

Now, normally with a PON system, a Discover process is performed by an OLT in order to detect the connected ONU. An example of a Discovery processing is described in FIG. 19. As exemplified in FIG. 19, first, upon the Discovery processing starting (operation S30), the OLT transmits, to all of the ONUs connected in the system, an upstream transmission allowable message (Discovery Gate) allowing transmission of upstream optical signals (operation S31). Information relating to local time of the OLT (e.g., transmission point-in-time $T_{local}$ of the upstream transmission allowable message), information relating to the point-in-time of allowing the ONU transmission, and so forth are included in the upstream transmission allowable message.

The ONUs having received an upstream transmission allowable message from the OLT synchronizes points-in-time with the OLT, respectively, based on the $T_{local}$ included in the upstream transmission allowable message (operation S32). An ONU not registered with the OLT transmits a registration request (Register Request) as to the OLT, after waiting a random amount of time from the transmission allowable point-in-time included in the upstream transmission allowable message (operation S33). This registration request includes information relating to the point-in-time that the unregistered ONU transmitted the registration request, for example.

The OLT receives the registration request from the unregistered ONU (operation S34). The OLT then calculates the transmission delay time between the OLT and ONU (RTT), based on the point-in-time that this registration request was received, and the transmission point-in-time at the unregistered ONU included in the registration request and the point-in-time that the OLT transmitted the upstream transmission allowable message ($T_{local}$) (operation S35). Thus, the OLT shifts and specifies the transmission allowable point-in-time described in the Gate signal directed to each ONU by the amount of the RTT corresponding to each ONU, as exemplified in FIG. 17.

The Next, the OLT assigns an identifier that identifies the ONU (LLID: Logical Link Identifier) as to the ONU that transmitted the registration request, and transmits the registration message (Register) with the LLID described therein to the ONU. Also, the OLT transmits the transmission allowable message (Gate signal) that allows transmission of a response as to the registration message to the ONU (operation S36). The transmission allowable message includes information relating to the transmission allowable period indicating the period wherein the ONU transmits a response.

The ONU transmits a registration acknowledgement message (Register ACK) to the OLT during the transmission allowable period specified by the transmission allowable message (operation S37). The OLT receives the registration acknowledgement message from the ONU, registers the ONU which is the transmission source of the registration acknowledgement message (operation S38), and ends the Discovery process (operation S39).

Now, the frequency that the Discovery process is performed is called a Discovery Gate interval. At times of normal operation, the Discovery Gate interval is approximately once every several hundred ms, for examples. Also, in the Discovery process, the time period from the transmission allowable message is transmitted from the OLT to the ONU until a response as to the transmission allowable message is received from the unregistered ONU is called a Ranging Window. A Ranging Window is 1 ms or less, for example. Accordingly, because of the Discovery process, service providing with the PON system is cut off once every several hundred ms and for a period of 1 ms or less.

Note that processing to assign an LLID as to the unregistered ONU and so forth is performed within a service time wherein traffic transfer is performed between the registered ONU and the OLT, after the end of the Ranging Window, for example.

Figure 20:
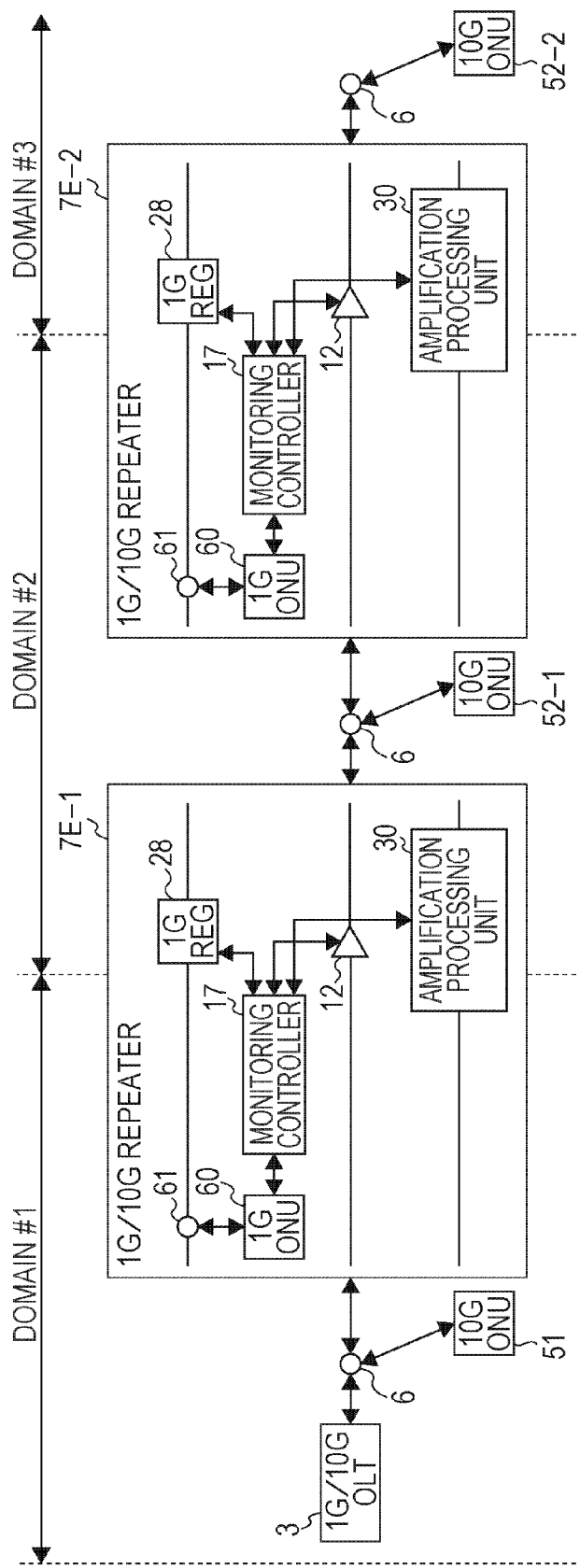
FIG. 20 is a schematic diagram describing a domain.

Now, in the case that an amplification processing unit 30 of a 1G/10G repeater 7E described later with FIG. 36 and so forth is in a mode to be operated by eternal control, and the optical transmission system is configured such that 1G/10G repeaters 7E-1 and 7E-2 are connected in a cascade, as illustrated in FIG. 20, creativity is warranted for the external control of the amplification processing unit 30. Note that the optical transmission system exemplified in FIG. 20 may have a 1G/10G repeater 7D as described later with FIG. 34 or a 1G/10G repeater 7G as described later with FIG. 39, instead of the 1G/10G repeater 7E.

The creativity as mentioned above is (A) through (C) as listed below. (A) The network comprehends to which domain the 10G ONU is connected. (B) Transmission time of the US signals of the 10G ONUs belonging to the same domain is summarized. (C) The 1G ONU summarizes the transmission time of the US signals without regard for domain.

For example, if the transmission time of the US signal of the 10G ONU 51 belonging to the domain #1 is summarized, the amplification processing unit 30 of the 1G/10G repeater 7E-1 and the amplification processing unit 30 of the 1G/10G repeater 7E-2 is kept turned off during such time. Also, the transmission time of the US signal of the 10G ONU 52-1 belonging to the domain #2 is summarized, during this time the amplification processing unit 30 of the 1G/10G repeater 7E-1 is kept turned on and the amplification processing unit 30 of the 1G/10G repeater 7E-2 is turned off, whereby the number of times of turning the amplification processing unit 30 on/off is reduced and transfer efficiency is improved. Also, during the transmission of the US signal of the 10G ONU 51 belonging to the domain #1, emission of stray light from the 1G/10G repeater 7E-1 and 1G/10G repeater 7E-2 is suppressed. Accordingly, in the example illustrated in FIG. 20, the US signal is summarized as domains #1, #2, and #3, for each of the 1G ONU 10G ONU.

Now, according to the present example, a Discovery process control as described below is performed, for example. In the example illustrated in FIG. 20, a 1G system performs a Discovery Process as to 1G ONUs belonging to all domains with a 1G regenerator 28 within the repeaters, even if the 1G/10G repeater 7E-1 and 7E-2 are connected in a two-stage cascade.

First, the amplifiers 12 and 30 of the 1G/10G repeaters 7E-1 and 7E-2 are controlled off, and a Discovery process is performed for the 10G ONUs (e.g. 10G ONU 51) and 1G ONU (e.g., 1G ONU 41) that are in a position nearer to the 1G/10G repeater 7E-1, and registers the ONUs to the 1G/10G OLT 3. For each ONU that is far from the 1G/10G repeaters 7E-1 and 7E-2, the Discovery process is performed in order. For example, in the case that multiple 1G/10G repeaters 7E are arrayed in multiple steps in straight lines, the Discovery process is repeated in order from the 1G/10G repeater 7E-1 which is the position nearest the 1G/10G OLT 3, whereby all of the ONUs are registered to the 1G/10G OLT 3.

The Discovery process control according to the present example will be described, using the optical transmission system exemplified in FIG. 20 as an example. According to the present example, first, the Discovery process is performed as to the ONUs within the region including the 10G ONU 51 which is directly connected without traveling via the 1G/10G OLT 3 and 1G/10G repeater 7E-1 (domain #1).

Next, the Discovery process is performed as to the ONUs within the region including the 10G ONU 52-1 which is connected via the 1G/10G OLT 3 and 1G/10G repeater 7E-1 (domain #2). Further, the Discovery process is performed as to the ONUs within the region including the 10G ONU 52-2 which is connected via the 1G/10G OLT 3 and 1G/10G repeaters 7E-1 and 7E-2 (domain #3).

Figure 21:
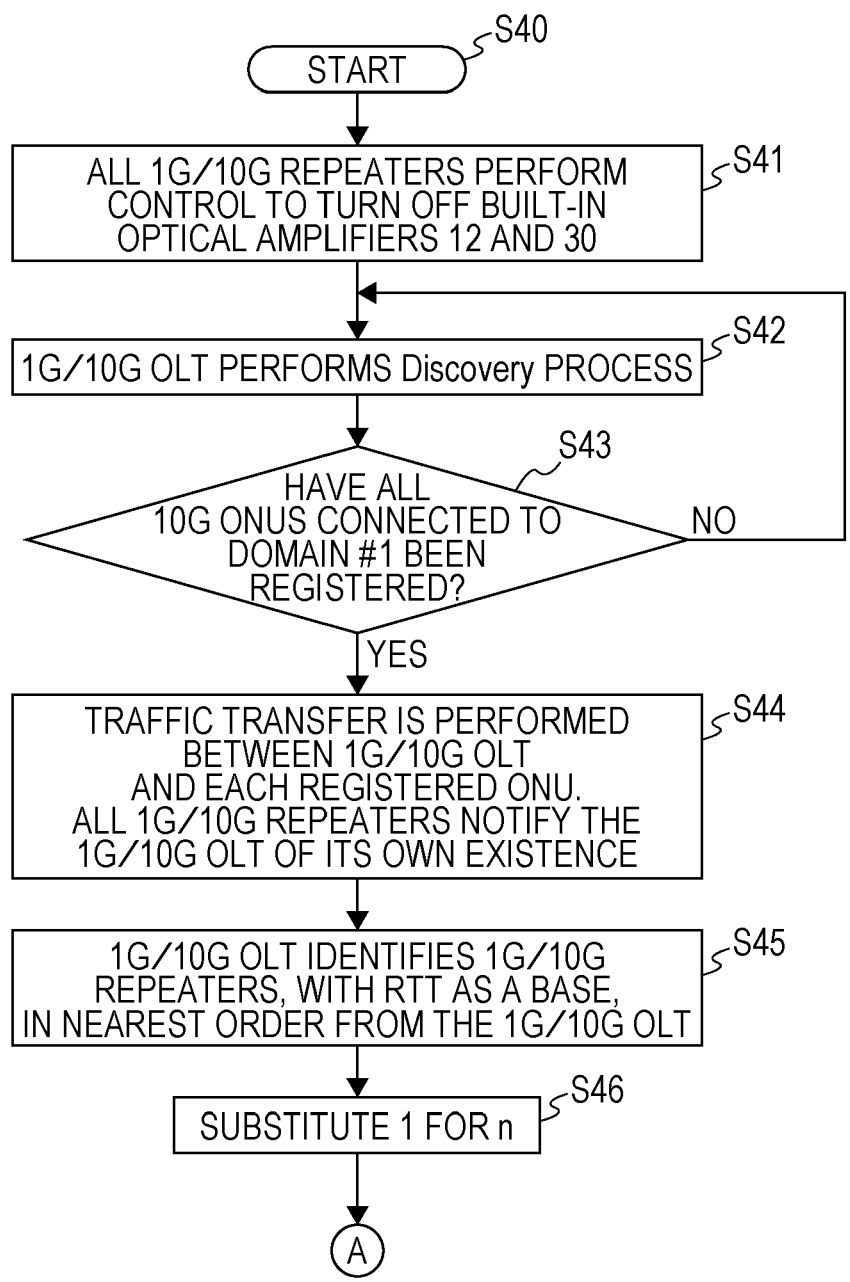
FIG. 21 is a flowchart illustrating an example of a Discovery process.

Specifically for example, as exemplified in FIG. 21, upon the Discovery process control according to the present example starting (operation S40), all of the 1G/10G repeaters 7E control the optical amplifiers 12 and 30 so as to be turned off (operation S41). Next, the 1G/10G OLT 3 performs the Discovery process (operation S42). Thus, first, the 1G ONUs in all domains and each 10G ONU 51 within the domain #1 are registered in 1G/10G OLT 3.

The 1G/10G OLT 3 determines whether or not the 1G ONUs in all domains and each 10G ONU 51 within the domain #1 have been registered in 1G/10G OLT 3 (operation S43). For example, in the Ranging Window (RW) in the Discovery Process above, determination is made that, at the point when the 1G/10G OLT 3 is no longer receiving registration requests, all 10G ONUs 51 within the domain #1 have been registered in the 1G/10G OLT 3. Note that in the case that registration requests are transmitted in the same time band from ONUs, collision of registration requests may occur and not be received at the 1G/10G OLT 3, so more precisely, determination is made that at the point when optical signals are no longer received in the RW, the 1G ONU in all domains and all 10G ONUs 51 within the domain #1 have been registered in the 1G/10G OLT 3.

Now, in the case determination is made that all 10G ONUs 51 within the domain #1 have not been registered in the 1G/10G OLT 3 (No in Operation S43), the 1G/10G OLT 3 transitions the processing to operation S42, and continues the Discovery process. On the other hand, in the case determination is made that all 10G ONUs 51 within the domain #1 have been registered in the 1G/10G OLT 3 (Yes in Operation S43), the 1G/10G OLT 3 performs transmission/reception of the optical signals with the registered ONUs. At this time, all of the 1G/10G repeaters 7E control the built-in optical amplifiers 12 30 so as to be turned off, and notify the 1G/10G OLT 3 of the existence of themselves (operation S44).

The 1G/10G OLT 3 identifies the 1G/10G repeaters 7E from the order nearest itself, based on the RTT calculated based on the above-mentioned notification. Also, the 1G/10G OLT 3 identifies the number of 1G/10G repeaters 7E connected to itself, and as appropriate, assigns a unique number such as #1, #2, . . . , from the side nearest itself, and notifies the 1G/10G repeaters 7E of the assigned numbers (operation S45). Now, the 1G/10G OLT 3 substitutes 1 for the control parameter n (operation S46), and transitions the processing to "A".

Figure 22:
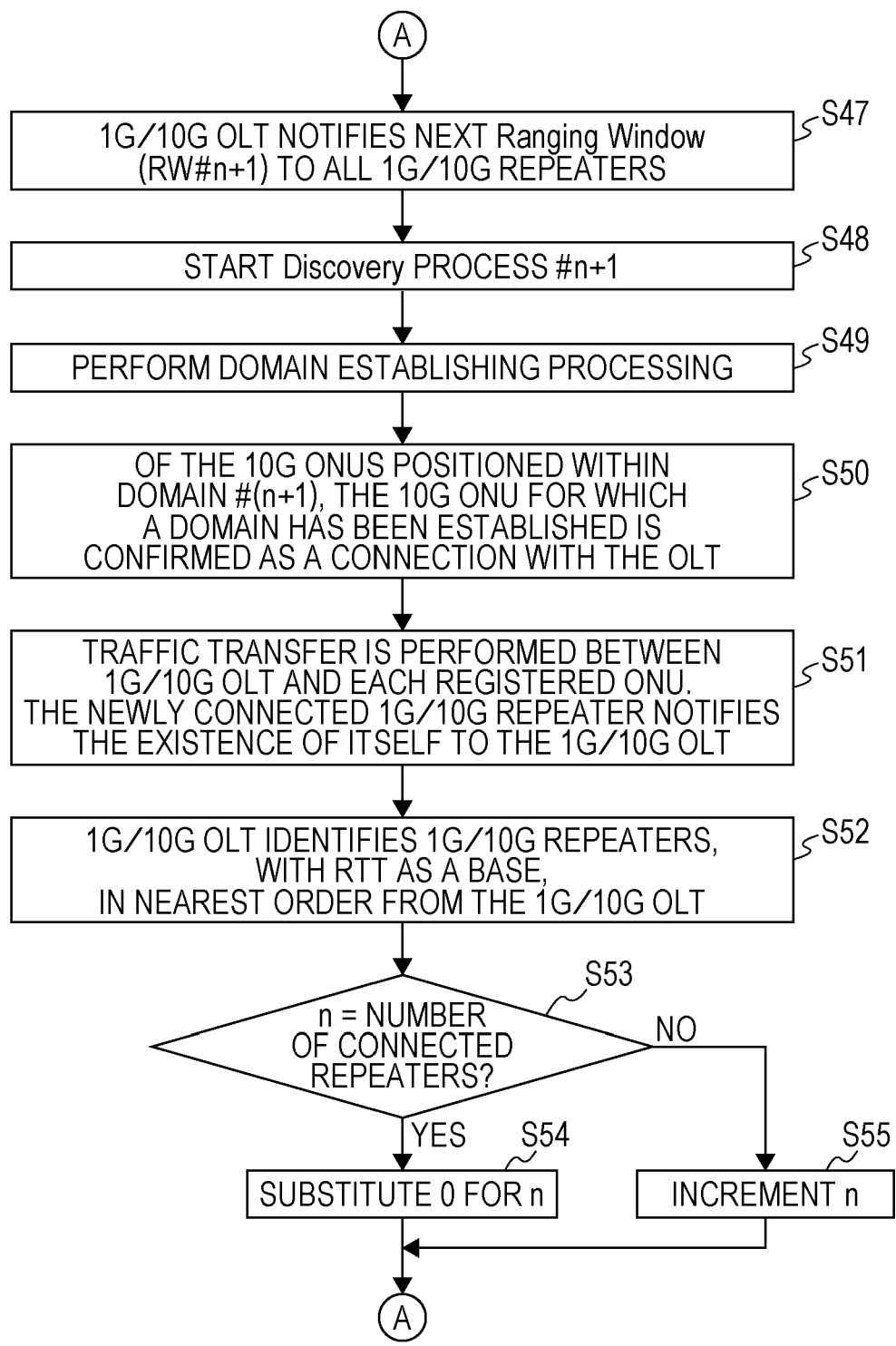
FIG. 22 is a flowchart illustrating an example of a Discovery process.

Next, as exemplified in FIG. 22, the 1G/10G OLT 3 notifies all of the 1G/10G repeaters 7E of the Ranging Window in the next Discovery process (RW #(n+1)) (operation S47), and starts the next Discovery process # (n+1) (operation S48). Note that at this point in time, repeaters that are newly connected to the system and unregistered ONUs remain unregistered.

In the Discovery process # (n+1), the 10G ONUs 52-1 within the domain # (n+1) and newly connected 1G ONUs are subject to registration processing. Upon RW #(n+1) starting, the 1G/10G repeater 7E-m (m is from 1 to n) controls the amplifiers 12 and 30 so as to be turned on at a timing earlier than RW # (n+1), and upon RW #(n+1) ending, controls the amplifiers 12 30 so as to be turned off.

Now, the 1G/10G OLT 3 performs domain establishing processing as to the ONUs within the domains (operation S49). The domain establishing processing is processing to establish that an ONU in a domain #n actually exists in domain # (n+1). For example, in the Ranging Window as to domain #3 (RW #(3)), if the 10G ONU is newly connected to the domain #1, the newly connected 10G ONU also is to submit a registration request to the 1G/10G OLT 3. Consequently, the 1G/10G OLT 3 erroneously confirms the domain wherein the 10G ONU exists, whereby domain establishing processing is performed to avoid such situations.

First, as preprocessing of domain establishing processing, domain identifying processing is performed. In domain identifying processing, the 1G/10G OLT 3 identifies which domain the 10G ONUs belong to, according to which timings the registration requests from the ONUs are received. For example, the 10G ONU having received an upstream transmission allowable message from the 1G/10G OLT 3 transmits the registration request to the 1G/10G OLT 3.

As exemplified in FIG. 20, in the case that there are three domains, in RW #(1) a registration request is transmitted from a 10G ONU 51 within domain #1. Also, in RW #(2), a registration request is transmitted from a 10G ONU 51 within domain #1 and from 10G ONU 52-1 within domain #2. Further, in RW #(3), a registration request is transmitted from a 10G ONU 51 within domain #1 and from a 10G ONU 52-1 within domain #2, and from a 10G ONU 52-2 within domain #3.

FIG. 23 describes an example of correlation between the RWs and the registration request receiving situation within the domains. As exemplified in FIG. 23, the 1G/10G OLT 3 receives registration requests from the 10G ONU within domain #1 in all of RW #1 through RW #3. Also, the 1G/10G OLT 3 receives registration requests from the 10G ONU within domain #2 in RW #2 and RW #3, and the 1G/10G OLT 3 receives registration requests from the 10G ONU within domain #2 in RW #3.

For example, in RW #1 and RW #2, the optical amplifier 30 of the 1G/10G repeater 7E-2 within domain #3 is controlled so as to be turned off, whereby registration requests from the 10G ONU within domain #3 are not received by the 1G/10G OLT 3 in RW #1 and RW #2. Similarly, in RW #1, the optical amplifier 30 of the 1G/10G repeater 7E-1 within domain #2 is controlled so as to be turned off, whereby registration requests from the 10G ONU within domain #2 are not received by the 1G/10G OLT 3 in RW #1.

Thus, according to the registration request receiving situation in the RWs, the 1G/10G OLT 3 identifies the domain to which each ONU belongs. Note that in each RW, registration requests from multiple ONUs may collide. In such a case, the 1G/10G OLT 3 may determine this as "no registration request", and domain identifying processing may not be performed normally. Thus, in the case that a registration request collision is detected, the 1G/10G OLT 3 may, for example, execute again the Discovery process and domain identifying process for all of the domains.

Figure 24:
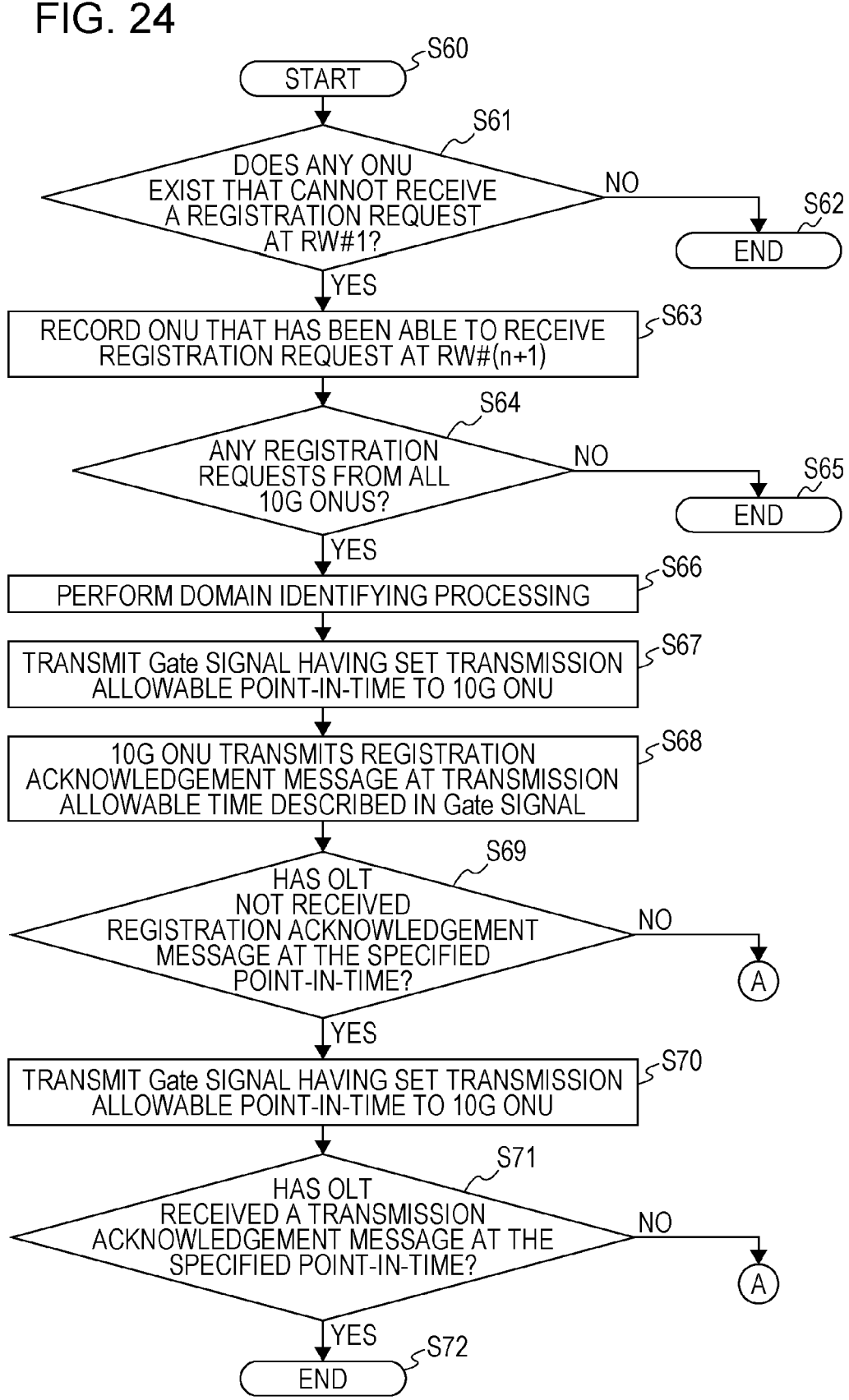
FIG. 24 is a diagram describing domain establishing processing.

Upon the domain to which each 10G ONU belongs having been identified by the domain identifying processing, the 1G/10G OLT 3 performs domain establishing processing. For example, as described in FIG. 24, upon the domain establishing processing having been started (operation S60), the 1G/10G OLT 3 determines whether any 10G ONU exist for which a registration request is not received in RW #1 (operation S61).

Now, in the case determination is made that there are no ONUs for which a registration request is not received in RW #1 (No in operation S60), a newly registering 10G ONU only exists in domain #1, whereby the 1G/10G OLT 3 omits the domain identifying processing and domain establishing processing, and ends the processing (operation S62).

On the other hand, in the case determination is made that an ONU for which a registration request is not received in RW #1 does exist (Yes in operation S60), multiple domains exist, so the 1G/10G OLT 3 records the ONUs for which a registration request has been received at each RW #(n+1), and creates or updates a table such as depicted in FIG. 23 (operation S63).

The 1G/10G OLT 3 determines whether or not registration requests have been received from all of the 10G ONUs existing in the system (operation S64). For example, the 1G/10G OLT 3 determines whether or not registration requests have been received from all of the 10G ONUs existing in the system, based on whether registration requests have been received from all of the ONUs that transmitted a transmission allowable message.

Now, in the case determination is made that registration requests have not been received from all of the 10G ONUs existing in the system (No in operation S64), the 1G/10G OLT 3 ends the processing (operation S65). On the other hand, in the case determination is made that registration requests have been received from all of the 10G ONUs existing in the system (Yes in operation S64), the 1G/10G OLT 3 performs the above-described domain identifying processing (operation S66).

Next, the 1G/10G OLT 3 assigns a new LLID to the ONU from which there has been a registration request, transmits a registration message with the LLID written therein, and transmits to each ONU a Gate message with the allowable point-in-time for the ONUs to transmit a response to the registration message written therein. In this event, a transmission allowable point-in-time is set as to the ONU having been identified as belonging to domain #n, for example, so that the registration acknowledgment message is transmitted at the timing when the optical amplifier 30 of the 1G/10G repeater 7E belonging to domain #(n−1) is controlled so as to be turned off (operation S67).

For example, the 1G/10G OLT 3 intentionally transmits a transmission allowable message to the ONU 52-2 identified as belonging to domain #3, set so that a registration acknowledgement message is transmitted at the timing when the optical amplifier 30 of the 1G/10G repeater 7E-2 is controlled so as to be turned off.

The ONU receiving the registration message from the 1G/10G OLT 3 transmits a registration acknowledgement message at a transmission allowable time described in the Gate signal received together (operation S68).

The 1G/10G OLT 3 determines whether or not the registration acknowledgement message has been able to be received or not at the point-in-time specified in the transmission allowable message (operation S69). For example, in the case that the ONU 52-2 identified as belonging to domain #3 is existing in domain #3, the 1G/10G OLT 3 is likely to not be able to receive the registration acknowledgment message. In the case of not being able to receive the registration acknowledgment message (Yes in operation S69), the 1G/10G OLT 3 determines that the domain identification above is correct.

The 1G/10G OLT 3 transmits a transmission allowable message with a set transmission allowable point-in-time to the ONU identified as belonging to the domain #n, so that the registration acknowledgement message is transmitted at a timing when the optical amplifier 30 of the 1G/10G repeater 7E belonging to domain #(n−1) is controlled so as to be turned on (operation S70). The 1G/10G OLT 3 determines whether the registration acknowledgement message has been received at the point-in-time specified in the transmission allowable message (operation S71), and in the case it has been received (Yes in operation S71), assumes that the domain identifying results are correct, and ends the domain establishing processing (operation S72).

On the other hand, in the case that the registration acknowledgement message is received in operation S69 (No in operation S69), the above domain identification is considered to be an error, the processing is transitioned to "A", and domain identifying processing and domain establishing processing are performed again. Also, in operation S71, in the case that the registration acknowledgement message is not received (No in operation S71), the above domain identification is considered to be an error, the processing is transitioned to "A", and domain identifying processing and domain establishing processing are performed again.

Note that 1G/10G OLT 3 counts the number of times of determining that the domain identifying processing results have been in error, and in the case that the count result is at a predetermined number of times or higher, information that the domain has not been established as to the ONU in question may be notified to a network administrator.

Returning to FIG. 22, of the 10G ONUs situated within a domain #(n+1), the 1G/10G OLT 3 registers the ONUs for which a domain has been established by the domain establishing processing, and establishes a connection (operation S50).

Traffic transferring is performed between the 1G/10G OLT 3 and each registered ONU. The 1G/10G repeater 7E newly connected to the system notifies the existence of itself to the 1G/10G OLT 3 within the communication time herein (operation S51). Also, the 1G/10G OLT 3 identifies the 1G/10G repeaters 7E in order closest to itself, based on the RTT calculated based on the above notification. Also, the 1G/10G OLT 3 identifies the number of 1G/10G repeaters 7E connected to itself, and as appropriate, assigns a unique number such as #1, #2, . . . , from the side nearest itself, and notifies the 1G/10G repeaters 7E of the assigned numbers (operation S52).

Next, the 1G/10G OLT 3 determines whether or not a control parameter n is equivalent to the total number of 1G/10G repeaters 7E connected to the system (operation S53). Now, in the case determination is made that the control parameter n is equivalent to the total number of 1G/10G repeaters 7E connected to the system (Yes in operation S53), the 1G/10G OLT 3 substitutes "0" for the control parameter n (operation S54), transitions the processing to "A", and repeats the processing in operations S47 through S53.

On the other hand, in the case determination is made that the control parameter n is not equivalent to the total number of 1G/10G repeaters 7E connected to the system (No in operation S53), the 1G/10G OLT 3 increments the control parameter n (operation S55), transitions the processing to "A", and repeats the processing in operations S47 through S53.

As described above, according to the present example, a Discovery process is correctly performed and the ONUs connected to the system is securely registered to the 1G/10G OLT 3.

Also, the 1G/10G OLT 3 create or update upstream scheduling information that specifies an upstream optical signal transmission schedule for each of the ONUs registered by the above Discovery process controls. At this time, by creating or updating the upstream scheduling information so that the 10 USs are transmitted together in consecutive time bands as much as possible, the on/off control count of the optical amplifier 30 of each 1G/10G repeater 7E is reduced.

Thus, even in a case wherein a margin is assigned between on/off controls of the optical amplifier 30, for example, influence on transfer efficiency of the optical signal is suppressed. Note that the margin herein may be assigned with the intent of absorbing a discrepancy in transfer rates that result from a discrepancy between the wavelength band of a downstream optical signal and a wavelength band of an upstream optical signal, for example. For example, in the case that the wavelength band of the downstream optical signal is 1.3 μm and the wavelength band of the upstream optical signal is 1.5 μm, when transferring over 100 km, a transmission delay difference of 18 ps/km×100 km=1.8 ns occurs.

(1.7) Fourth Modification

Figure 25:
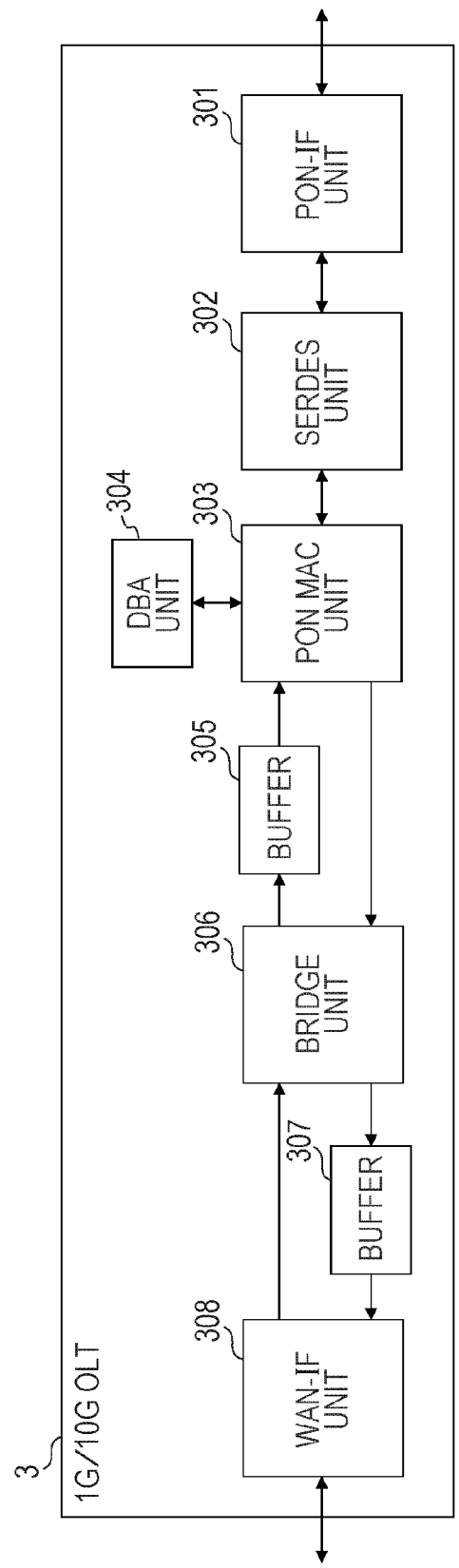
FIG. 25 is a diagram illustrating an example of a 1G/10G OLT configuration.

FIG. 25 illustrates a configuration example of a 1G/10G OLT 3. As depicted in FIG. 25, the 1G/10G OLT 3 exemplifies a PON-IF unit 301, SERDES (SERial DESerial) unit 302, PON MAC unit 303, DBA unit 304 buffers 305 and 307, bridge unit 306, and WAN-IF unit 308.

The PON-IF unit 301 functions as a transmission/reception unit of the optical signal communicated with the optical transmission system 1, 1B, 1C, 1D serving as the PON system. The PON-IF unit 301 coverts the upstream optical signal transmitted from each ONU to an electrical signal and send to the SERDES unit 302 and convert the electrical signal input from the WAN side to an optical signal and send to each ONU.

The SERDES unit 302 converts a serial signal input from the PON-IF unit 301 to a parallel signal and sends this to the PON MAC unit 303, while converting the parallel signal input from the PON MAC unit 303 to a serial signal and sending to the PON-IF unit 301.

The PON MAC unit 303 extracts a control frame used in the optical transmission systems 1, 1B, 1C, 1D from a received signal, and provide a control frame as to the transmission signal. Also, the PON MAC unit 303 performs status management of a logic link, point-in-time synchronizing processing, and so forth.

The DBA unit 304 flexibly performs assignment of bandwidths (active bandwidth assignment) according to downstream traffic volume of the data signals directed to each ONU under the 1G OLT 3.

The bridge unit 306 performs bridging processing in order to transfer the data signal sent from the PON side to the WAN side network, and in order to transfer the data signal sent from the WAN side to the PON side network. The bridging processing includes processing to convert the data signal into a predetermined data format, for example.

The buffer 305 temporarily stores data frames sent from the bridge unit 306 towards the PON side. Also, the buffer 307 temporarily stores data frames sent from the bridge unit 306 toward the WAN side.

The WAN-IF unit 308 is a network interface to connect with a network of a communication service provider.

Figure 26:
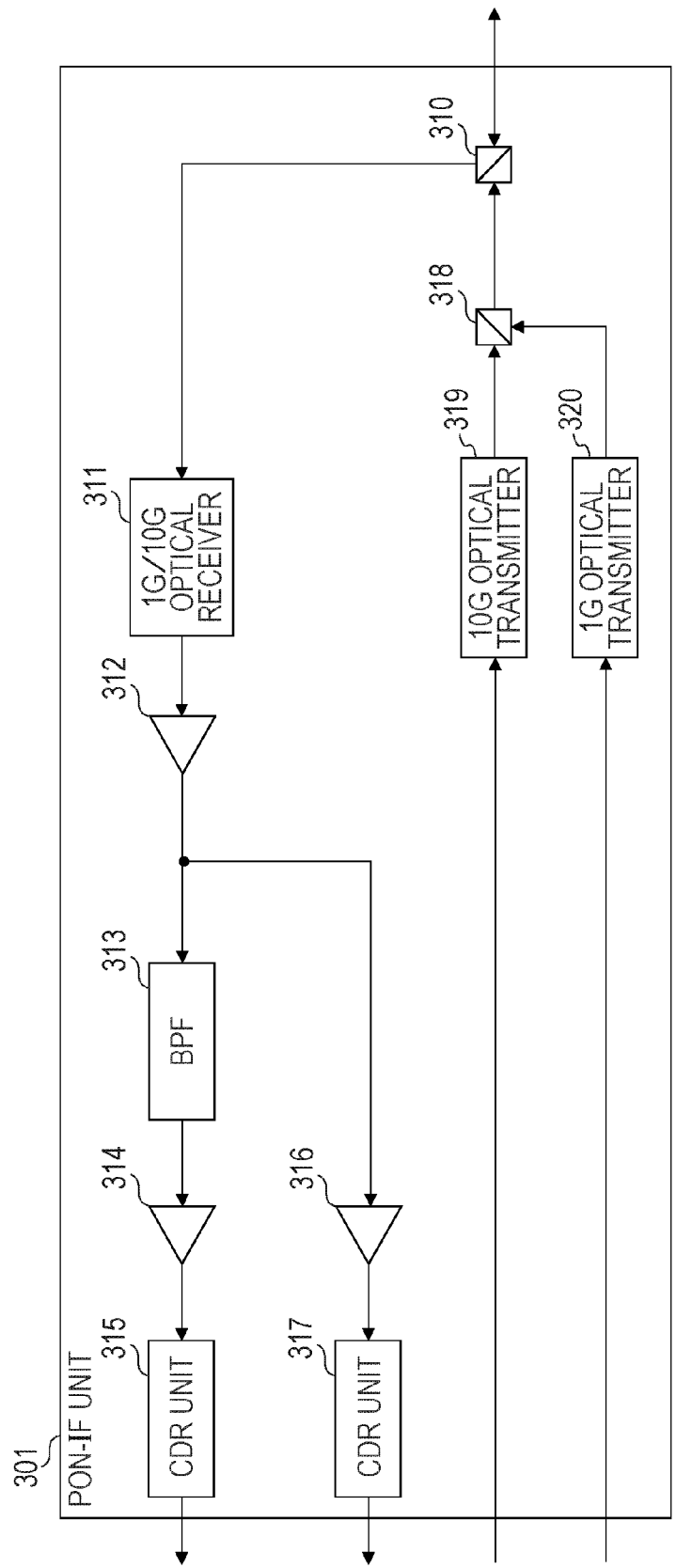
FIG. 26 is a diagram illustrating an example of a configuration of the PON-side IF unit depicted in FIG. 25.

Also, the PON-IF unit 302 is configured as an optical transceiver such as exemplified in FIG. 26, and the functions of the SERDENS unit 301, PON MAC unit 303, DBA unit 304, buffers 305 and 307, bridge unit 306, and WAN-IF unit 308 are implemented in a logic circuit such as an LSI or FPGA. Now, as illustrated in FIG. 26, the PON-IF unit 301 has a filter 310, 1G/10G optical receiver 311, amplifier 312, band pass filter (BPF: Band Pass Filter) 313, amplifiers 314 and 316, data regenerating (CDR: Clock Data Recovery) units 315 and 317, filter 318, 10G optical transmitter 319, and 1G optical transmitter 320. A 10G DS generated by the 10G optical transmitter 310 and a 1G DS generated by the 1G optical transmitter 320 are input in to the filter 318.

Figure 27:
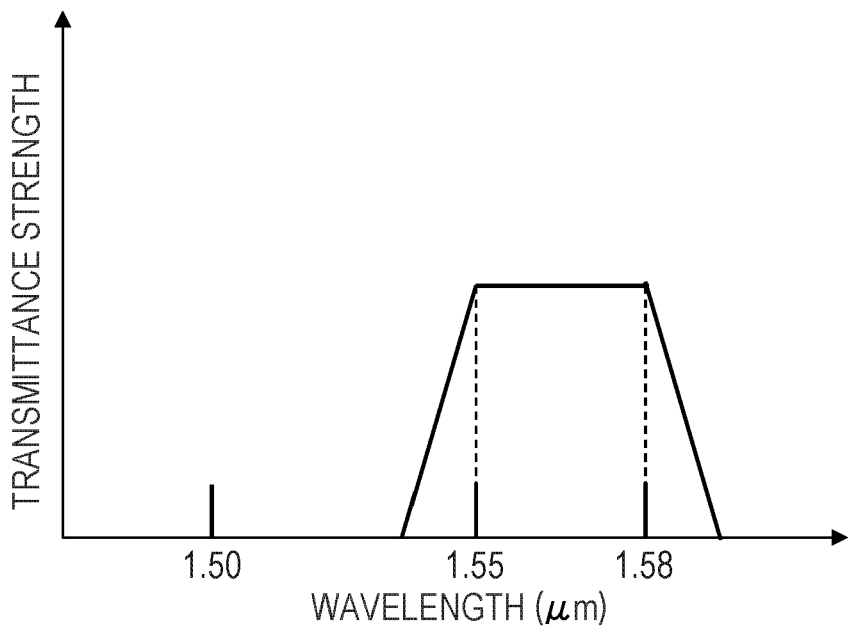
FIG. 27 is a diagram illustrating an example of transmission/reflection properties of a filter.

FIG. 27 illustrates an example of the transmission/reflection properties of the filter 318. As exemplified in FIG. 27, the filter 318 allows an optical signal of 1.55 μm to 1.58 μm which is the wavelength of the 10G DS to pass through, and reflects the optical signal of 1.49 μm which is the wavelength of the 1G DS. Note that in the example in FIG. 27, the filter 318 is configured as a band pass filter, but the filter 318 may be configured as a high-pass filter which allows the 10G DS to pass through, and reflects an optical signal of 1.49 μm which is the wavelength of the 1G DS. The 10G DS from the 10G optical transmitter 319 and the 1G DS from the 1G optical transmitter 320 are subjected to time-division multiplexing by the filter 318 and sent to the filter 310.

Figure 28:
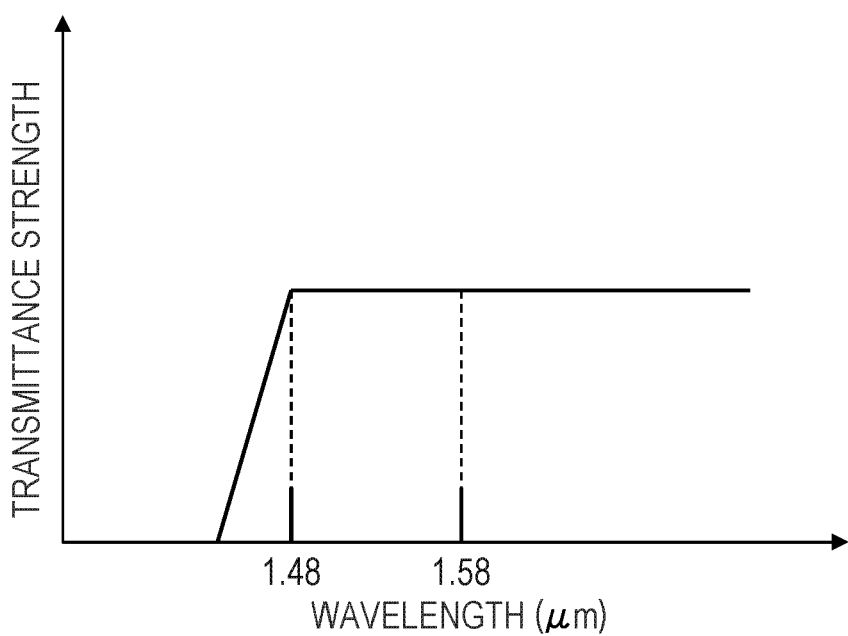
FIG. 28 is a diagram illustrating an example of transmission/reflection properties of a filter.

Also, FIG. 28 illustrates an example of the transmission/reflection properties of the filter 310. As exemplified in FIG. 28, the filter 310 allows the 1G DS and 10G DS to pass through, but reflects the 1G US and 10G US. That is to say, the filter 310 functions as a filter that divides the upstream optical signal and downstream optical signal. Note that in the example given in FIG. 28, the filter 310 is configured as a high-pass filter, but the filter 310 may be configured as a band pass filter that separates the upstream optical signal and downstream optical signal, or a low-pass filter.

The 1G/10G optical receiver 311 receives the 1G US and 10G US from the filter 310, and converts this to an electric signal. The data signal converted to an electric signal by the 1G/10G optical receiver 311 is amplified with the amplifier 312, and while the electric signal corresponding to the 1G US is sent towards the path of the BPF 313, the electric signal corresponding to the 10G US is sent towards the path of the amplifier 316.

The electric signal corresponding to the 1G US, after having noise removed with the BPF 313, is amplified with the amplifier 314, and data is extracted by the CDR unit 315. Also, the electric signal corresponding to the 10G US is amplified with the amplifier 316, and data is extracted by the CDR unit 317.

As described above, with a 1G/10G OLT 3 used in an optical transmission system 1, 1B, 1C, 1D such that 1G optical signals and 10G optical signal mix, there are cases wherein the same 1G/10G optical receiver 311 for the 1G US and 10G US is used to separate the 1G signals and 10G signals in an electrical stage.

Now, when comparing the reception sensitivity for the 1G US and 10G US, the reception sensitivity of the 1G US is approximately 10 times better than the reception sensitivity of the 10G US, whereby the 1G US obtains a wider dynamic range. Accordingly, in order to mix a 1G optical signal and 10G optical signal using the same optical fiber network, for example the transmission power of the 10G optical signal is increased, and a dynamic range that is roughly the same as that of the 1G optical signal is secured.

Thus, according to the present example, with the 1G/10G OLT 3, a configuration that optically amplifies only the 10G US will be used. For example, with the PON-IF unit 301A exemplified in FIG. 29, the optical amplifier 325 functions as a pre-amp of the 10G US. Thus, input power of the 10G US to the 1G/10G optical receiver 311 is increased, and the dynamic range of the 10G optical signal is compensated. In the example in FIG. 29, the 1G US and 10G US reflected by the filter 310 are input into the filter 322.

Figure 30:
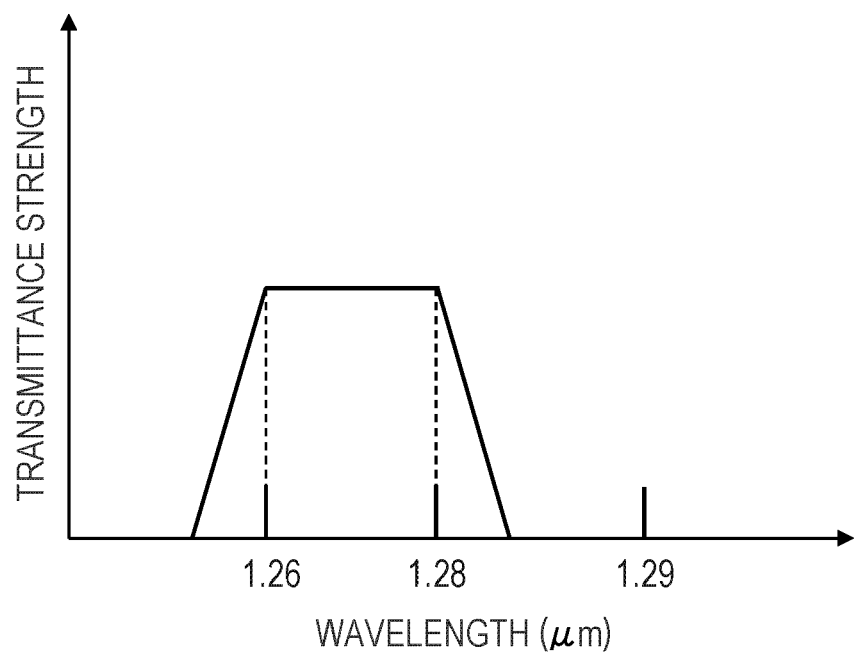
FIG. 30 is a diagram illustrating an example of transmission/reflection properties of a filter.

FIG. 30 illustrates an example of the transmission/reflection properties of the filter 322. As exemplified in FIG. 30, the filter 322 allows optical signals of 1.26 μm to 1.28 μm which is the wavelength of the 10G US to pass through, while reflecting optical signals of other wavelengths. Note that with the example in FIG. 30, the filter 322 is configured as a band pass filter, but the filter 322 may be configured as a low-pas filter that allows the 10G US to pass through but reflects any other optical signals.

After being branched by the filter 322, the 10G US is optically amplified with an optical amplifier 325 such as a SOA or EDFA. The operations of the optical amplifier 325 are controlled by an amplification controller 328, for example. The amplification controller 328 controls the optical amplifier 325 so as to be turned on only at a timing when the 10G US is input into the optical amplifier 325, and controls the optical amplifier 325 so as to be turned off at a timing when the 1G US is input into the optical amplifier 325 or when there is no input.

Specifically, for example, in the case that the optical signal that has been branched by the optical coupler 323 and detected by an optical detector 327 such as a PD is at a predetermined threshold or above, the amplification controller 328 controls the optical amplifier 325 so as to be turned on, and in other cases controls the optical amplifier 325 so as to be turned off.

Note that the optical delay line 324 provided between the optical coupler 323 and optical amplifier 325 provides a predetermined delay time as to the optical signal input into the optical amplifier 325. For example, in the event that the lead of the optical signal for which optical input is detected with the optical detector 327 is input, the optical delay line 324 provides a delay time to the input signal, such as that the control for turning on of the optical amplifier 325 by the amplification controller 328 has been completed. The delay time herein is set based on response times and the like of the optical detector 327, amplification controller 328, and optical amplifier 325.

Also, the amplification controller 328 may perform ALC control for the amplification rate of the optical amplifier 325, according to monitoring results with the optical detector 327, for example. Further, in order to stabilize control, a threshold used for determining that a state having input to the optical amplifier 325 has been transitions to an off state (state having no optical input) may be a value smaller than the above-mentioned predetermined threshold wherein there is optical input.

On the other hand, after being branched by the filter 322, and after being provided a predetermined delay time by the optical delay line 329, the 1G US is subjected to time-division multiplexing with the 10G US after amplification with the optical amplifier 325, and arrives at the 1G/10G optical receiver 311. Note that the filter 326 is a filter having similar transmission/reflection properties as the filter 322.

Thus, according to the present example, the input power of the 10G optical signal to the 1G/10G optical receiver 311 is increased, and a dynamic range that is roughly similar to that of the 1G optical signal is secured.

(1.8) Fifth Modification

Also, in the event of amplifying only the 10G US with the 1G/10G OLT 3, the optical amplifier 325 may be controlled based on the upstream scheduling information held in the 1G/10G OLT 3. For example, with the PON-IF unit 301B exemplified in FIG. 31, the amplification controller 328B performs on/off control of the optical amplifier 325, based on the upstream scheduling information held in the memory 330. Note that in FIG. 31, the portions having the same reference numerals as the portions denoted in FIG. 29 have similar configurations and functions as those portions denoted in FIG. 29, so description thereof will be omitted.

According to the present example, advantages similar to those in the fourth modification are obtained, and also the configuration to detect the optical signal in the previous stage of the optical amplifier 325 and the optical delay line is omitted, whereby manufacturing cost of the 1G/10G OLT 3 is reduced.

(1.9) Example of Hardware Configuration

Figure 32:
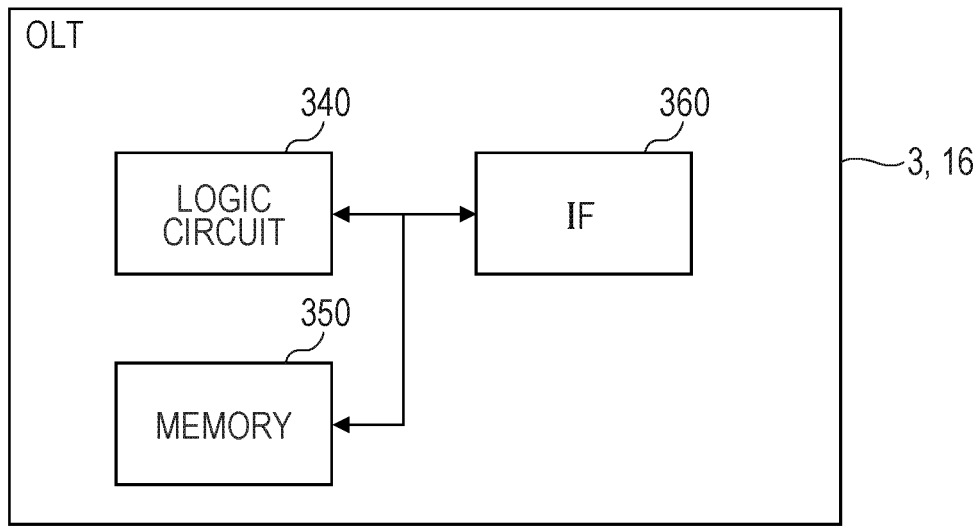
FIG. 32 is a diagram illustrating an example of an OLT hardware configuration.

FIG. 32 illustrates an example of a hardware configuration of the OLTs 3 and 16. A logic circuit 340 is an electronic circuit to process data and perform logic calculations, and includes an LSI or FPGA, for example. A memory 350 is a device to store data, and includes ROM (Read Only Memory) and RAM (Random Access Memory) or the like, for example. An IF 360 is an interface device to perform cabled communications with an ONU connected to a PON system or external system.

Note that the correlation between the configurations of the 1G OLT 15 exemplified in FIG. 7 and the configurations of the OLT 16 exemplified in FIG. 32 is as follows, for example. The logic circuit 340 and memory 350 correspond to the bridge unit 162, PON MAC unit 163, timing parameter calculating unit 165, and DBA unit 166, for example. Further, the IF 360 corresponds to a WAN-IF unit 161 and PON-IF unit 164, for example.

Also, the correlation between the configurations of the 1G/10G OLT 3 exemplified in FIG. 25 and the configurations of the OLT 3 exemplified in FIG. 32 is as follows, for example. The logic circuit 340 and memory 350 correspond to the SERDES unit 302, PON MAC unit 303, DBA unit 304, buffer 305 and 307, and bridge unit 306, for example. Further, the IF 360 corresponds to the WAN-IF unit 308 and PON-IF unit 301, for example.

Figure 33:
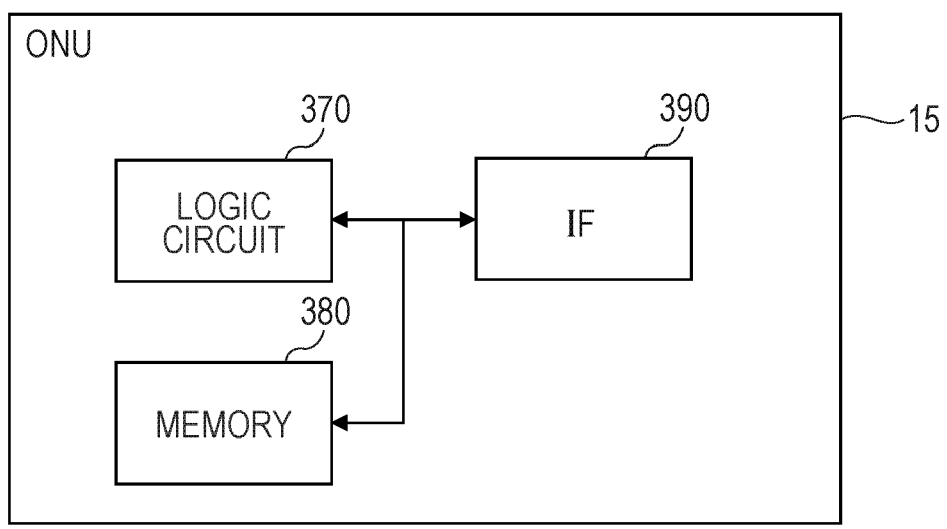
FIG. 33 is a diagram illustrating an example of an ONU hardware configuration.

Also, FIG. 33 illustrates a hardware configuration of the ONU 15. The logic circuit 370 is an electronic circuit to process data and perform logic calculations, and includes an LSI or FPGA, for example. A memory 380 is a device to store data, and includes ROM and RAM or the like, for example. An IF 390 is an interface device to perform cabled communications with an OLT connected to a PON system or external system.

Note that the correlation between the configurations of the 10G ONU 15 exemplified in FIG. 7 and the configurations of the ONU 15 exemplified in FIG. 33 is as follows, for example. The logic circuit 370 and memory 380 correspond to the PON MAC unit 152, bridge unit 153, and timing information acquiring unit 155. Further, the IF 390 corresponds to the PON-IF unit 151 and UN-IF unit 154, for example.

(1.10) Sixth Modification

Figure 34:
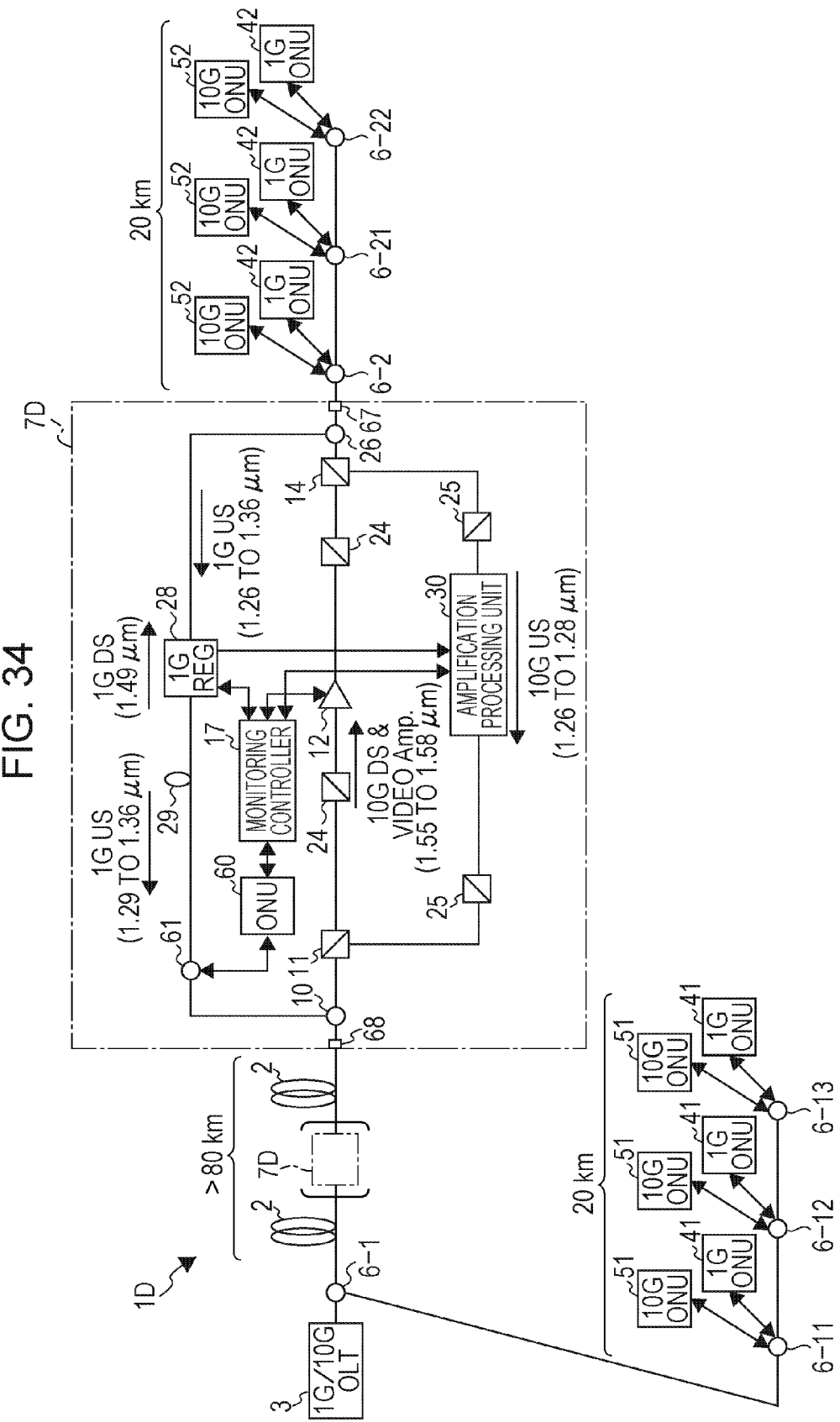
FIG. 34 is a diagram illustrating an example of configurations of an optical transmission system and 1G/10G repeater according to a sixth modification.

FIG. 34 illustrates an example of configurations of an optical transmission system 1D and 1G/10G repeater 7D relating to a sixth modification. In this example, the amplifying processing unit 30 is normally turned on and operating when the 1G/10G repeater 7D is in an operating state, and is turned off during the time of receiving an off control signal from the 1G regenerator 28 and monitoring controller 17. Note that in FIG. 34, the portions having the same reference numerals as the same portions denoted in FIG. 9 have similar configurations and functions as the portions denoted in FIG. 9.

An optical coupler 26 is provided to the 1G/10G repeater 7D exemplified in FIG. 34, downstream from the filter 14, so as to handle allowable loss (29 dB) between the OLT and ONU which is stipulated by the PR 30 which is an EPON standard.

The optical coupler 26 branches the upstream optical signal transmitted from the ONUs 52 and 42 in the path toward the 1G regenerator 28 and the path toward the filter 14. Note that the branching ratio of the optical coupler 26 is desirable to be set as approximately 3:7, for example, to branch more light toward the path toward the 1G regenerator 28. Thus, loss of the 1G US within the 1G/10G repeater 7D is reduced.

The 1G regenerator 28 subjects the 1G US that has been branched by the optical coupler 26 to optical relay processing, and sends this to the optical coupler 10.

Figure 29:
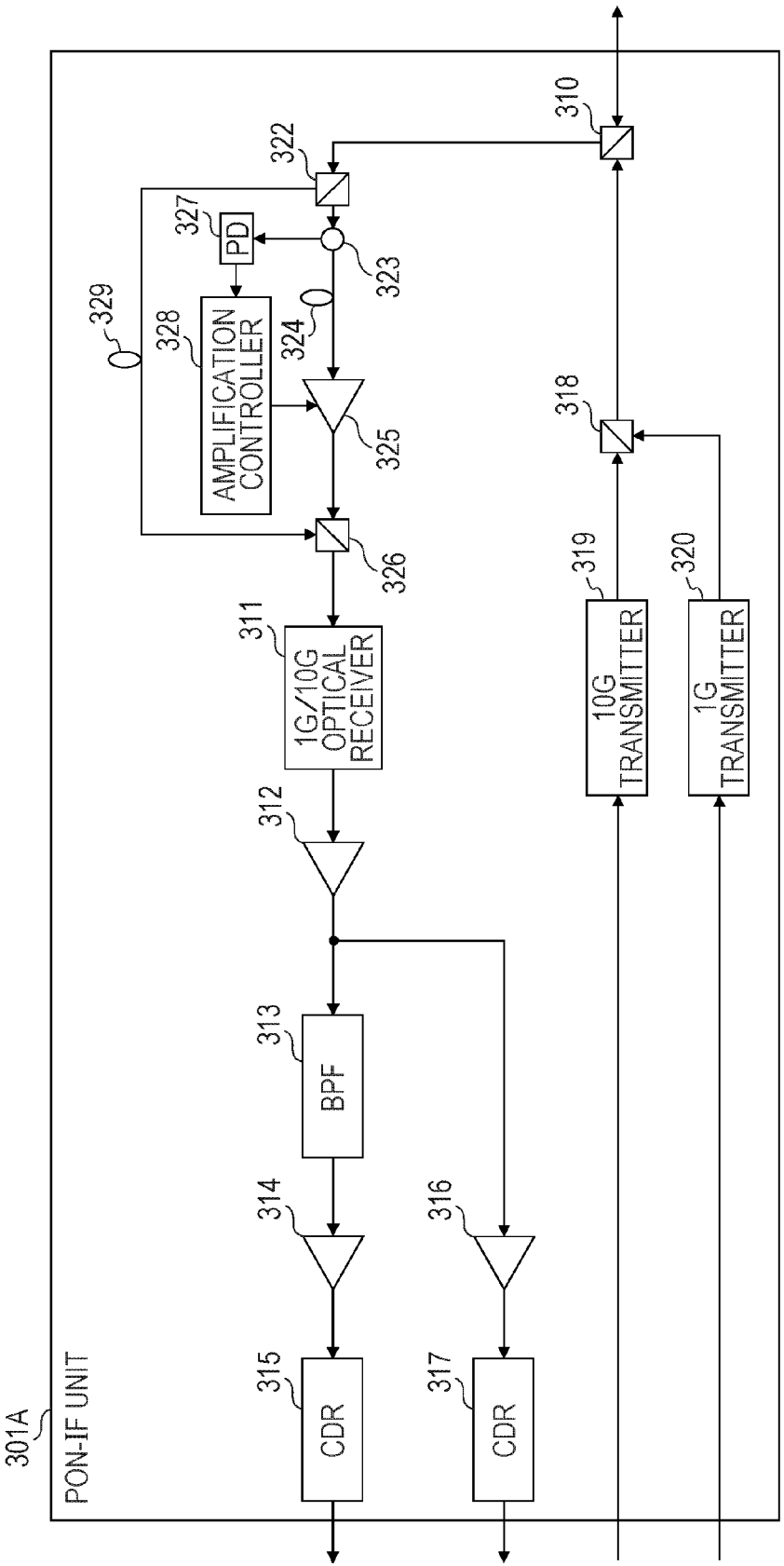
FIG. 29 is a diagram illustrating a configuration example of a 1G/10G OLT according to a fourth modification.
Figure 31:
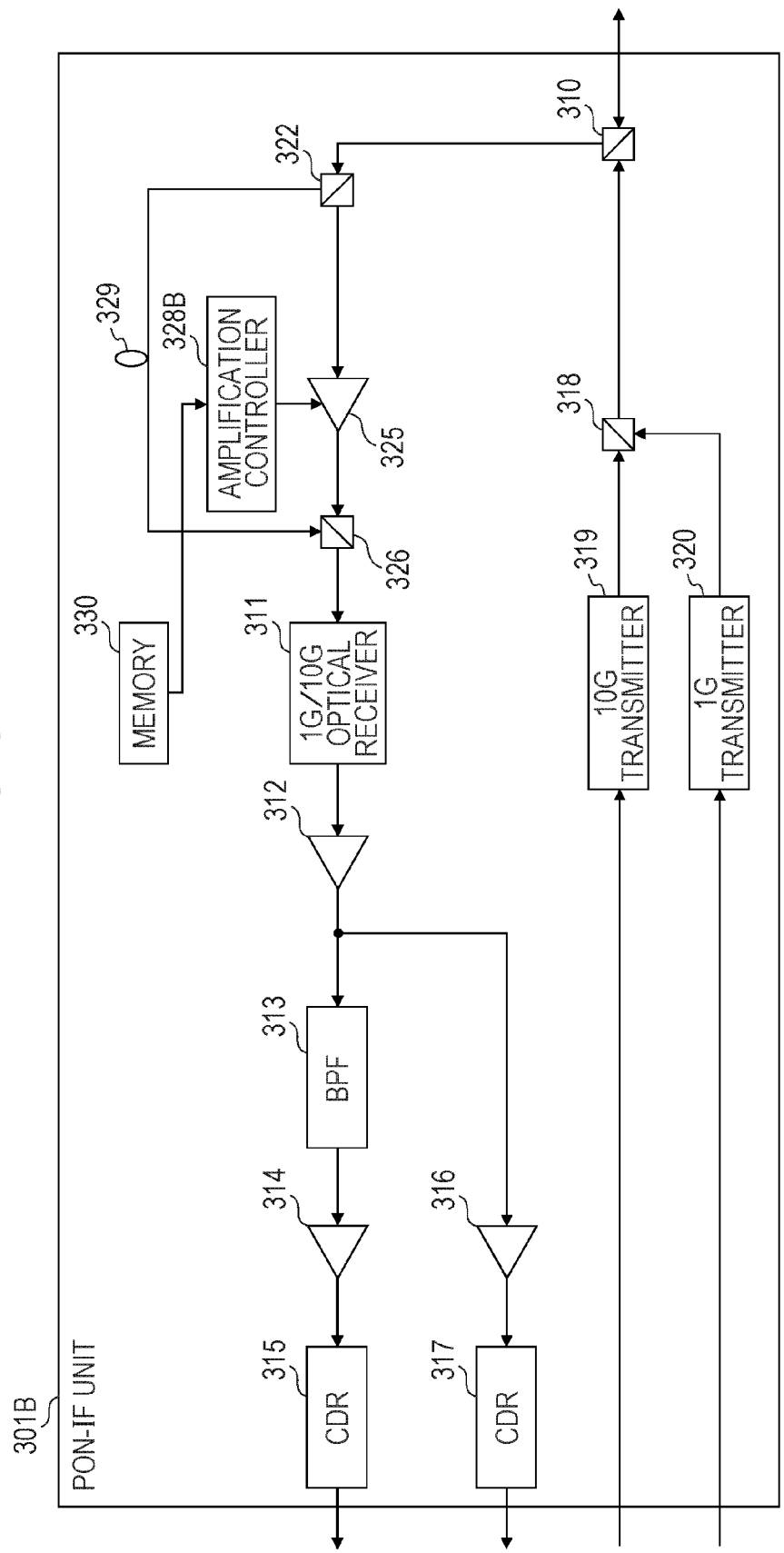
FIG. 31 is a diagram illustrating a configuration example of a 1G/10G OLT according to a fifth modification.

With the 1G/10G OLT 3, the configurations exemplified in FIG. 29 or 31 may be used to increase 10G US input power to the 1G/10G optical receiver 311, and compensate the dynamic range of the 10G optical signal.

Note that an optical delay line 29 is installed between the 1G regenerator 28 and optical coupler 10. This is to provide the same delay to the 1G US sent from the 1G regenerator 28 as the processing delay provided to the 10G US with the amplification processing unit 30. On the other hand, the 10G US branched by the optical coupler 26 is reflected towards the path to the amplifying processing unit 30 by the filter 14.

The filter 25 installed between the filter 14 and the amplifying processing unit 30 remove noise input to the amplifying processing unit 30 and remove the ASE components. Note that this filter 25 has transmission/reflection properties that is similar to that of the above-described filter 25. The 10G US reflected by the filter 14 passes through the filter 25, and is input into the amplifying processing unit 30.

Figure 35:
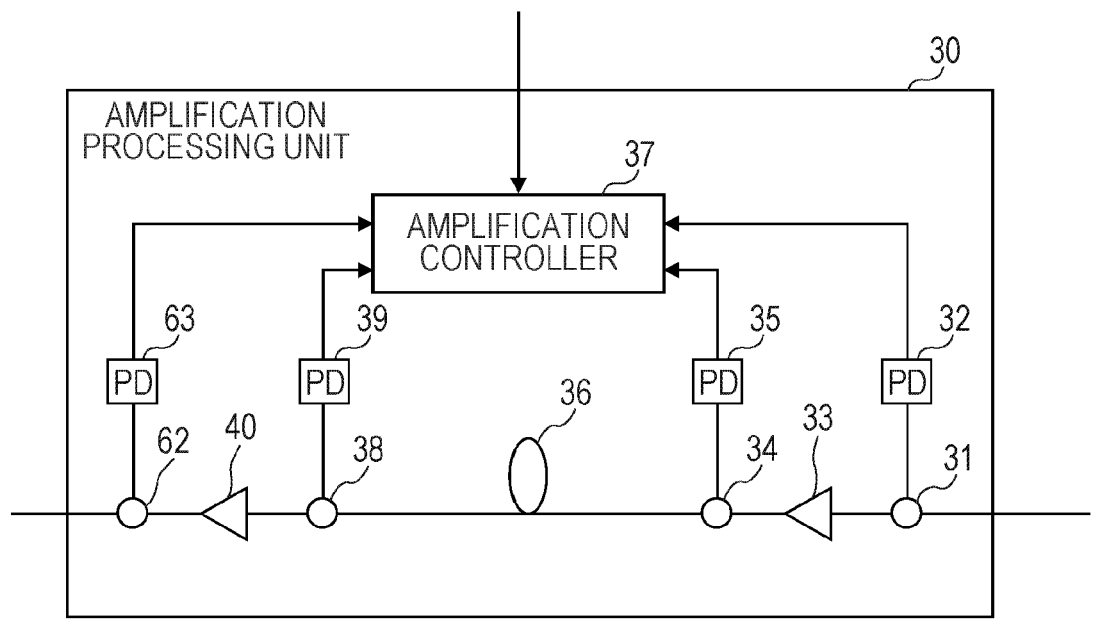
FIG. 35 is a diagram illustrating an example of a configuration of the amplifying processing unit depicted in FIG. 34.

The amplifying processing unit 30 is a device to optically amplify the 10G US, and for example has a configuration such as exemplified in FIG. 35. The amplifying processing unit 30 illustrated in FIG. 35 has optical couplers 31, 34, 38, 62, PDs 32, 35, 39, and 63, optical amplifiers 33 and 40, optical delay line 36, and amplification controller 37 as an example.

The optical couplers 31, 34, 38, and 62 each branch optical signals input thereto (mixed signals of 1G and 10G optical signals), guide one toward the corresponding PD 32, 35, 39, or 63, and guides the other toward the path to the optical coupler 10. Now, the optical coupler 31 is provided to the input side of the optical amplifier 33, and the optical coupler 34 is provided to the output side of the optical amplifier 33. Similarly, the optical coupler 38 is provided to the input side of the optical amplifier 40, and the optical coupler 62 is provided to the output side of the optical amplifier 40.

Note that an integrated optical amplification module is made up of the optical amplifier 33, optical couplers 31 and 34 on the input/output sides thereof, and PDs 32 and 35. Similarly, an integrated optical amplification module is made up of the optical amplifier 40, optical couplers 38 and 62 on the input/output sides thereof, and PDs 39 and 63. Also, the PDs 32, 35, 39, and 63 monitor the level of the optical signal from the corresponding optical coupler 31, 34, 38, and 62. The optical amplifiers 33 and 40 receive control from the amplification controller 37, and amplify the optical signals input from the optical couplers 31 and 38c.

Specifically, the amplification controller 37 is left on, regardless of whether or not there is optical input. Conversely, the optical amplifier 40 is turned off when the optical input is not detected by the PD 32 or 39, thereby blocking the optical signal towards the path of the filter 11. Upon detecting optical input with the PD 32 or 39, the optical amplifier 40 is turned on, whereby the optical signal input through the optical delay line 36 and optical coupler 38 is guided towards the path to the filter 11.

At this time, the optical amplifier 40 performs relay processing (optical amplification) as a 10G optical signal. Also, the amplification control circuit 37 may perform ALC control of the amplification rate of the optical amplifier 40 according to the monitoring results from the PDs 39 and 63.

Note that with the amplification controller 37, an electrical signal of a level according to the input light intensity is taken in from the PDs 32 and 35. Whether or not there is optical input is detected based on a threshold determination made regarding the level of this electrical signal. In this case, for stability of control, a threshold for determining a case where having optical input has transitioned to an off state (state having no optical input) may be a value smaller than a threshold wherein there is optical input.

Also, the optical delay line 36 provides a delay time such that control by the amplification controller 37 to turn on the optical amplifier 40 is completed at the time of the leading edge of the optical signal for which optical input is detected with the PDs 32 and 35 being input. The delay time herein is set based on the response times or the like of the PDs 32 and 35, amplification controller 37, and optical amplifier 40.

Now, in the example illustrated in FIG. 34, a mixed signal of the 1G and 10G optical signals is input as to the 1G regenerator 28 and amplifying processing unit 30. Therefore, it is desirable to avoid collision between the output of the 1G regenerator 28 that processes 1G optical signals and the output of the amplifying processing unit 30 that processes the 10G optical signals.

With the amplification controller 37, a signal of whether or not 1G signal synchronizing processing is being performed in the 1G regenerator 28 is received from the 1G regenerator 28. In the case 1G signal synchronizing processing is being performed in the 1G regenerator 28, the time slot is assigned to 1G optical signals instead of 10G, whereby the optical amplifier is forcibly turned off (blocking control).

At this time, in order to establish synchronization of the 1G timeslot, the 1G regenerator 28 uses approximately 850 ns which is the sum of at least the synchronizing time and LLID identifying time. The optical delay line 36 delays the optical signal of the 1G time slot output from the optical amplifier 33. That is to say, a delay sufficiently equivalent to the time to receive a signal in the event that synchronization of a 1G optical signal has been established at the 1G regenerator and to turn off the optical amplifier 40 is provided before input of the 1G optical signal into the optical amplifier 40.

Also, as in a case of transitioning from the 1G time slot to the 10G, in the case that establishing of synchronization by the 1G regenerator 28 has been lost, the amplification controller 37 receives a signal from the 1G regenerator 38 that notifies that the synchronization of the 1G signal has been lost. With the amplification controller 37, the forced off-control of the optical amplifier 40 is disengaged based on the signal that notifies that synchronization has been lost, and on-control of the optical amplifier 40 (guiding control) is performed from the leading edge of the 10G time slot which follows the 1G time slot. In other words, the forced off-control of the optical amplifier in the previous time slot is kept from dragging on to the 10G time slot.

That is to say, in the time slot to which the 10G optical signal is assigned, signal synchronization with the 1G regenerator 28 is unavailable, and is not recognized as a signal, whereby the optical signal subjected to regenerating processing is not output to the optical coupler 10 either. On the other hand, with the amplifying processing unit 30, the above-described forced off-control is disengaged by the signal from the 1G regenerator 28 that notifies that synchronization has been lost, whereby the optical signal subjected to ALC control is output towards the path to the optical coupler 10.

Also, in the above-described example, the amplification controller 37 normally has the optical amplifier 33 turned on, but for example the optical amplifiers 33 and 40 are normally turned off and the optical amplifiers 33 and 40 turned on only in the case that a 10G US is input into the optical amplifier 33. Thus, output of stray light, which was generated in the case of no input to the amplifiers 33, is suppressed. Note that the timing for the 10G US to be input into the optical amplifier 33 is detected based on the synchronization-lost signal notified from the 1G regenerator 28 and the monitor results from the PD 32, for example.

Further, in the case that the wavelength band of the 1G US transmitted from the 1G ONU 42 is set so as not to overlap with the 10G US wavelength band, control by the amplifying processing 30 based on a notification signal from the 1G regenerator 28 is omitted. This is because the 1G US having a wavelength band that does not overlap with the 10G US wavelength band is removed by the filter 25, and only the 10G US is input into the amplifying processing unit 30.

Thus, the 10G US amplified with the amplifying processing unit 30 is sent towards the path to the filter 25 which is installed between the amplifying processing unit 30 and the filter 11, passes through the filter 25 and filter 11, and is input into the optical coupler 10. The optical coupler 10 multiplexes the 1G US and 10G US and sends this towards the path to the 1G/10G OLT 3.

On the other hand, the 1G DS transmitted from the 1G/10G OLT 3 is branched toward the path to the 1G regenerator 28 by the optical coupler 10, subjected to optical relay processing and wavelength conversion in the 1G regenerator 28, further travels past the optical coupler 26, and arrives at the 1G ONU 42. Also, upon being branched with the optical coupler 10, the 10G DS transmitted from the 1G/10G OLT 3 passes through the filters 11 and 24, is amplified with the optical amplifier 12, passes through the filters 24 and 14, and further travels past the optical couple 26 and arrives at the 10G ONU 52.

With the 1G/10G repeater 7D, in order to remove the ASE components of the optical amplifier 12, filters 24 are installed between the filter 11 and optical amplifier 12 and between the optical amplifier 12 and filter 14, respectively. Note that the transmission/reflection properties of the filter 24 are as described above with reference to FIG. 10. Note that in a case wherein the ASE components of the optical amplifier 12 are sufficiently small, the filter 24 may be omitted, and in a case wherein the ASE components of the amplifying processing unit 30 are sufficiently small, the filter 25-2 may be omitted.

Also, the 1G/10G repeater 7D may have a monitoring controller 17 which subjects the operations of at least one of the 1G regenerator 28, the optical amplifier 12, and amplifying processing unit 30, to monitoring control, and notifies the 1G/10G OLT 3 of the monitoring control results via an ONU 60. The ONU 60 is configured as a 1G ONU or a 10G ONU, for example, includes the monitoring control results with the monitoring controller 17 in the E-PON optical signal, and notifies the 1G/10G OLT 3 via the optical coupler 61.

Thus, according to the present example, even if optical signals having different transmission rates coexist, as in a network system wherein a 1G E-PON optical signal and a 10G E-PON optical signal mix, appropriate relay processing is performed for each optical signal. Also, a repeater that is applicable to a network system having a mix of optical signals with different transmission rates is realized. Thus, in the case of using the current OLT and ONU of a PON, the service range is expanded while using the current system, whereby construction of a new system is minimized, and costs are reduced.

(1.11) Seventh Modification

Figure 36:
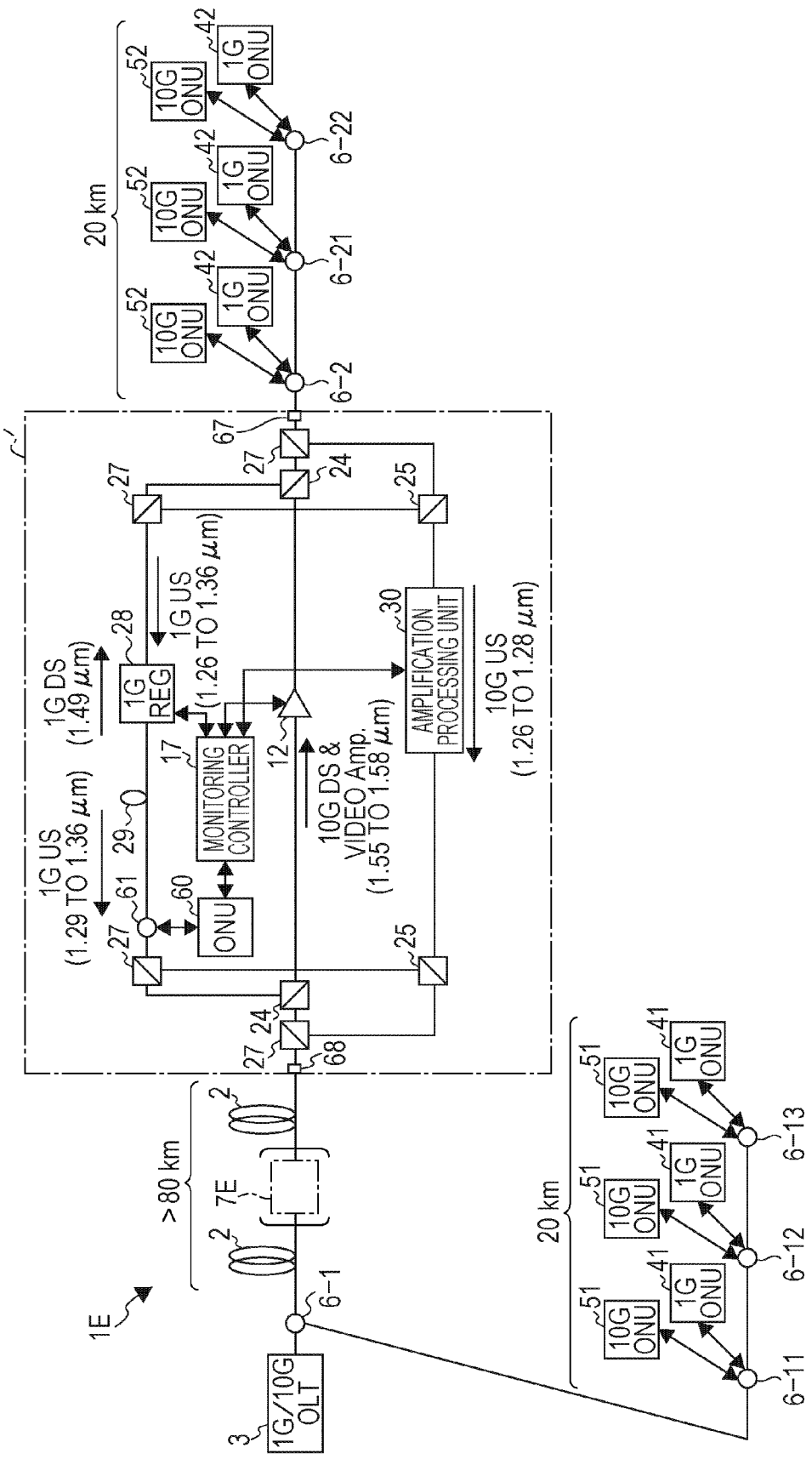
FIG. 36 is a diagram illustrating an example of configurations of an optical transmission system and 1G/10G repeater according to a seventh modification.

FIG. 36 illustrates an example of configurations of an optical transmission system 1E and 1G/10G repeater 7E relating to a seventh modification. Note that portions in FIG. 36 having the same reference numerals as portions depicted in FIGS. 12 and 34 have similar configurations and functions as the portions depicted in FIGS. 12 and 34, so description thereof will be omitted.

In a PON system, in the case that the 1G US wavelength band is set appropriately in a range of 1.26 µm to 1.36 µm, there may be cases wherein the 1G US wavelength band is set to a wavelength band that does not overlap with the 10G US wavelength band.

In the optical transmission system 1E exemplified in FIG. 36, the 1G US wavelength band is set as 1.29 µm to 1.36 µm, for example, and the 10G US wavelength band is set as 1.26 µm to 1.28 µm, for example. That is to say, the 1G US wavelength band and the 10G US wavelength band are separated. Note that the 1G US wavelength band in the optical transmission system 1E is but an example, which may not be used to interpret wavelength bands restrictively, and a wavelength band may be anything that at least does not overlap with the 10G US wavelength band.

Thus, in the case that the 1G US wavelength band and the 10G US wavelength band are separated, with the 1G/10G repeater 7E, separation is made by the filter 25 which has the transmission/reflection properties exemplified in FIG. 11. Thus, as compared to the case of using the optical couplers 19 and 26, optical signal loss is reduced.

FIG. 11 illustrates an example of transmission/reflection properties of the filter 25. As exemplified in FIG. 11, the filter 25 allows an optical signal of 1.26 µm to 1.28 µm which is the 10G DS wavelength to pass through, while reflecting optical signals of any other wavelength. Note that in the example described in FIG. 11, the filter 25 is configured as a band pass filter, but the filter 25 may be configured as a low-pass filter that allows the 10G DS to pass through and reflects any other optical signals.

Also, FIG. 10 illustrates an example of transmission/reflection properties of the filter 24. As exemplified in FIG. 10, the filter 24 allows an optical signal of 1.55 µm to 1.58 µm which is the 10G DS wavelength to pass through, while reflecting optical signals of any other wavelength. Note that in the example described in FIG. 10, the filter 24 is configured as a band pass filter, but the filter 24 may be configured as a high-pass filter that allows the 10G DS to pass through and reflects any other optical signals.

Further, in the case of using the filter 25 to separate the 1G US and 10G US, the 1G US is not input into the amplifying processing unit 30, and only the 10G US is input. Therefore, according to the present example, control based on communication signals from the 1G regenerator 28 in the amplifying processing unit 30 may be omitted. In this case, with the monitoring controller 17, parameters indicating the operational state of the 1G/10G repeater 7E, such as input signal power, operating temperature, and driving current of the amplifying processing unit 30, optical amplifier 12, and 1G regenerator 28, may be collected and notified to the network monitoring system via the 1G/10G OLT 3, or control signals such as a forced shutdown of the 1G/10G repeater 7E and so forth from the network monitoring system may be received with the ONU 60 via the 1G/10G OLT 3 to control the amplifying processing unit 30, optical amplifier 12, and 1G regenerator 28, and so forth.

Note that the amplifying processing unit 30 may autonomously perform amplifying operations in the case that a 10G US signal is input, but in the case that a 10G US signal is not input, the amplifying processing unit 30 may stop the amplifying operations so that stray light is not generated, and amplifying operations may be controlled with only external controls.

That is to say, during the period that the 1G regenerator 28 is regeneratively repeating the 1G US signal, or in the case that the ONU 60 is configured with the 1G ONU, during the time that the ONU 60 emits a US signal, the operations of the amplifying processing unit 30 may be stopped via the monitoring controller 17. The advantage of this method is that because of the operation control of the amplifying processing unit 30, a high rate feature does not have to be included in the monitor system (PD 32 or the like, exemplified in FIG. 35) of the 10G US signal. Note that in the case of externally controlling the amplifying processing unit 30, the US signal from the 1G ONU 41 and 10G ONU 51 which are upstream from the 1G/10G repeater 7E and stray light from the amplifying processing unit 30 may overlap, but the 1G ONU 41 and 10G ONU 51 are nearer the 1G/10G OLT 3 than the 1G/10G repeater 7E, whereby the strength of the US signal from the 1G ONU 41 and 10G ONU 51 is much greater than the stray light, and therefore deterioration of signal vs. noise ratio is thought to be within an allowable range.

Note that with the 1G/10G repeater 7E, a filter 27 is installed in the downstream path of the filter 24, between the 1G regenerator 28 and filter 24, and in the upstream path of the filter 25.

FIG. 13 illustrates an example of transmission/reflection properties of the filter 27. As exemplified in FIG. 13, the filter 27 allows the 1G DS and 10G DS to pass through, while reflecting the 1G US and 10G US. That is to say, the filter 27 functions as a filter to separate the upstream optical signal and downstream optical signal. Note that in the example illustrated in FIG. 13, the filter 27 is configured as a high-pass filter, but the filter 27 may also be configured as a band pass filter or low pass filter that separates the upstream optical signal and downstream optical signal.

According to the present example, optical signal loss at the 1G/10G repeater 7E is suppressed. Note that in the case that the 1G/10G OLT 3 has the internal configuration illustrated in FIGS. 25 and 26, for example, and receives a 1G US signal with the 1G/10G optical receiver 311, if the amplifying processing unit 30 is turned off when the 1G US signal is subjected to regenerative relay with the 1G regenerator 28 and output from the 1G/10G repeater 7E, the 1G/10G optical receiver 311 is able to receive only the 1G US signal without including the stray light that occurs with the amplifying processing unit 30.

However, in the event that the 10G US signal amplified with the amplifying processing unit 30 is received with the 1G/10G optical receiver 311, stray light that occurs with the amplifying processing unit 30 is received along with the 10G US signal, so the signal vs. noise ratio of the 10G US signal deteriorates.

In order to improve the signal vs. noise ratio of the 10G US signal, for example the filter 25 which has the transmission/reflection properties exemplified in FIG. 11 is inserted between the 1G/10G optical receiver 311 and filter 310. Thus, the stray light received with the 1G/10G optical receiver 311 is only the stray light that passes through the filter 25, so the signal vs. noise ratio is improved. However, in the case that the filter 25 is inserted, it is desirable for the 1G US signal wavelength to be 1.26 μm to 1.28 μm in order to allow the 1G US signal to pass through the filter 25.

Figure 39:
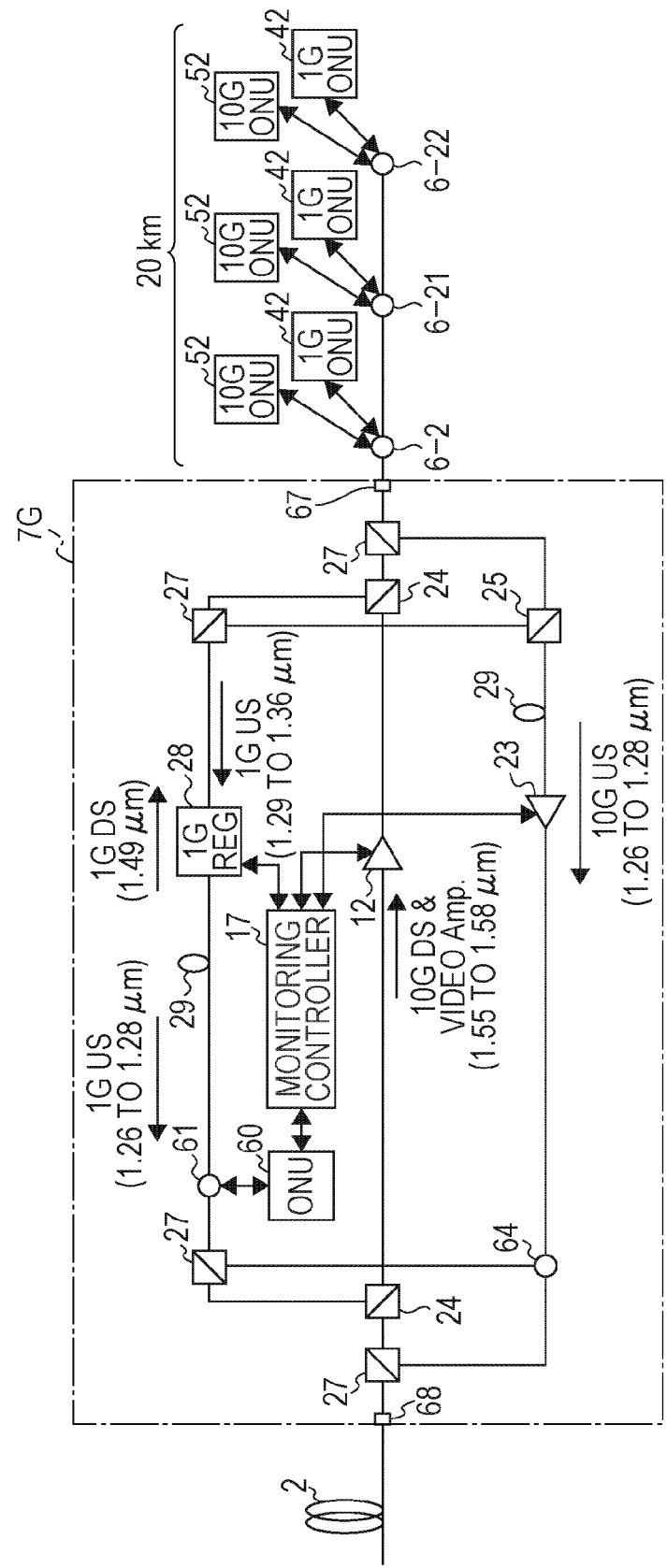
FIG. 39 is a diagram illustrating a configuration example of the 1G/10G repeater depicted in FIG. 36.
Figure 40:
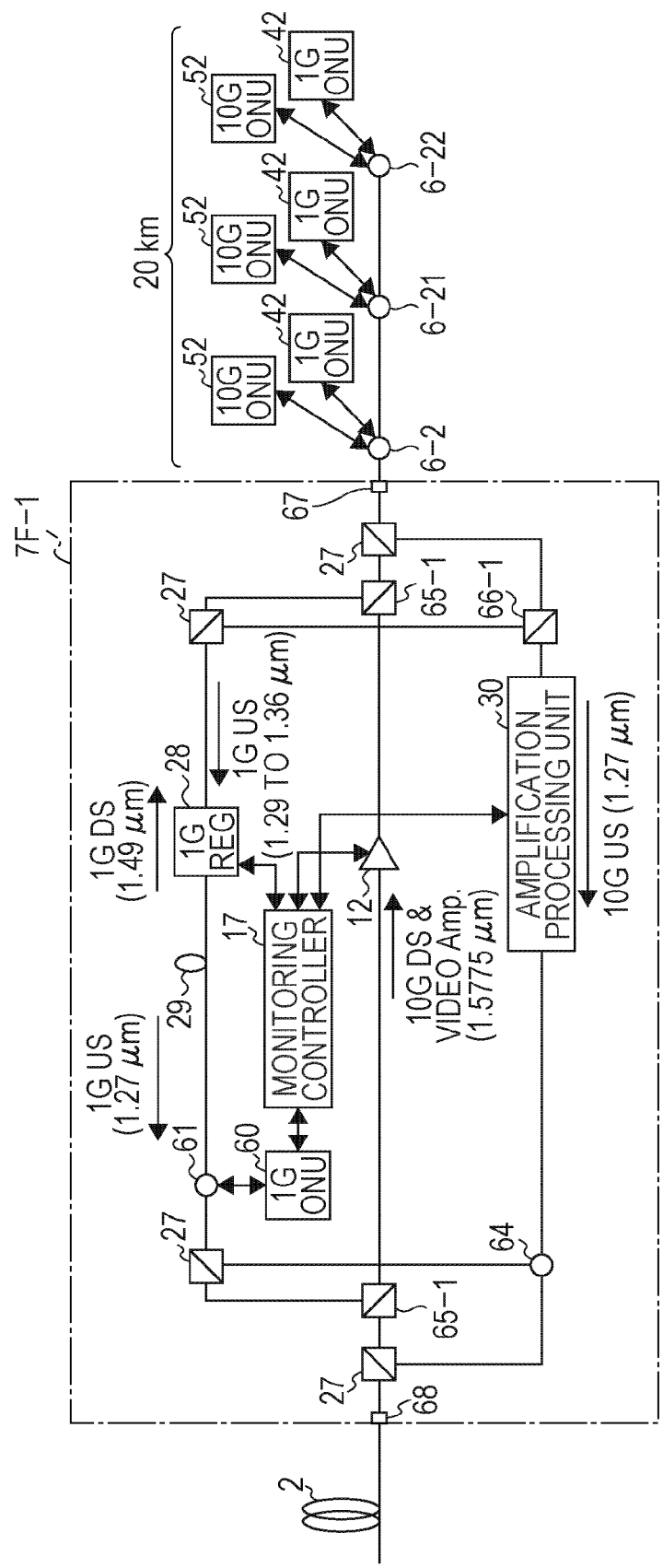
FIG. 40 is a diagram illustrating a configuration example of the 1G/10G repeater depicted in FIG. 37.
Figure 41:
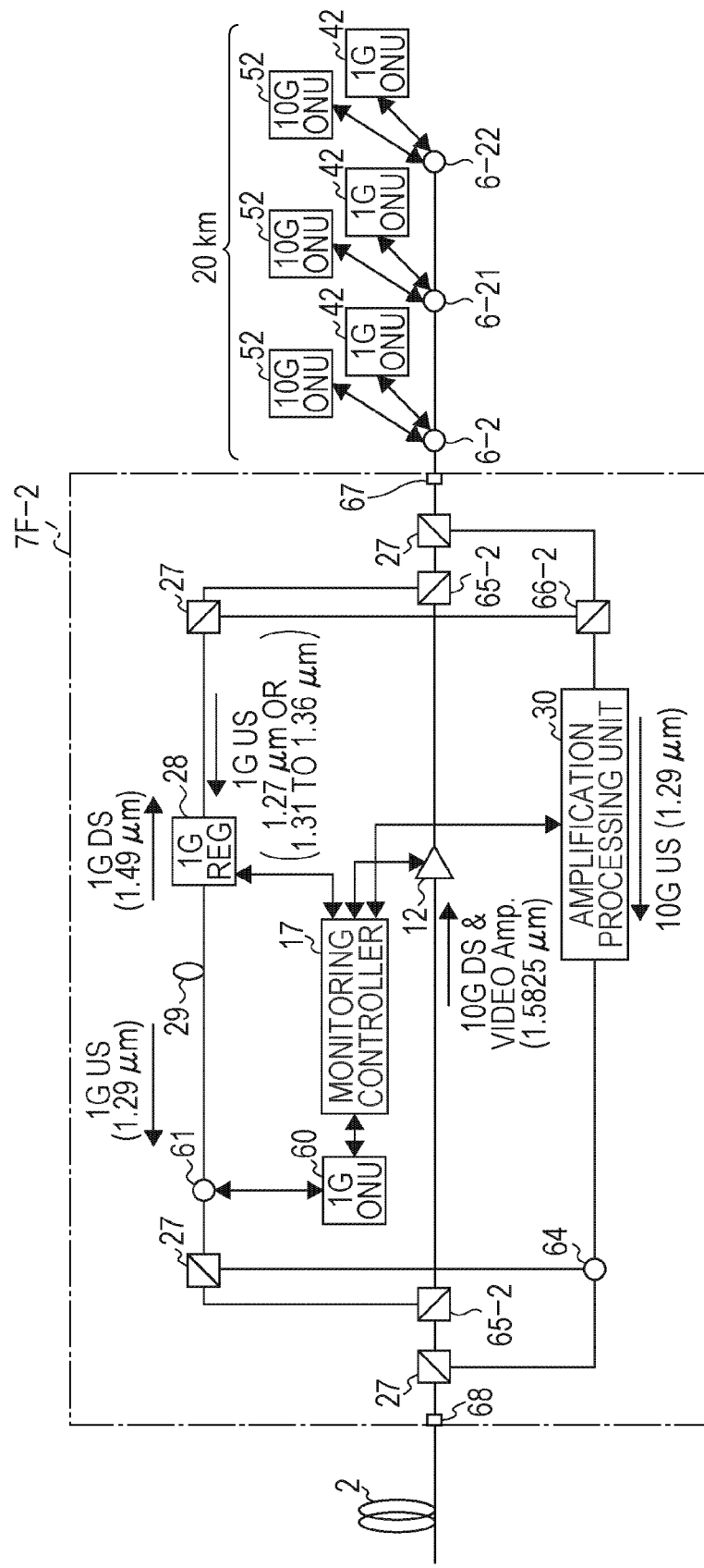
FIG. 41 is a diagram illustrating a configuration example of the 1G/10G repeater depicted in FIG. 37.
Figure 42:
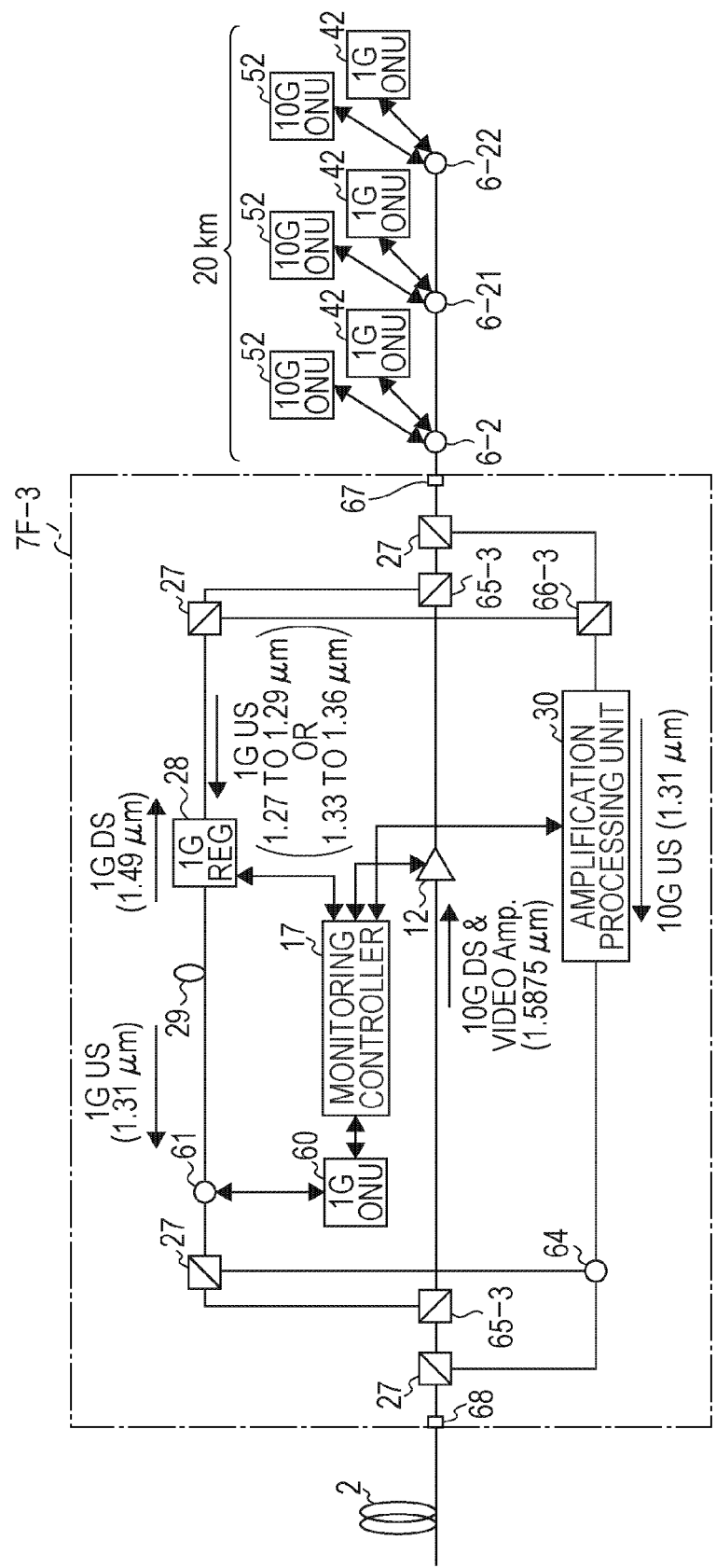
FIG. 42 is a diagram illustrating a configuration example of the 1G/10G repeater depicted in FIG. 37.
Figure 43:
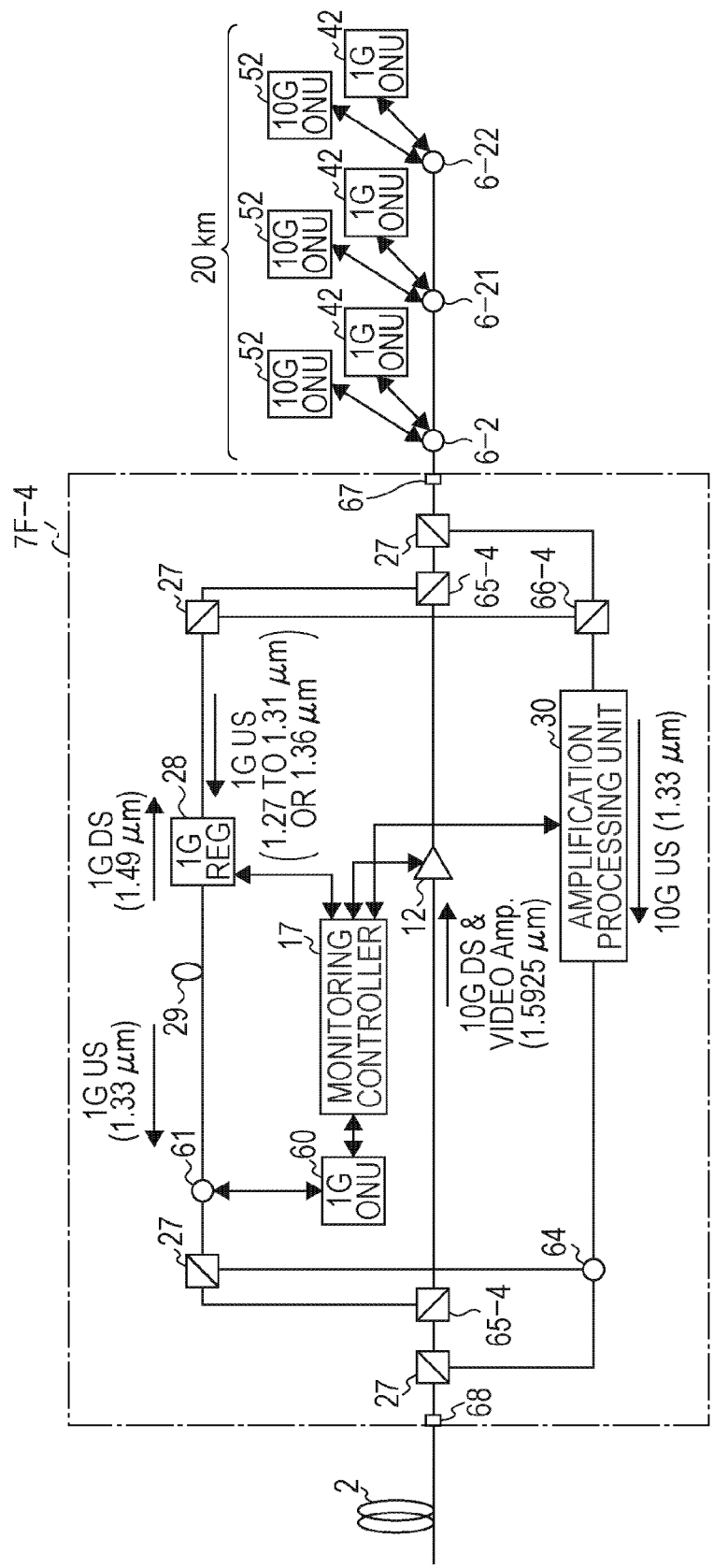
FIG. 43 is a diagram illustrating a configuration example of the 1G/10G repeater depicted in FIG. 37.

That is to say, in such a case, instead of the 1G/10G repeater 7E exemplified in FIG. 36, a 1G/10G repeater 7G exemplified in FIG. 39 may be used. Note that portions in FIG. 39 having the same reference numeral as portions denoted in FIGS. 2 and 36 have similar configuration and functions as the portions denoted in FIGS. 2 and 36 so the descriptions thereof will be omitted.

In the example illustrated in FIG. 39, wavelength of the 1G US signal output from the 1G regenerator 28 is changed to 1.26 μm to 1.28 μm, and also, at the later state of the optical amplifier, an optical coupler 64 is disposed instead of the filter 25. In the 1G/10G OLT 3 in FIG. 39, with the configuration of the PON-IF unit 301 exemplified in FIG. 26, a filter 25 is installed between the 1G/10G optical receiver 311 and filter 310. Note that in the example illustrated in FIG. 39, the optical amplifier 23 autonomously performs amplifying operations in the case that a 10G US signal is input, but in the case that a 10G US signal is not input, the optical amplifier 23 stops the amplifying operations so that stray light is not generated, and amplifying operations may be controlled with only external controls.

(1.12) Eighth Modification

Figure 37:
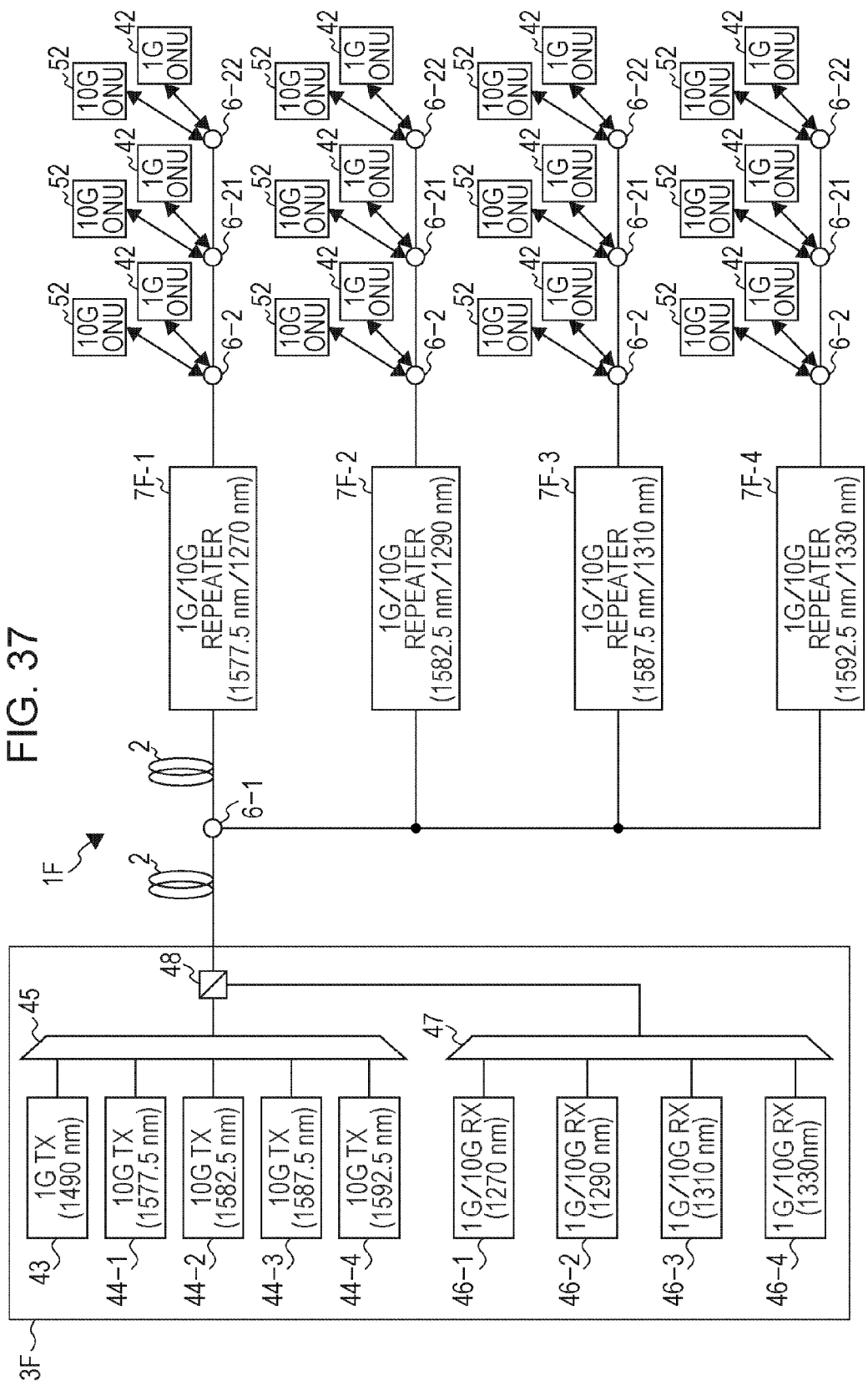
FIG. 37 is a diagram illustrating an example of configurations of an optical transmission system and 1G/10G repeater according to an eighth modification.

FIG. 37 illustrates an example of configurations of an optical transmission system 1F and 1G/10G OLT 3F relating to an eighth modification. Note that portions in FIG. 37 having the same reference numeral as portions denoted in FIG. 2 have similar configuration and functions as the portions denoted in FIG. 2 so the descriptions thereof will be omitted.

With the optical transmission system 1F, a CWDM (Coarse Wavelength Division Multiplexing) method is used that multiplexes the wavelengths of light signals with multiple wavelength bands, for example. The 1G/10G OLT 3F exemplifies a 1G optical transmitter (1G TX) 43, 10G optical transmitters (10G TX) 44-1 through 44-4, wavelength division multiplexers 45 and 47, 1G/10G optical receivers (1G/10G RX) 46-1 through 46-4, and a filter 48. Note that the number of the 10G TX 44-1 through 44-4 and the number of 1G/10G RX 46-1 through 46-4 are simply examples, and may not be interpreted restrictively.

The 1G TX 43 generates and transmits a 1G optical signal having a wavelength band of 1490 nm, for example. Also, the 10G TX 44-1 generates and transmits a 10G optical signal having a wavelength band of 1577.5 nm, for example, and the 10G TX 44-2 generates and transmits a 10G optical signal having a wavelength band of 1582.5 nm, for example. Further, the 10G TX 44-3 generates and transmits a 10G optical signal having a wavelength band of 1587.5 nm, for example, and the 10G TX 44-4 generates and transmits a 10G optical signal having a wavelength band of 1592.5 nm, for example. Note that the above-mentioned transmission wavelength bands are simply examples, and may not be interpreted restrictively.

The optical signals transmitted from the 1G TX 43 and 10G TX 44-1 through 44-4 are multiplexed with the wavelength division multiplexer 45 and sent towards the path to the filter 48. The filter 48 allows the optical signal multiplexed with the wavelength division multiplexer 45 to pass through, and sends this toward the path to the optical coupler 6-1, while reflecting the incident upstream optical signals from the optical coupler and sending this toward the path to the wavelength division multiplexer 47.

Figure 38:
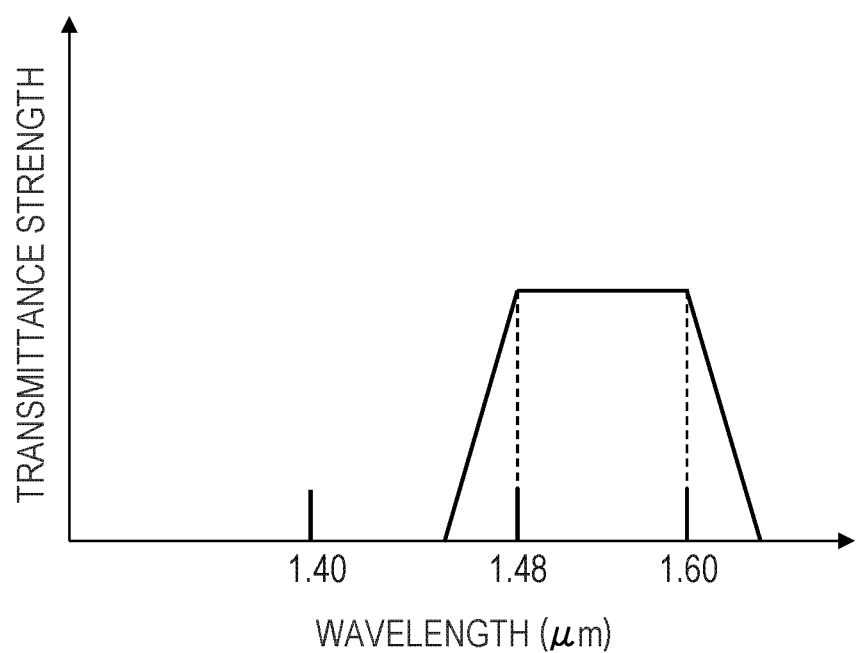
FIG. 38 is a diagram illustrating an example of transmission/reflection properties of a filter.

FIG. 38 illustrates an example of the transmission/reflection properties of the filter 48. As exemplified in FIG. 38, the filter 48 allows the wavelength band of the downstream optical signal transmitted from the 1G TX 43 and 10G TX 44-1 through 44-4 to pass through, while reflecting all other wavelength bands. Note that in the example illustrated in FIG. 38, the filter 48 is configured as a band pass filter, but the filter 48 may be configured as a high-pass filter which allows the wavelength band of the downstream optical signal transmitted from the 1G TX 43 and 10G TX 44-1 through 44-4 to pass through, while reflecting all other wavelength bands.

On the other hand, the upstream optical signals reflected by the filter 48 are branched with the wavelength division multiplexer 47, and input into each of the 1G/10G RX 46-1 through 46-4. The 1G/10G RX 46-1 subjects the 1G and 10G optical signals having a wavelength band of 1270 nm to receiving processing, and the /10G RX 46-2 subjects the 1G and 10G optical signals having a wavelength band of 1290 nm to receiving processing. Also, the 1G/10G RX 46-3 subjects the 1G and 10G optical signals having a wavelength band of 1310 nm to receiving processing, and the 1G/10G RX 46-4 subjects the 1G and 10G optical signals having a wavelength band of 1330 nm to receiving processing. Note that the above-mentioned transmission wavelength bands are but examples, and may not be interpreted restrictively.

Figure 44:
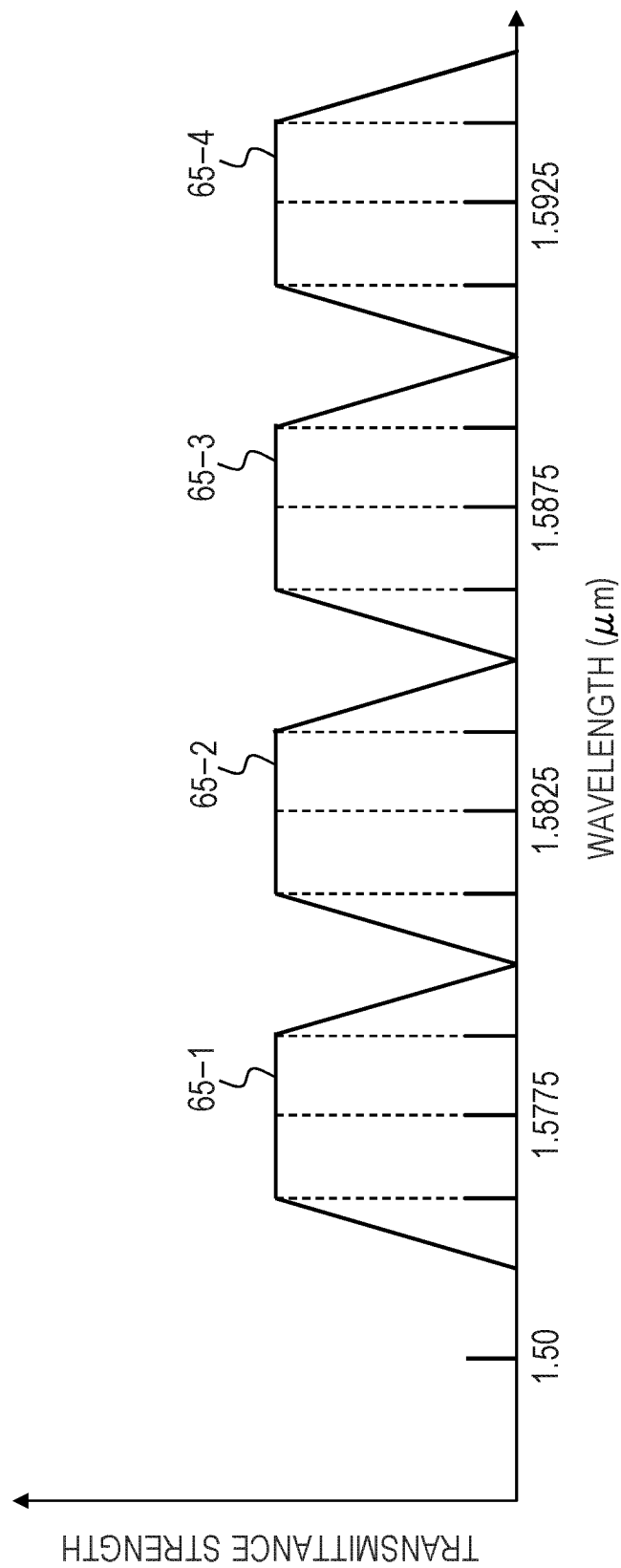
FIG. 44 is a diagram illustrating an example of transmission/reflection properties of a filter.
Figure 45:
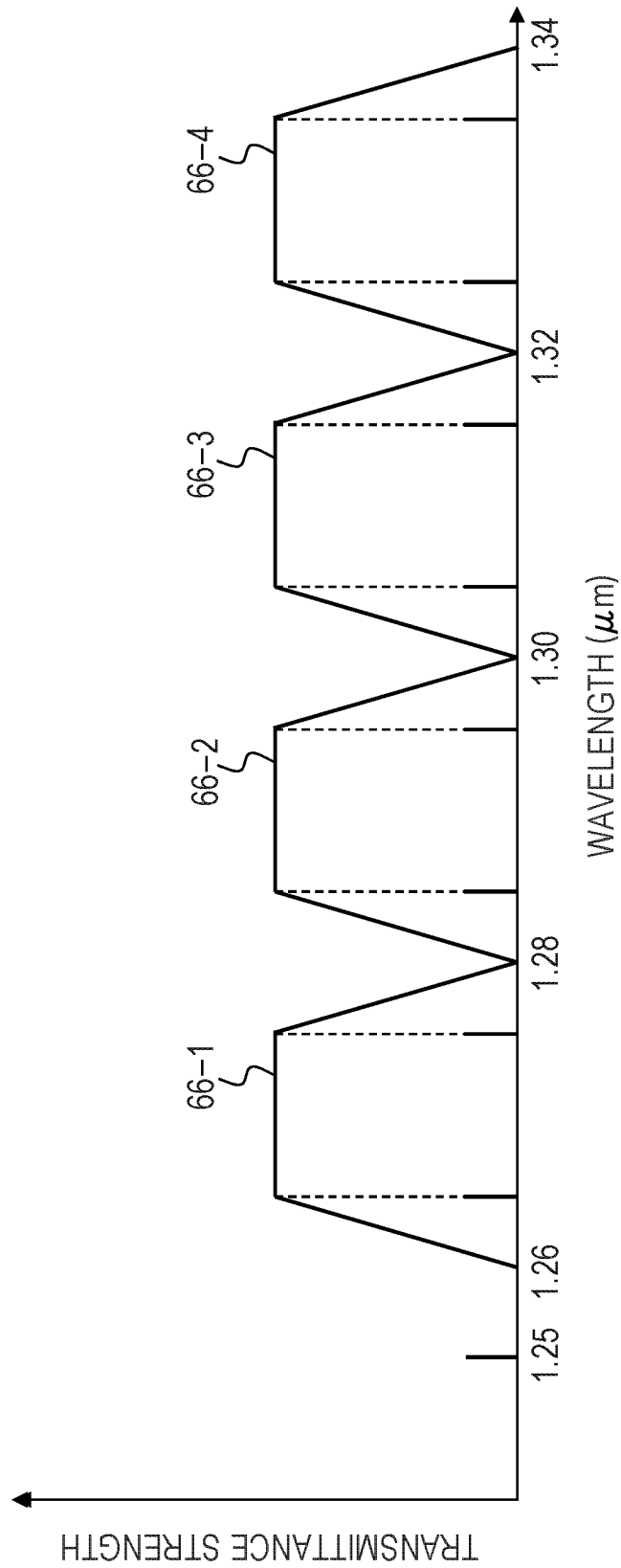
FIG. 45 is a diagram illustrating an example of transmission/reflection properties of a filter.

The optical transmission system 1F exemplified in FIG. 37 has a 1G/10G repeater 7F-1 through 7F-4 according to the transmission wavelength bands. FIGS. 40 through 43 illustrate configuration examples of the 1G/10G repeaters 7F-1 through 7F-4. As exemplified in FIGS. 40 through 43, filters 65-1 through 65-4 and filters 66-1 through 66-4 are each applied to the 1G/10G repeaters 7F-1 through 7F-4 corresponding to the respective downstream optical signal wavelength bands and upstream optical signal wavelength bands. The transmission/reflection properties of the filters 65-1 through 65-4 are as depicted in FIG. 44, and the transmission/reflection properties of the filters 66-1 through 66-4 are as depicted in FIG. 45.

In the examples in FIGS. 40 through 43, from the perspective of network administration, wavelengths are allocated for each of the 1G/10G repeaters 7F-1 through 7F-4. For example, with the 1G/10G repeater 7F-1, the 10G DS wavelength band is 1577.5 nm, the 10G US wavelength band is 1270 nm, the 1G DS wavelength band is 1490 nm, and the 1G US (output wavelength of the 1G regenerator 28) wavelength band is 1270 nm. Note that the 1G US wavelength band from the 1G ONU 42 situated downstream from the 1G/10G repeater 7F-1 is 1290 nm to 1360 nm.

Also, with the 1G/10G repeater 7F-2, the 10G DS wavelength band is 1582.5 nm, the 10G US wavelength band is 1290 nm, the 1G DS wavelength band is 1490 nm, and the 1G US (output wavelength of the 1G regenerator 28) wavelength band is 1290 nm. Note that the 1G US wavelength band from the 1G ONU 42 situated downstream from the 1G/10G repeater 7F-2 is 1270 nm or 1310 nm to 1360 nm.

Further, with the 1G/10G repeater 7F-3, the 10G DS wavelength band is 1587.5 nm, the 10G US wavelength band is 1310 nm, the 1G DS wavelength band is 1490 nm, and the 1G US (output wavelength of the 1G regenerator 28) wavelength band is 1310 nm. Note that the 1G US wavelength band from the 1G ONU 42 situated downstream from the 1G/10G repeater 7F-3 is 1270 nm to 1290 nm or 1330 nm to 1360 nm.

Also, with the 1G/10G repeater 7F-4, the 10G DS wavelength band is 1592.5 nm, the 10G US wavelength band is 1330 nm, the 1G DS wavelength band is 1490 nm, and the 1G US (output wavelength of the 1G regenerator 28) wavelength band is 1330 nm. Note that the 1G US wavelength band from the 1G ONU 42 situated downstream from the 1G/10G repeater 7F-4 is 1270 nm to 1310 nm or 1360 nm.

With a wavelength setting such as described above, the signal wavelength bands are the same the output side for the 1G regenerator 28 and the amplifying processing unit 30, so synthesizing with an optical filter is not performed, and synthesizing is performed with the optical coupler 64.

Also, in the examples in FIGS. 40 through 43, allocations are made so that the wavelength band of the 1G US signal from the 1G ONU 42 which is downstream from the 1G/10G repeaters 7F-1 through 7F-4 and the wavelength band of the 10G US 52 signal differ, so the off-control signal from the 1G regenerator 28 to the amplifying processing unit 30 is unnecessary.

Further, in the examples in FIGS. 40 through 43, if the amplifying processing unit 30 autonomously performs on/off control, in the event that the 1G ONU 60 outputs a 1G US signal, the amplifying processing unit 30 autonomously stops the optical amplifying operations, and the 1G US signal from the 1G ONU 60 and the stray light from the amplifying processing unit 30 will not be synthesized with the optical coupler 64.

As described above, by appropriately allocating wavelengths with repeaters, wavelengths are established for each 1G/10G repeater 7F-1 through 7F-4, including the 10G ONU 52 thereunder, so network administration is facilitated.

Note that, for example, the 1G/10G repeaters 7 and 7A through 7E described above in the embodiment and various modifications may be used for the 1G/10G repeaters 7F-1 through 7F-4. However, filters according to the downstream optical signal wavelength band and upstream optical signal wavelength band are applied to the 1G/10G repeaters 7F-1 through 7F-4. For example, in the case of using the 1G/10G repeater 7E as the 1G/10G repeater 7F-1, the filter 24 within the 1G/10G repeater 7E is configured as a filter that allows the downstream optical signal wavelength band of 1577.5 nm which corresponds to the 1G/10G repeater 7F-1 to pass through, while reflecting all other downstream wavelength bands. Also, the filter 25 within the 1G/10G repeater 7E is configured as a filter that allows the upstream optical signal wavelength band of 1270 nm which corresponds to the 1G/10G repeater 7F-1 to pass through, while reflecting all over upstream wavelength bands. Further, for the other 1G/10G repeaters 7F-2 through 7F-4 also, similarly the transmission/reflection properties of the filter is changed.

Note that in the optical transmission system 1F, on the upstream side from the 1G/10G repeaters 7F-1 through 7F-4, the 1G US wavelength band and the 10G US wavelength band are the same wavelength bands, but this is for ease of monitoring and control operations with the CWDM method.

Thus, according to the present example, even with a wavelength multiplexing system such as CWDM, a repeater that is applicable to a network system wherein optical signals having different transmission rates are mixed is realized. Thus, in the case of using the current OLT and ONU of a PON, the service range is expanded while using the current system, whereby construction of a new system is minimized, and costs are reduced.

[2] Other

The configurations and functions of the above-described OLTs, ONUs, and repeaters may be selected as suitable, or may be used as combinations as appropriate. That is to say, in order to deliver the functions of the present disclosure as described above, the configurations and functions are selected as appropriate or used as appropriate combinations.

For example, with the examples described above, a network system wherein 1G and 10G E-PON optical signals serving as optical signals having different transmission rates has been described, but combinations of optical signals having other transmission rates may be used, and for example an optical signal such as a G-PON may be used. Also, with the examples described above, the present disclosure is described using an example wherein the first transmission rate is 1G and the second transmission rate is 10G, but this may not be interpreted restrictively; it is sufficient for each repeater to be able to convert an optical signal of a certain first transmission rate to an optical signal of a second transmission rate that is a higher rate. For example, the repeaters may be arranged so as to convert a 1G optical signal into a 40G optical signal, or convert a 10G optical signal into a 40G optical signal, and in this case, the converter unit having the functionality that processes optical signals of the transmission rates is sufficient.

Further, with the examples described above, the present disclosure is described using an example of an optical transmission system wherein 1G ONUs 41 and 42 and 10G ONUs 51 and 52 are mixed, but this may not be interpreted restrictively, and even in an optical transmission system having only the 1G ONUs 41 and 42, each repeater mentioned above may be used. Also, with the examples described above, the present disclosure is described using an example of an optical transmission system wherein 1G ONUs 41 and 42 and 10G ONUs 51 and 52 are mixed, and wherein the relatively low rate 1G optical signal is converted to a relatively high 10G optical signal, of the optical signals mixed in the system, but this may not be interpreted restrictively. For example, even in a case wherein the 1G ONUs 41 and 42 and 10G ONUs 51 and 52 are mixed in the downstream side of the repeaters, in the case that an optical line terminal on the upstream side of the repeaters processes an optical signal that is faster than 10G, the repeaters may convert at least one of the 1G optical signal and 10G optical signal into a higher rate optical signal.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A repeater to relay an optical signal transmitted/received between an optical line terminal (OLT) and at least one optical network unit (ONU), the repeater comprising:
a first port configured to receive an optical signal input from the at least one ONU;
a converter circuit configured to convert an optical signal of a first transmission rate into an optical signal of a second transmission rate higher than the first transmission rate, the optical signal of the first transmission rate to be converted being included in optical signals received at the first port;
a second port configured to output the optical signal converted by the converter circuit to the OLT;
a first interface configured to branch the optical signal received by the first port to a first path guiding to the converter circuit and to a second path guiding to a processing of the optical signal of the second transmission rate; and
a second interface configured to multiplex the optical signal converted by the converter circuit and the optical signal of the second transmission rate guided to the second path by the first interface, and output the multiplexed optical signals to the OLT via the second port.

2. The repeater according to claim 1, further comprising:
an optical line terminal in repeater (OLT in repeater) configured to receive the optical signal of the first transmission rate, and convert the received optical signal into an electrical signal; and
an optical network unit in repeater (ONU in repeater) configured to convert the electrical signal converted by the OLT in repeater into the optical signal of the second transmission rate.

3. The repeater according to claim 2, further comprising:
an optical amplifier configured to amplify the optical signal of the second transmission rate branched to the second path by the first interface; and
an amplification controller configured to control the optical amplifier;
wherein:
the amplification controller controls the optical amplifier so as to be amplifiable, when the optical amplifier receives an input signal thereof and the OLT in repeater has no input of the optical signal of the first transmission rate, and
the amplification controller controls the optical amplifier so as to be un-amplifiable, when the optical amplifier has no input thereof and the OLT in repeater receives the optical signal of the first transmission rate.

4. The repeater according to claim 2, further comprising:
an optical amplifier configured to amplify the optical signal of the second transmission rate branched to the second path by the first interface; and
an amplification controller configured to control the optical amplifier;
wherein the amplification controller receives scheduling information that is transmitted from the OLT via the ONU in repeater and that is related to transmission time periods of the optical signal of the second transmission rate, and
wherein, based on the received scheduling information,
the amplification controller controls the optical amplifier so as to be amplifiable, when the optical amplifier receives the optical signal of the second transmission rate, and
the amplification controller controls the optical amplifier so as to be un-amplifiable, when the optical amplifier has no input of the optical signal of the second transmission rate.

5. The repeater according to one of claim 2,
wherein the OLT in repeater receives, from the OLT, scheduling information relating to transmission time periods of an optical signal directed to the OLT, via the ONU in repeater, and
wherein, based on the received scheduling information, the OLT in repeater controls the optical signal of the first transmission rate, so that the optical signal directed to the OLT and the optical signal directed to the OLT in repeater have different transmission time periods respectively.

6. The repeater according to one of claim 2, further comprising:
   a monitoring controller configured to monitor at least one of the OLT in repeater and the ONU in repeater, and to notify the OLT via the ONU in repeater of the monitored results.

7. The repeater according to one of claim 1, wherein:
   the second port receives optical signals input from the OLT,
   the converter circuit converts an optical signal of the second transmission rate into an optical signal of the first transmission rate, the optical signal of the second transmission rate to be converted being included in the optical signals received at the second port, and
   the first port outputs the optical signal of the first transmission rate converted by the converter circuit to the at least one ONU.

8. A repeater to relay an optical signal transmitted/received between an optical line terminal (OLT) and at least one optical network unit (ONU), the repeater comprising:
   a first port configured to receive an optical signal input from the at least one ONU;
   an optical line terminal in repeater (OLT in repeater) configured to convert an optical signal of a first transmission rate received at the first port into an electrical signal;
   an optical network unit in repeater (ONU in repeater) configured to convert the electrical signal converted by the OLT in repeater into an optical signal of a second transmission rate higher than the first transmission rate; and
   a second port configured to output the optical signal converted by the ONU in repeater to the OLT;
   wherein the OLT in repeater receives, via the ONU, scheduling information relating to transmission time periods of an optical signal directed to the OLT, and
   wherein, based on the received scheduling information, the OLT in repeater controls the optical signal of the first transmission rate, so that the optical signal directed to the OLT and the optical signal directed to the OLT in repeater have different transmission time periods respectively.

* * * * *